(12) United States Patent
Kurokawa et al.

(10) Patent No.: US 9,740,391 B2
(45) Date of Patent: *Aug. 22, 2017

(54) MOVING AN OBJECT DISPLAYED ON A DISPLAY SCREEN

(71) Applicant: International Business Machines Corporation, Armonk, NY (US)

(72) Inventors: Hiroshi Kurokawa, Tokyo (JP); Takahisa Mizuno, Tokyo (JP); Tomohiro Shioya, Tokyo (JP); Sayaka Tamai, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/258,708

(22) Filed: Sep. 7, 2016

(65) Prior Publication Data

US 2016/0378313 A1    Dec. 29, 2016

Related U.S. Application Data

(63) Continuation of application No. 14/318,833, filed on Jun. 30, 2014.

(30) Foreign Application Priority Data

Jul. 8, 2013    (JP) .................. 2013-142762

(51) Int. Cl.
*G06F 3/0486* (2013.01)
*G06F 3/0481* (2013.01)
(Continued)

(52) U.S. Cl.
CPC .......... *G06F 3/0486* (2013.01); *G06F 1/1643* (2013.01); *G06F 3/0481* (2013.01);
(Continued)

(58) Field of Classification Search
None
See application file for complete search history.

(56) References Cited

U.S. PATENT DOCUMENTS

| | | |
|---|---|---|
| 4,987,411 A | 1/1991 | Ishigami |
| 5,760,763 A | 6/1998 | Ainsburg |
| (Continued) | | |

FOREIGN PATENT DOCUMENTS

| | | |
|---|---|---|
| JP | H0348922 A | 3/1991 |
| JP | H06214546 A | 8/1994 |
| (Continued) | | |

OTHER PUBLICATIONS

Vector, Inc., "Loop Through", Vector, Inc., vector.co.jp, <http://www.vector.co/jp/soft/win95/util/se238088.html>, retrieved Jun. 6, 2014, pp. 1-2.

(Continued)

*Primary Examiner* — Doon Chow
*Assistant Examiner* — James T Tsai
(74) *Attorney, Agent, or Firm* — Mark G. Edwards

(57) ABSTRACT

A method, system, and/or computer program product moves a movable object displayed on a display screen using an electronic device. The method comprises the electronic device displaying a first frame around a first area on a display screen, and displaying a second frame around a second area on the display screen. The second frame displayed is larger than the first frame, and adjusts in size until it intersects a movable object. Once the second frame intersects the movable object, a half line is displayed from the first frame to the movable object, and in response to receiving a movement signal, a display of the movable object is then displayed in the first area.

6 Claims, 30 Drawing Sheets

(51) Int. Cl.
*G06F 3/0485* (2013.01)
*G06F 3/0484* (2013.01)
*G06F 3/0488* (2013.01)
*G06F 1/16* (2006.01)

(52) U.S. Cl.
CPC ........ *G06F 3/0488* (2013.01); *G06F 3/04817* (2013.01); *G06F 3/04842* (2013.01); *G06F 3/04845* (2013.01)

(56) References Cited

U.S. PATENT DOCUMENTS

| | | |
|---|---|---|
| 6,995,746 B2 | 2/2006 | Aymeric |
| 7,231,609 B2 | 6/2007 | Baudisch |
| 8,675,014 B1 | 3/2014 | Milne et al. |
| 2002/0075199 A1 | 6/2002 | Asahi et al. |
| 2005/0060658 A1 | 3/2005 | Tsukiori |
| 2006/0132456 A1 | 6/2006 | Anson |
| 2006/0143571 A1 | 6/2006 | Chan |
| 2006/0168548 A1 | 7/2006 | Kelley et al. |
| 2006/0288314 A1 | 12/2006 | Robertson |
| 2008/0077874 A1 | 3/2008 | Garbow et al. |
| 2009/0094550 A1 | 4/2009 | Huang et al. |
| 2011/0191695 A1 | 8/2011 | Dinka et al. |
| 2011/0231793 A1 | 9/2011 | Wilson |
| 2011/0304557 A1 | 12/2011 | Wilburn et al. |
| 2012/0044173 A1 | 2/2012 | Homma et al. |
| 2012/0272179 A1 | 10/2012 | Stafford |
| 2015/0012880 A1 | 1/2015 | Kurokawa et al. |

FOREIGN PATENT DOCUMENTS

| | | |
|---|---|---|
| JP | H07121349 A | 5/1995 |
| JP | H07152490 A | 6/1995 |
| JP | H0887381 A | 4/1996 |
| JP | 2003233446 A | 8/2003 |
| JP | 2015015001 A | 1/2015 |

OTHER PUBLICATIONS

Anonymous, "Multi-Display Interface That is Studied in the Faculty of Media Com Media Design Project "Pinch" is Featured in Various Media", Tokyo University of Technology web site, <http://www.teu.ac.jp/information/2012.html?d=118>, Nov. 29, 2012, pp. 1-2.

Takashi Ota, "Pinching-in a plurality of smartphones and tablet computers makes them one screen—Reason why "pinch" was created", Nikkei Business Publication, Inc., <http://itpro.nikkeibp.co.jp/article/Interview/20121127/440201/?ST=print>, Nov. 29, 2012, pp. 1-4.

Jon Fingas "Tokyo University of Technology's Pinch interface creates ad hoc video walls from mobile device", AOL, Inc., <http://www.engadget.com/2012/11/02/tokyo-university-of-technologys-pinch-interface-creates-video-walls/>, Nov. 2, 2012, pp. 1-7.

Kurokawa et al., "Moving an Object Displayed on a Display Screen," U.S. Appl. No. 15/258,728, filed Sep. 7, 2016.

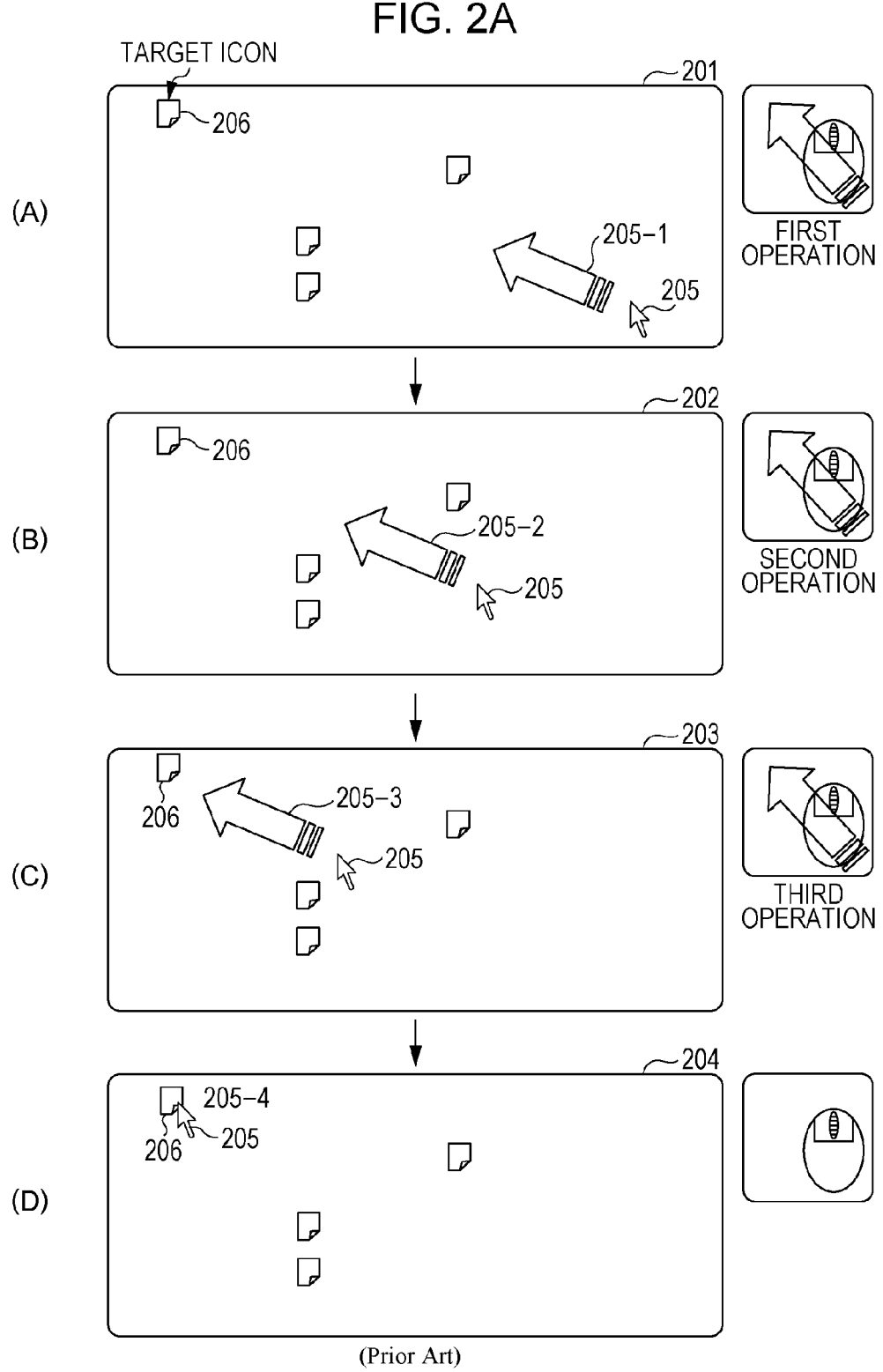

(Prior Art)

(Prior Art)

(Prior Art)

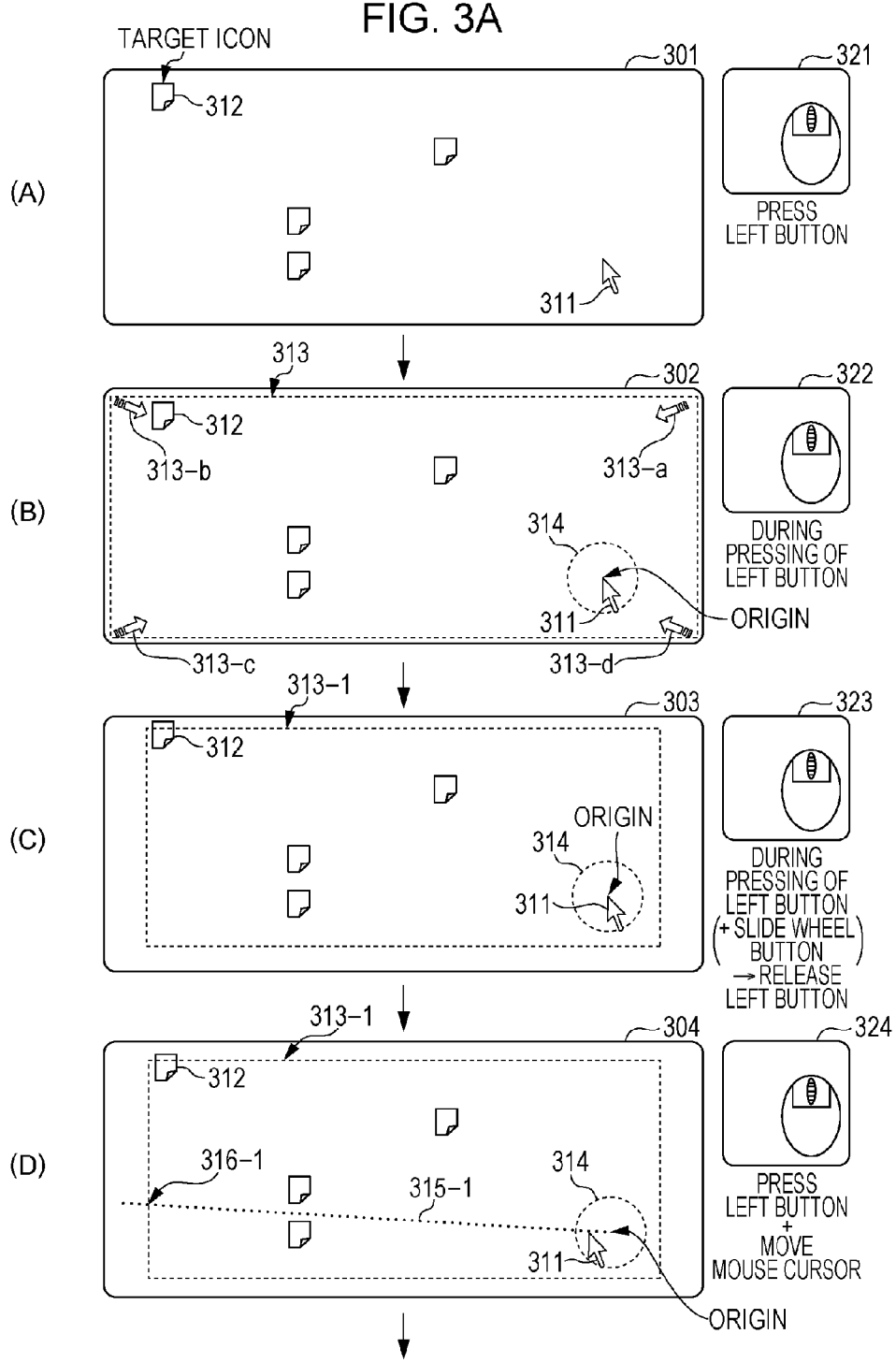

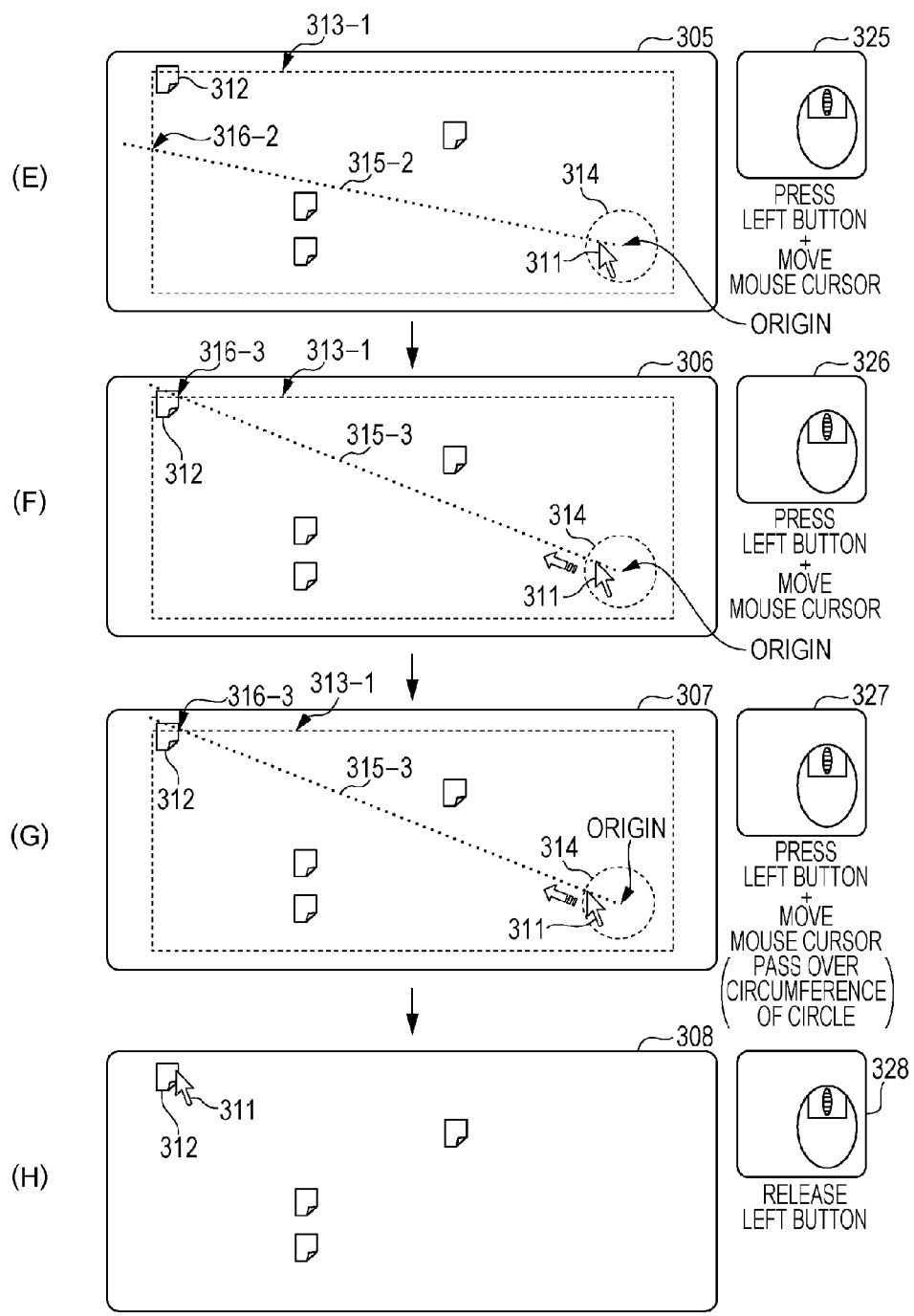

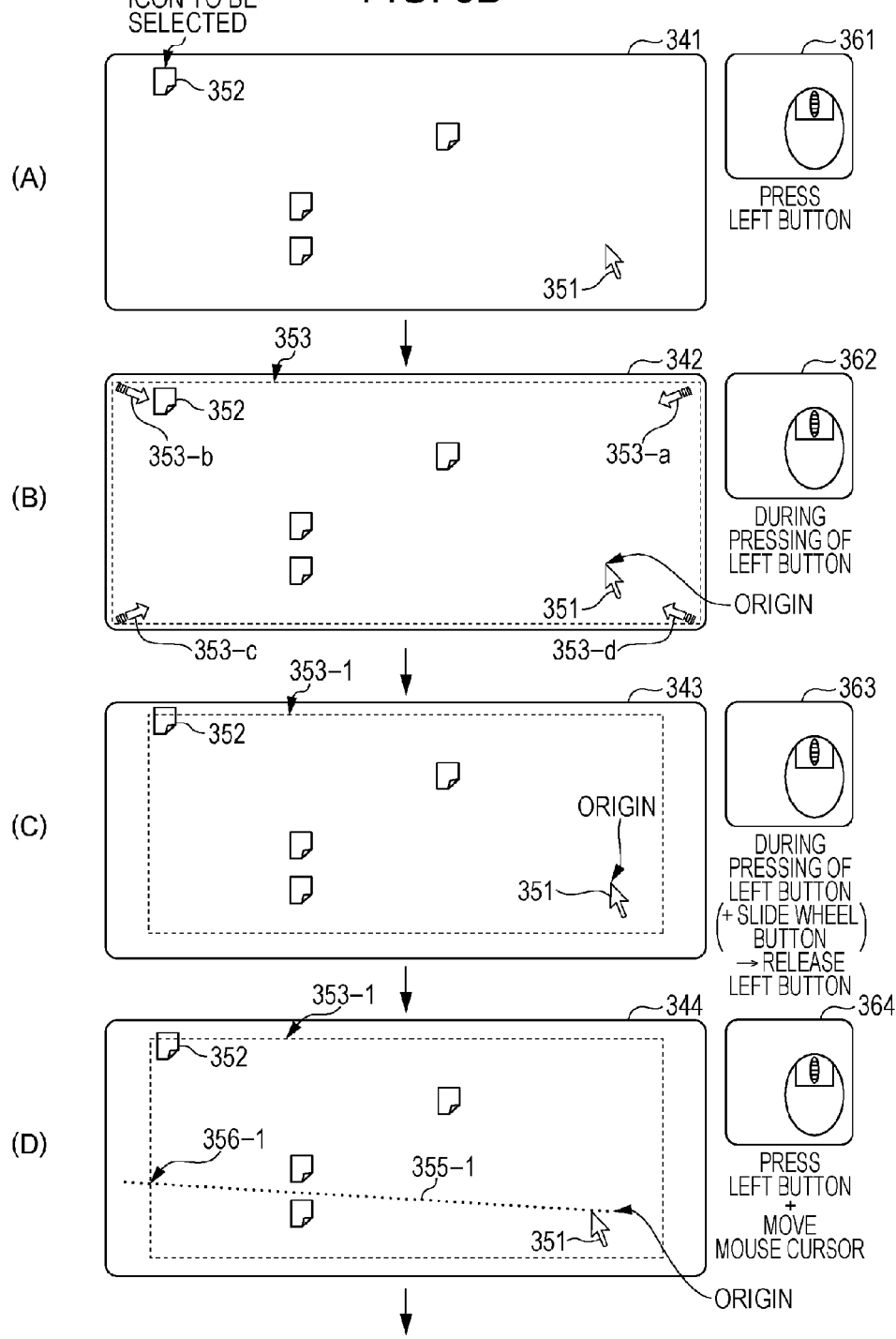

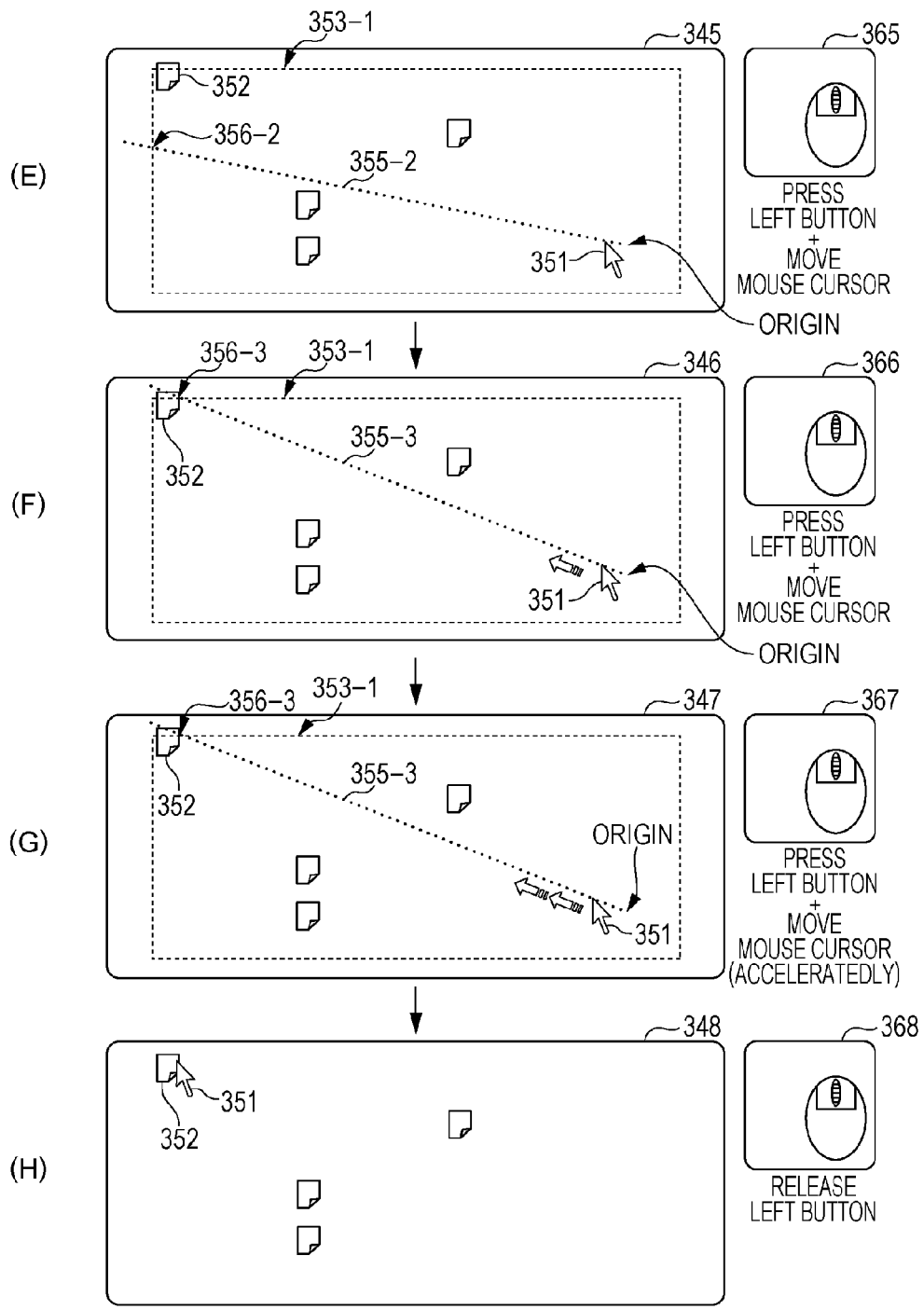

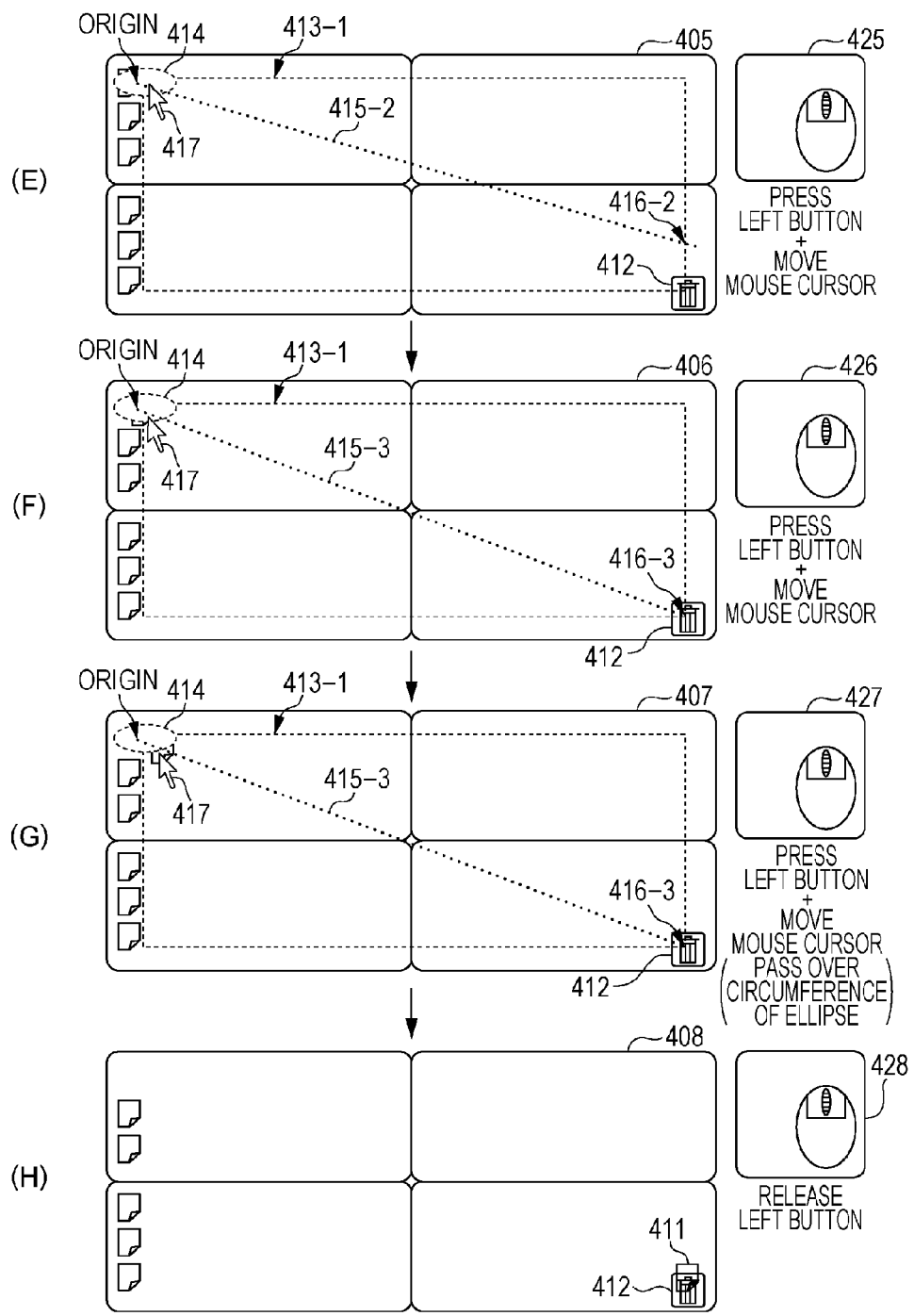

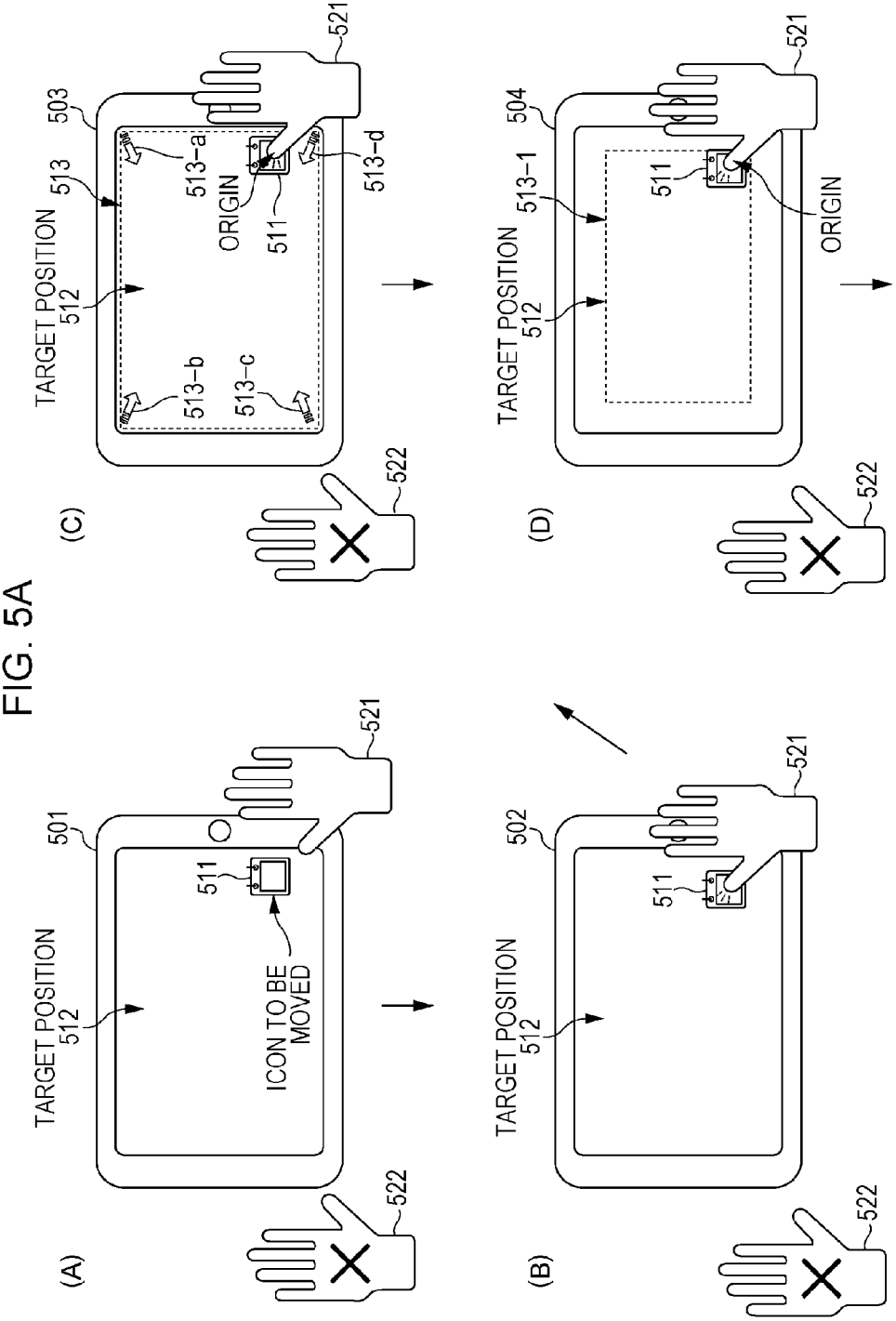

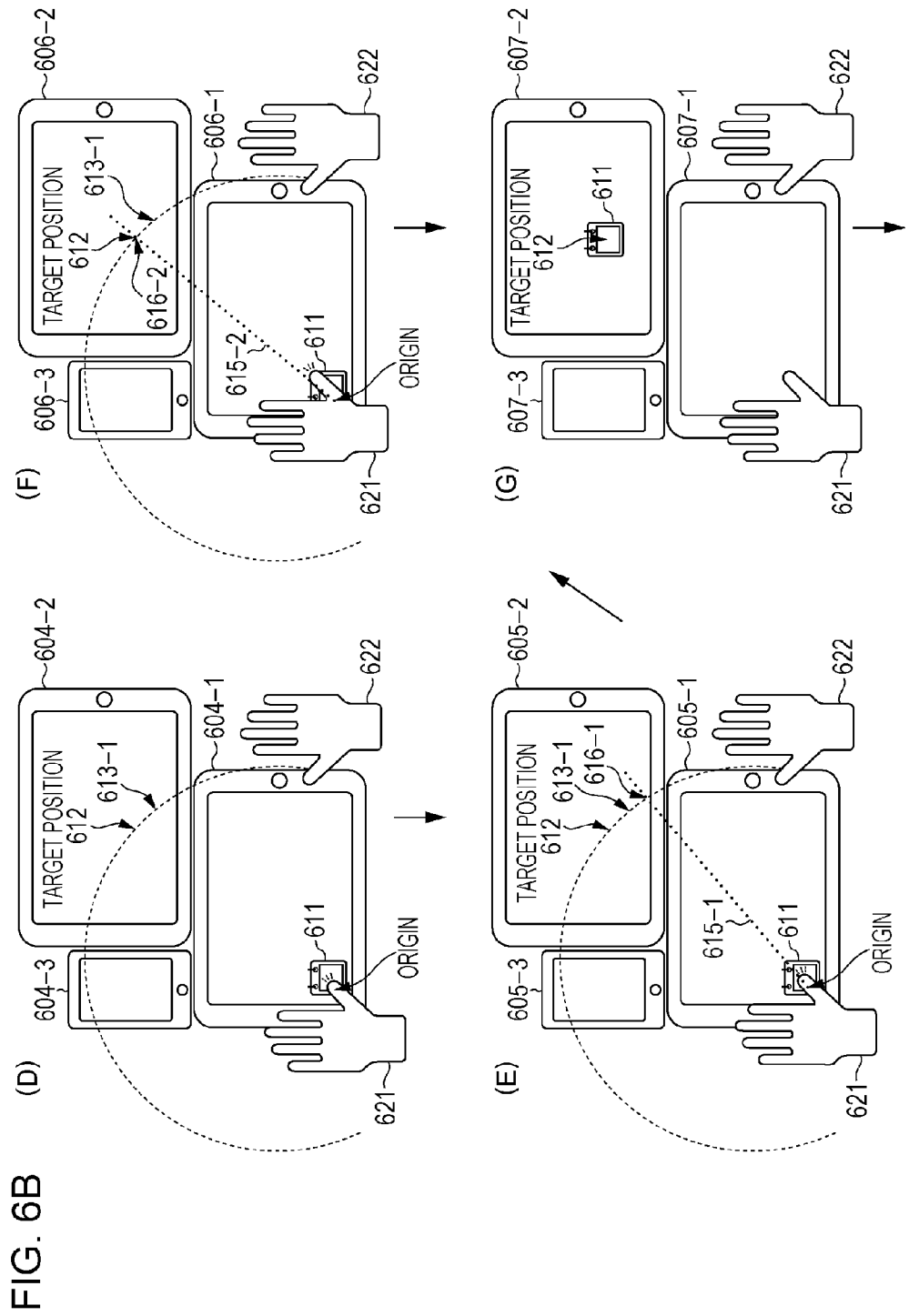

(H)

(I)

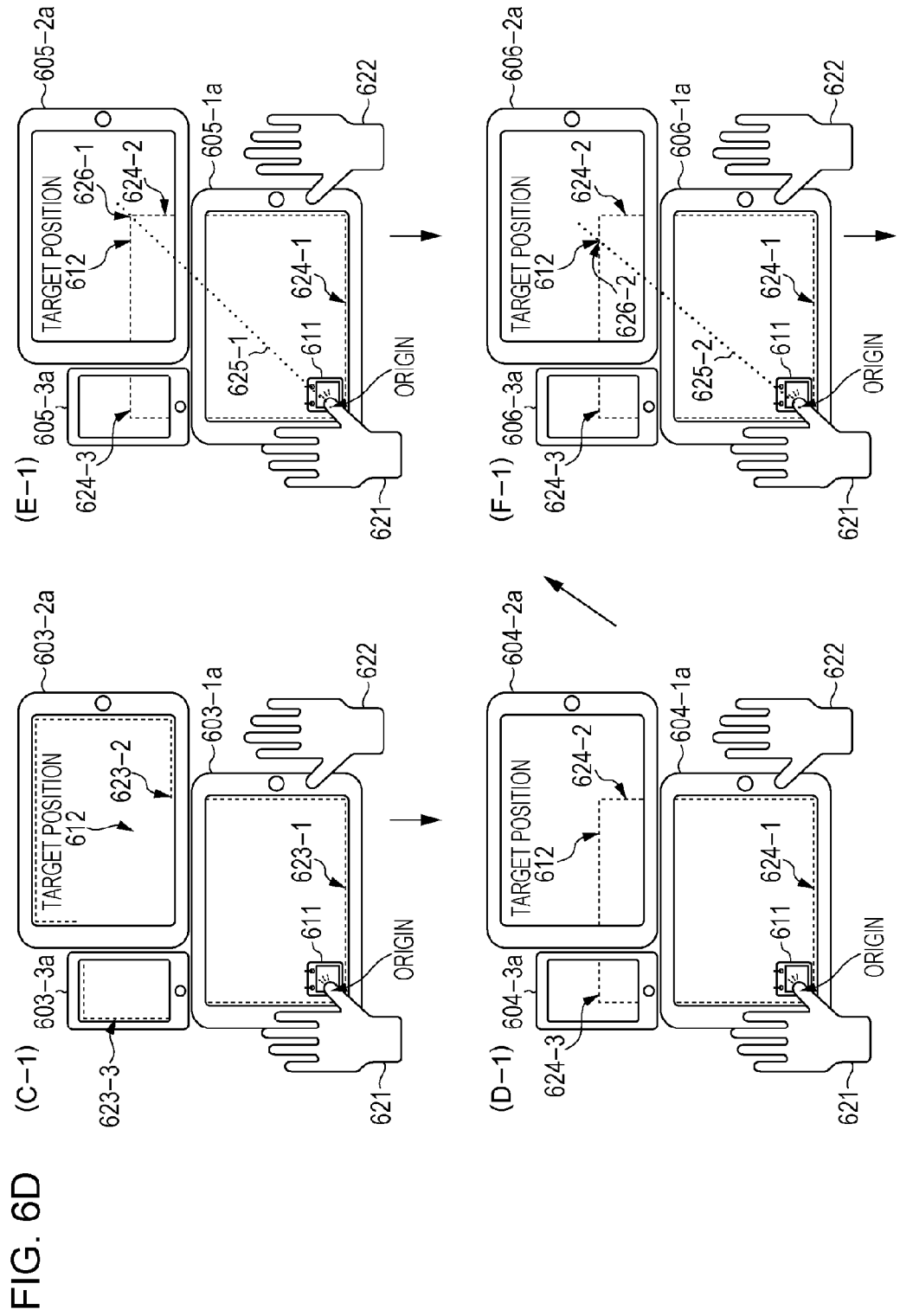

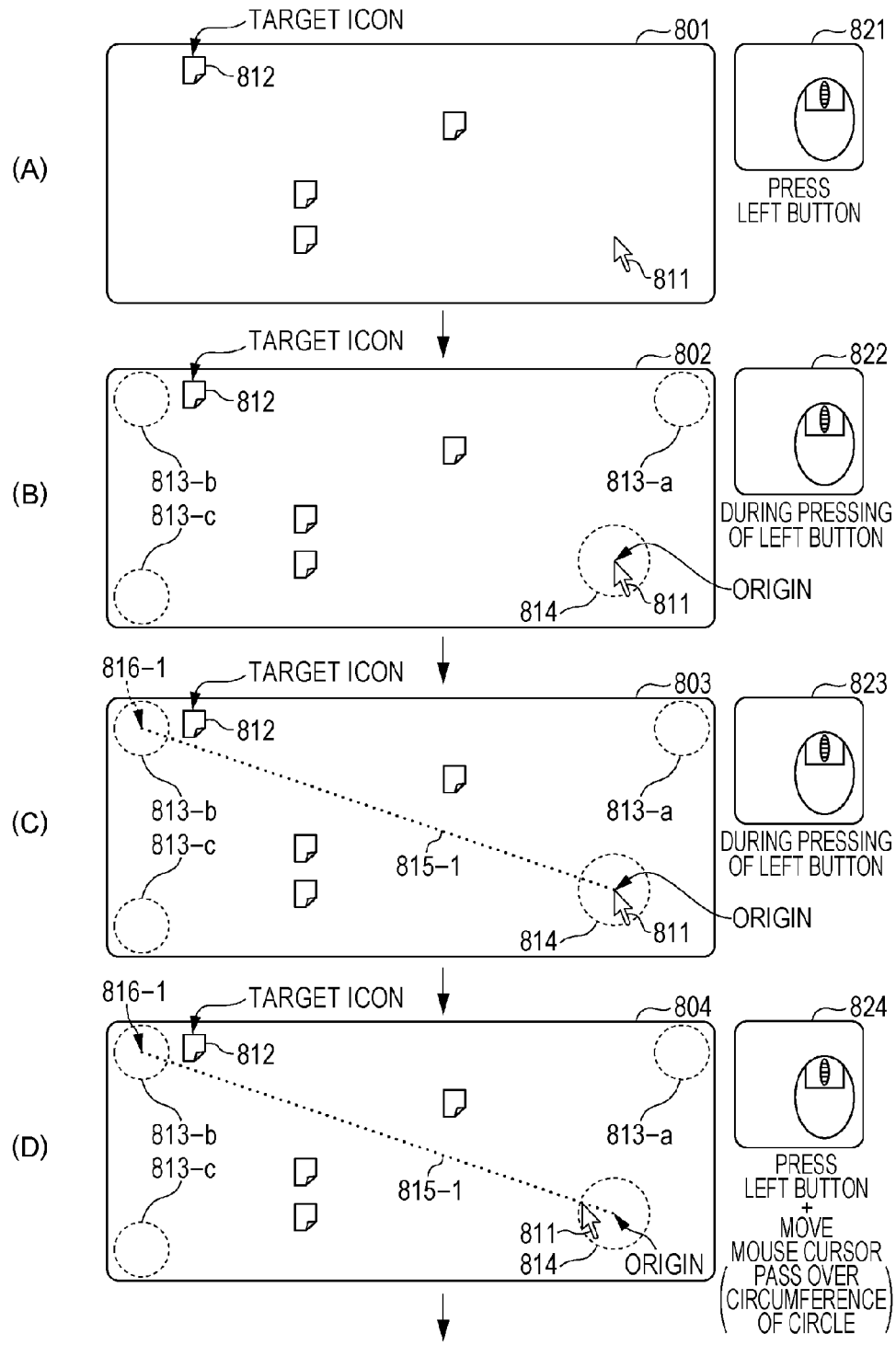

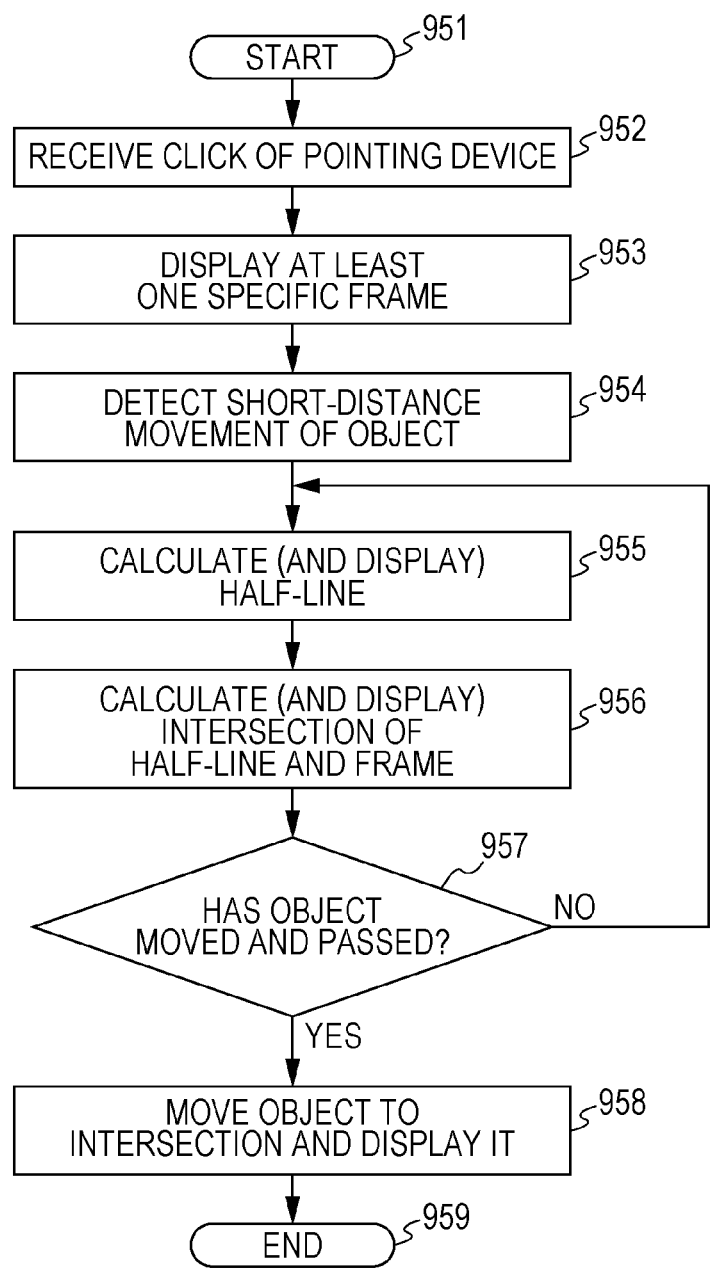

MOVING AN OBJECT DISPLAYED ON A DISPLAY SCREEN

BACKGROUND

The present invention relates to the field of a user interface on a display screen. In particular, the present invention relates to a technique for controlling a moving object displayed on a display screen. Specifically, the present invention relates to a technique for moving a moving object displayed on a display screen.

Operations using a moving object (for example, a cursor or other user-selectable moving objects) displayed on a display screen are intuitive and have excellent usability, thus being widely used.

The size and resolution of displays have increased in recent years. For example, 24-inch, 27-inch or more liquid crystal displays and ultra wide liquid crystal displays with an aspect ratio of 21:9 are on sale. For example, notebook computers incorporating a high-resolution display, such as an IGZO liquid crystal display with a resolution of 3200× 1800 pixels and a Retina liquid crystal display with a resolution of 2880×1800 pixels or 2560×1440 pixels, are available to purchase.

Furthermore, large-sized liquid crystal TV sets have become widespread and have become widely used as computer displays.

Furthermore, a technique for combining two or more displays for one computer to increase a desktop area as a single screen (multi-display) has become widespread.

However, moving the object on the display screen of the liquid crystal display, the large-sized liquid crystal TV set, or the multi-display sometimes has a problem in that an area in which the object is moved is wide or a physical space for operating a pointing device is limited. This often requires that the user repeat a specific operation of the pointing device to move the object on the display screen of the liquid crystal display, the large-sized liquid crystal TV set, or the multi-display (see examples shown in FIGS. 2A and 2B).

Furthermore, tablet computers and smartphones have rapidly come into widespread use in recent years.

However, some of the tablet computers require that the users perform an operation with either hand while holding the tablet computer with both hands owing to the weight. In another case, the user sometimes may perform an operation only with one hand while holding the tablet computer or the smartphone with the same hand (for example, a case where the user carries a bag with the other hand or a case where the user holds a train strap with the other hand) (see examples shown in FIGS. 2C and 2E). Thus, to move the moving object on the display screen of the tablet computer or the smartphone, the user often needs to place the tablet computer or the smartphone on a desk or the knees, making both hands free, or change a clutch to perform an operation.

Like the above multi-display, there is another technique for enabling an operation on a single screen by combining the display screens of a plurality of tablet computers or smartphones or combining a tablet computer or a smartphone with a display. With this technique, when the user holds one tablet computer with both hands (see FIG. 2D), or when the user performs an operation with only one hand while holding the tablet computer with that hand, the user cannot hold or operate other tablet computers or smartphones. Thus, to move the moving object from the one tablet computer to another tablet computer, the user often needs to place the one tablet computer on a desk or the knees or otherwise make both hands free to perform an operation.

Known prior art discloses an invention related to a cursor control method. An object of the invention is to move a cursor to a desired item area at a high speed to allow quick selection of an item in a window. Known prior art discloses a cursor control method when selecting an item displayed on a window provided on a screen. The method determines a cursor moving direction using a line segment connecting two positions of a pointer before and after the cursor moves out of one item area, determines another item area that the cursor meets first in the extension of the line segment in the cursor moving direction to be a target area, and moves the pointer to a preset position of the target area when the cursor comes out of the one item area. Known prior art further discloses a cursor control method when selecting an item displayed on a window provided on a screen. The method determines a cursor moving direction using a line segment connecting a preset position of one item area and the position of a pointer immediately before the pointer moves, determines another item area that the cursor meets first in the extension of the line segment in the cursor moving direction to be a target area, and moves the pointer to a preset position of the target area when the cursor comes out of the one item area or when a mouse button is pressed in the item area.

Known prior art discloses an invention related to a window display unit. An object of the invention is to provide a window display unit in which the movement of the line of sight on the window and the movement of a mouse cursor can be minimized and high-speed, high-efficiency operations can be achieved. The window display unit includes detection means for detecting the position of the cursor, window display means for displaying a window in the vicinity of the cursor, fixed-position display means for displaying the window at a predetermined position, and display control means for displaying the window in the vicinity of the cursor or a predetermined position depending on the position of the cursor.

Known prior art discloses an apparatus and a method for displaying a plurality of icons capable of moving the icons all together while changing the relative positions thereof, as well as a computer program for executing the method.

Known prior art discloses displaying a mark or the like at the position of a cursor in a small subwindow provided on a screen to make the position of the cursor easily found in a moment, displaying the cursor in a desired shape, and displaying the cursor so as to be easily viewed depending on the position on the screen.

Known prior art discloses a method for moving the display of a cursor instantly to a cursor return position on the screen of a display device that an operator sets.

Known prior art describes a mouse utility called a through loop with which a mouse cursor jumps from one end of a display screen to the other end of the screen.

SUMMARY

In one embodiment of the present invention, a method, system, and/or computer program product moves a movable object displayed on a display screen using an electronic device. The method comprises the electronic device displaying a first frame around a first area on a display, and displaying a second frame around a second area on the display. The second frame displayed is larger than the first frame, and adjusts in size until it intersects a movable object. Once the second frame intersects the movable object, a half line is displayed from the first frame to the movable object, and in response to receiving a movement signal, a display of the movable object is then displayed in the first area.

BRIEF DESCRIPTION OF THE SEVERAL VIEWS OF THE DRAWINGS

FIG. 2A is a diagram showing a prior art example in which the user wants to select an icon distant from the present position of a mouse cursor (a moving object) on a wide-type liquid crystal display by using a mouse.

FIG. 3A is a diagram showing an example in which the user selects an icon distant from the present position of a mouse cursor (a moving object) on a wide-type liquid crystal display by using a mouse according to an embodiment of the present invention.

FIG. 3B is a diagram showing an example in which the user selects an icon distant from the present position of a mouse cursor (a moving object) on a wide-type liquid crystal display by using a mouse according to an embodiment of the present invention.

FIG. 3D is a diagram showing an example in which the user selects an icon distant from the present position of a mouse cursor (a moving object) on a wide-type liquid crystal display by using a mouse according to an embodiment of the present invention.

FIG. 3E is a diagram showing an example in which the user selects an icon distant from the present position of a mouse cursor (a moving object) on a wide-type liquid crystal display by using a mouse according to an embodiment of the present invention.

FIG. 4B is a diagram showing an example in which the user moves an icon (a moving object) under a mouse cursor to a trash bin distant from the mouse cursor on a multi-display composed of four liquid crystal displays with a mouse according to an embodiment of the present invention.

FIG. 5A is a diagram showing an example in which the user holds a tablet computer with one hand and moves an icon (a moving object) on the display of the tablet computer to a position that a finger of the one hand cannot reach by using only the finger of the one hand according to an embodiment of the present invention.

FIG. 6B is a diagram showing an example in which the user holds one of three tablet computers, which constitute a single display screen (a multi-display), with both hands and moves an icon on the tablet computer to another tablet computer only with a finger of one hand according to an embodiment of the present invention.

FIG. 6D is a diagram showing an example in which the frames of the display screens of the three tablet computers are integrated into one outer periphery in the embodiment of the present invention shown in FIGS. 6A and 6B.

FIG. 8A is a diagram showing an example in which the user selects an icon distant from the present position of a mouse cursor (a moving object) on a wide-type liquid crystal display using a mouse and displays a plurality of frames according to an embodiment of the present invention.

FIG. 9D is a flowchart for moving a movable object displayed on a display screen according to an embodiment of the present invention, which includes a process of the frame display means for displaying at least one specific frame.

DETAILED DESCRIPTION

Embodiments of the present invention will be described below with reference to the drawings. The same reference sign denotes the same object in all of the drawings unless otherwise noted. It should be understood that the embodiments of the present invention are merely for explaining preferred forms of the present invention and are not intended to limit the scope of the present invention.

An electronic device according to an embodiment of the present invention is not particularly limited, provided that it displays a moving object on a display screen. Examples of the electronic device include, but are not limited to, a desktop computer, a notebook computer, an all-in-one personal computer, a tablet computer (for example, an Android® tablet, a Windows® tablet, and an iOS tablet), a smartphone, a mobile phone, a personal digital assistant (PDA), a medical tablet, a game tablet, a car navigation system, a portable navigation system, and a multimedia kiosk.

In the embodiment of the present invention, examples of "a movable object" include a cursor and a user-selectable movable object.

An example of the "cursor" is a cursor of a pointing device. Examples of the "cursor of a pointing device" include cursors of a mouse, a touchpad, a pointing stick (e.g., TrackPoint®), a joystick, a trackball, a tablet pen, and a light pen.

An example of the "user-selectable movable object" is an icon. Examples of the "icon" include a folder icon, a file icon, a shortcut icon, an alias icon, and an icon or a cursor displayed under an operating finger or an operating pen on a touch panel screen.

Figure 1A:
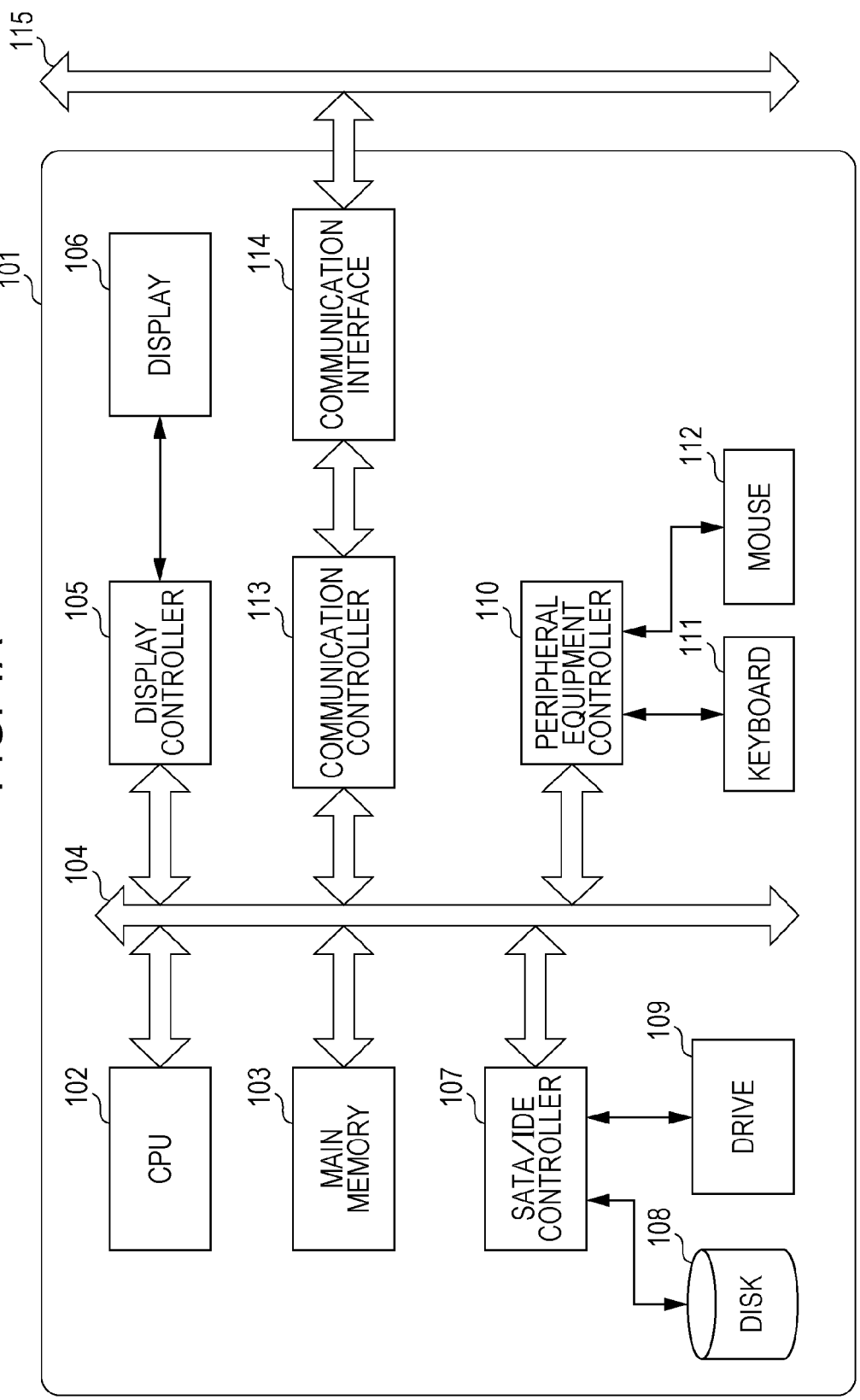
FIG. 1A is a diagram showing an example of an electronic device that can be used in an embodiment of the present invention.
Figure 1B:
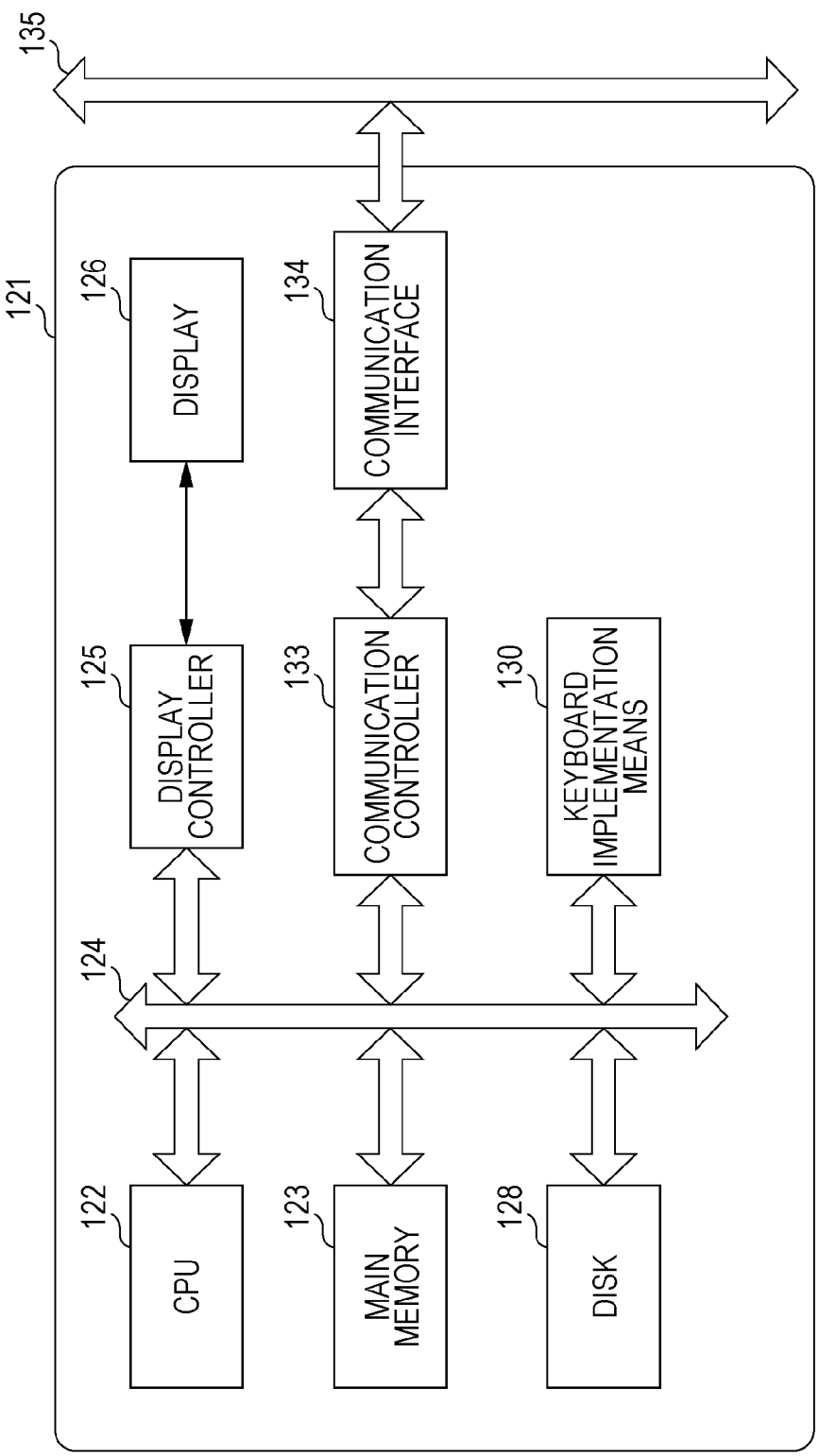
FIG. 1B is a diagram showing another example of an electronic device that can be used in an embodiment of the present invention.

FIG. 1A and FIG. 1B are diagrams showing examples of an electronic device having a hardware configuration for implementing an electronic device that can be used in an embodiment of the present invention.

FIG. 1A is a diagram showing an example of the electronic device, such as a desktop computer, a notebook computer, or an all-in-one personal computer.

An electronic device 101 includes a CPU 102 and a main memory 103, which are connected to a bus 104. Preferably, the CPU 102 is based on a 32-bit or 64-bit architecture. Examples of the CPU 102 include Core™ i series, Core™ 2 series, Atom™ series, Xeon® series, Pentium® series and Celeron® series of Intel Corporation; A series, Phenom™ series, Athlon™ series, Turion™ series, and Sempron™ of Advanced Micro Devices, Inc.; and Power™ series of International Business Machines Corporation.

The bus 104 may connect to a display 106, such as a liquid crystal display (LCD), via a display controller 105. Examples of the liquid crystal display (LCD) include a touch panel display and a floating touch display. The display 106 can be used to display a moving object via an appropriate graphic interface, which is displayed when software running in the electronic device 101, for example, an electronic device program running in the electronic device according to the embodiment of the present invention, operates.

The bus 104 can optionally connect to, for example, a disk 108, such as a hard disk drive or a solid-state drive (SSD), via a SATA/IDE controller 107.

The bus 104 can optionally connect to a drive 109, such as a CD, DVD or BD drive, via the SATA/IDE controller 107.

The bus 104 can optionally connect to a keyboard 111 and a mouse 112 via a peripheral equipment controller 110, such as a keyboard/mouse controller or a USB bus.

The disk 108 can store an operating system, for example, Windows® OS, UNIX®, or Mac OS®; programs that provide a Java® processing environment, such as J2EE, a Java® application, a Java® virtual machine (VM), and a Java® Just-In-Time (JIT) compiler; an application program according to the embodiment of the present invention; other programs; and data, all of which can be loaded into the main memory 103.

The disk 108 may be installed in the electronic device 101 or may be connected to the electronic device 101 via a cable or a wired or wireless network so that the electronic device 101 is accessible thereto.

The drive 109 can be used to install a program, such as an operating system, an application, or an electronic device program according to an embodiment of the present invention, to the disk 108 from a CD-ROM, a DVD-ROM, or a BD when needed.

The communication interface 114 conforms to, for example, an Ethernet® protocol. The communication interface 114 is connected to the bus 104 via a communication controller 113 and plays the role of connecting the electronic device 101 to a communication line 115 by wire or wirelessly and provides a network interface layer to a TCP/IP communication protocol, which is the communication function of the operating system of the electronic device 101. The communication line 115 may be a wireless LAN environment based on a wireless LAN connection standard, a WiFi wireless LAN environment, such as IEEE802.11a/b/g/n, or a mobile phone network environment (for example, a 3G or 4G environment).

FIG. 1B is a diagram showing an example of the electronic device, such as a tablet computer, a smartphone, a mobile phone, a personal digital assistant (PDA), a medical tablet, a game tablet, a car navigation system, a portable navigation system, or a multimedia kiosk.

In an electronic device 121 shown in FIG. 1B, a CPU 122, a main memory 123, a bus 124, a display controller 125, a display 126, a disk (SSD) 128, a communication controller 133, a communication interface 134, and a communication line 135 correspond to the CPU 102, the main memory 103, the bus 104, the display controller 105, the display 106, the disk 108, the communication controller 113, the communication interface 114, and the communication line 115 of the electronic device 101 shown in FIG. 1A, respectively.

For a tablet computer or the like, an example of the CPU 122 may include a CPU for a smartphone, a mobile phone, or a tablet computer, or an A series processor of Apple, Inc.

The disk 128 may store a smartphone OS (for example, an Android® OS, a Windows® phone OS, a Windows® OS, and an iOS), an application program according to an embodiment of the present invention, other programs, and data, all of which may be loaded into the main memory 123.

Keyboard implementation means 130 displays a software keyboard as an application on the display 126.

FIGS. 2A to 2E show prior art examples in which moving objects are moved or selected.

FIG. 2A shows a prior art example in which the user wants to select an icon distant from the present position of a mouse cursor (a moving object) on a wide-type liquid crystal display by using a mouse.

Suppose that the user wants to select an icon 206 with a mouse. The present position of a mouse cursor 205 is distant from the target icon 206.

(A) To move the mouse cursor 205, the user moves the mouse on a mouse pad (first operation). As a result, the mouse cursor 205 moves (205-1). However, the mouse cursor 205 has not yet arrived at the target icon 206.

(B) The user again moves the mouse on the mouse pad (second operation). As a result, the mouse cursor 205 moves (205-2). However, the mouse cursor 205 has not yet arrived at the target icon 206.

(C) The user again moves the mouse on the mouse pad (third operation). As a result, the mouse cursor 205 moves (205-3) and arrives at the target icon 206.

(D) The mouse cursor 205 has arrived at the target icon 206.

As described above, in the example shown in FIG. 2A, the user can select the icon 206 by moving the mouse three times on the mouse pad.

Figure 2B:
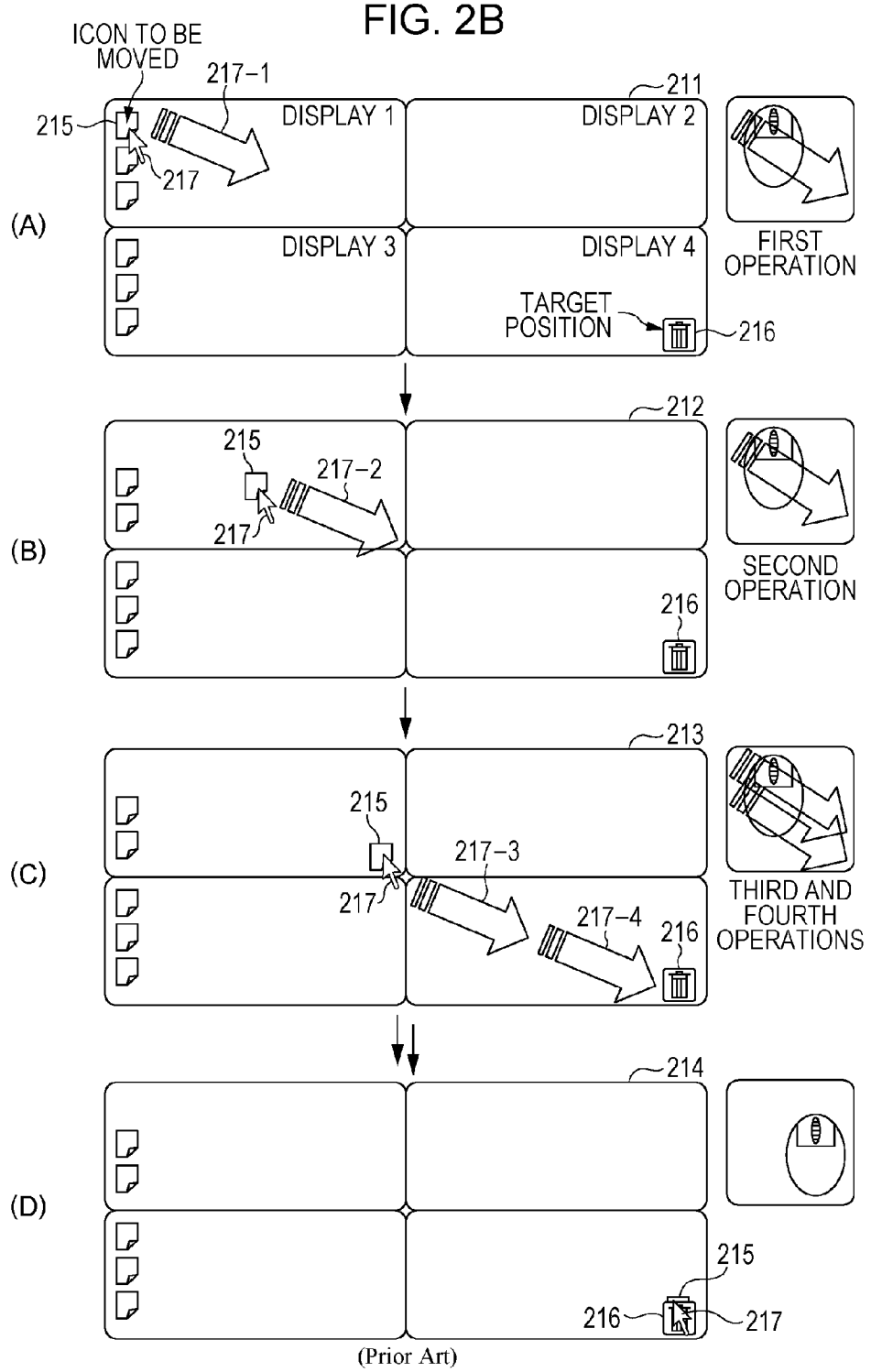
FIG. 2B is a diagram showing a prior art example in which the user wants to move a file icon (a moving object) to a trash-bin icon distant from the present position on a multi-display composed of four liquid crystal displays by using a mouse.

FIG. 2B shows a prior art example in which the user wants to move a file icon (a moving object) to a trash-bin icon distant from the present position on a multi-display composed of four liquid crystal displays by using a mouse.

Suppose that the user wants to move a file icon 215 to a trash-bin icon 216 on the multi-display. The present position of the file icon 215 is distant from the target trash-bin icon 216.

(A) To move the file icon 215 to the trash-bin icon 216, the user selects the file icon 215 with the mouse. A mouse cursor 217 is displayed on the file icon 215. The user moves the mouse on the mouse pad to drag the file icon 215 (first operation). As a result, the file icon 215 moves (217-1). However, the file icon 215 has not yet arrived at the target trash-bin icon 216.

(B) The user again moves the mouse on the mouse pad while dragging the file icon 215 with the mouse (second operation). As a result, the file icon 215 moves (217-2). However, the file icon 215 has not yet arrived at the target trash-bin icon 216 of the file icon 215.

(C) The user again moves the mouse on the mouse pad while dragging the file icon 215 with the mouse (third operation). As a result, the file icon 215 moves (217-3). However, the file icon 215 has not yet arrived at the target trash-bin icon 216. The user again moves the mouse on the mouse pad while dragging the file icon 215 with the mouse (fourth operation). The file icon 215 moves (217-4) and arrives at the trash-bin icon 216.

(D) The file icon 215 has entered the trash-bin icon 216.

As described above, in the example shown in FIG. 2B, the user can move the file icon 215 to the trash-bin icon 216 by moving the mouse four times on the mouse pad.

Figure 2C:
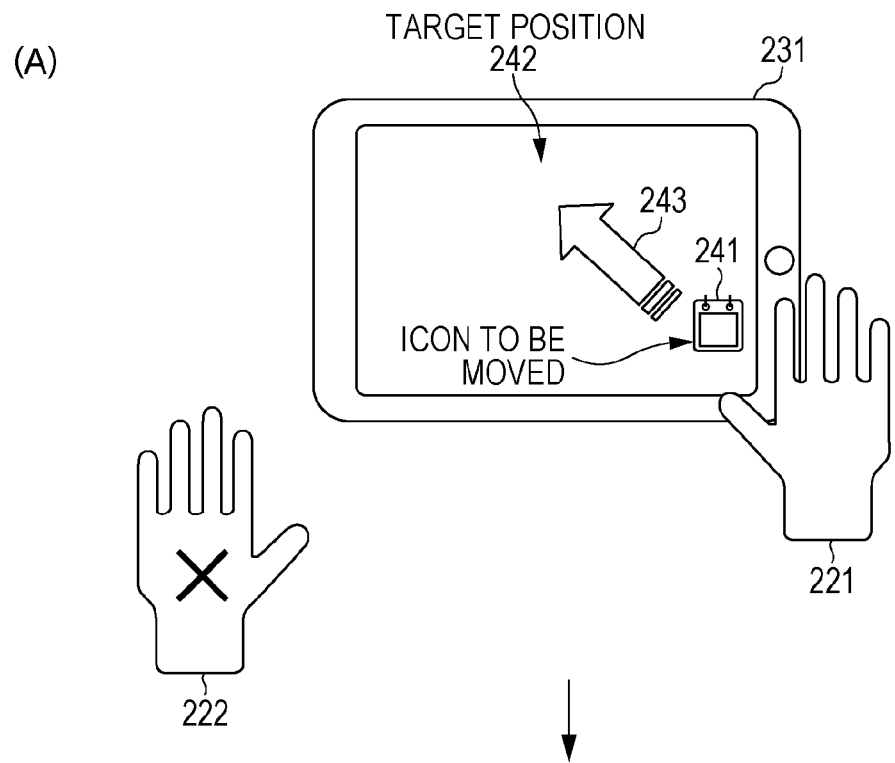
FIG. 2C is a diagram showing a prior art example in which the user holds a tablet computer with one hand and wants to move an icon on the display of the tablet computer to a position that a finger of the one hand cannot reach by using only the finger of the one hand.
Figure 2C:
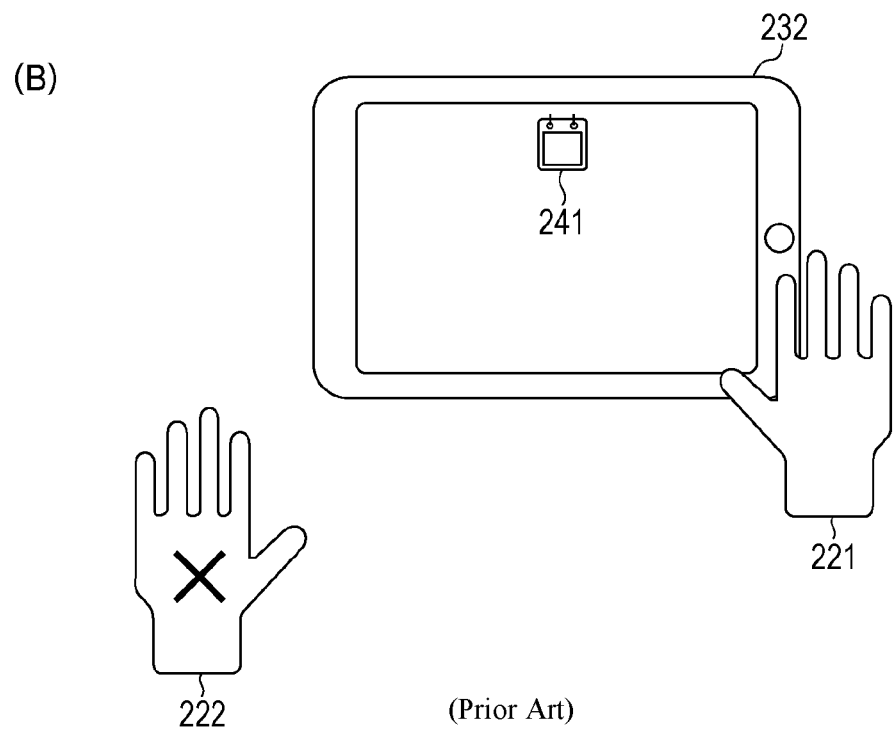

FIG. 2C shows a prior art example in which the user holds a tablet computer with one hand and wants to move an icon on the display of the tablet computer to a position that a finger of the one hand cannot reach by using only the finger of the one hand.

The user holds a tablet computer 231 with a right hand 221 because the user holds an item (i.e. baggage) with a left hand 222. Suppose that the user wants to move an icon 241 to an upper part 242 of the display screen by using only a finger of the right hand 221.

(A) To move the icon 241 to a target position 242, the user taps or double-taps the icon 241 with the forefinger or thumb of the right hand 221. However, the forefinger or thumb of the right hand 221 cannot reach the target position 242 of the icon 241 because the right hand 221 holds the tablet computer 231. Accordingly, the user cannot move the icon 241 to the target position 242 while holding the tablet computer 231.

Thus, the user temporarily sets down the item in the left hand 222 and holds the tablet computer 231 with the left hand 222 and taps or double-taps the icon 241 with the forefinger or thumb of the right hand 221 and drags the forefinger or thumb to the target position 242 of the icon 241 without holding the tablet computer 231 with the right hand 221.

(B) The icon 241 has been moved to the target position 242 of the icon 241.

As described above, in the example shown in FIG. 2C, the user can move the icon 241 through the action of temporarily placing the baggage held by the left hand 222.

Figure 2D:
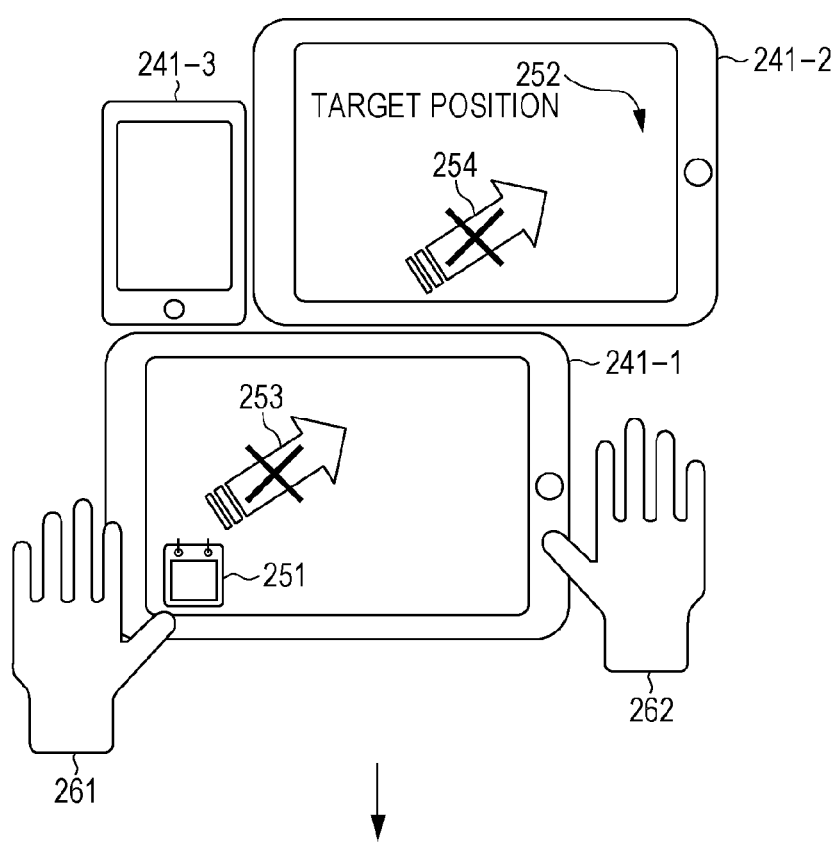
FIG. 2D is a diagram showing a prior art example in which the user holds a tablet computer, which is one of three tablet computers whose display screens constitute a single display screen (a multi-display), and wants to move an icon on the one tablet computer onto another tablet computer by using only a finger of one hand.
Figure 2D:
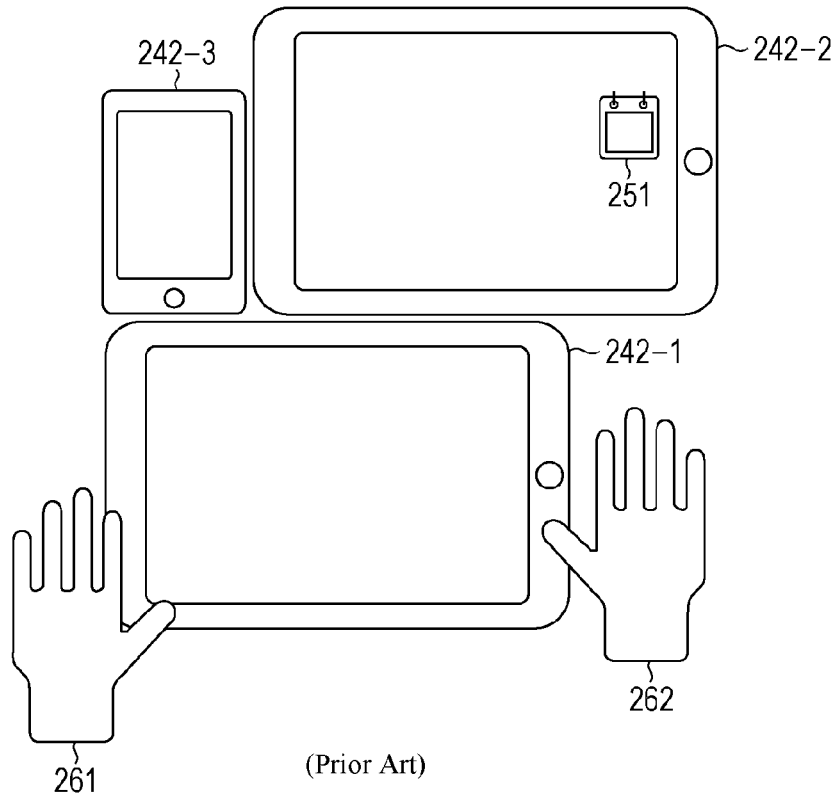

FIG. 2D shows a prior art example in which the user holds a tablet computer, which is one of three tablet computers whose display screens constitute a single display screen (a multi-display), and wants to move an icon on the one tablet computer onto another tablet computer by using only a finger of one hand. "Pinch," is an example of a method for implementing a multi-display on a plurality of tablet computers or smartphones.

The user uses the display screens of a first tablet computer 241-1, a second tablet computer 241-2, and a smartphone 241-3 as a multi-display. The user needs to operate the first tablet computer 241-1 while holding the first tablet computer 241-1 with both hands because of its heavy weight.

Suppose that the user wants to move an icon 251 displayed at the lower left of the display screen of the first tablet computer 241-1 to a target position 252 at the upper right of the second tablet computer 241-2.

(A) To move the icon 251 to the target position 252, the user taps or double-taps the icon 251 with the forefinger or thumb of a left hand 261. However, the forefinger or thumb of the left hand 261 cannot reach the target position 252 of the icon 251 because the left hand 261 holds the tablet computer 241-1. Accordingly, the user cannot move the icon 251 to the target position of the icon 251 while holding the tablet computer 241-1 (253 and 254).

Thus, the user temporarily places the tablet computer 241-1 on a desk, taps or double-taps the icon 251 with the forefinger or thumb of a right hand 262, and drags the forefinger or thumb to the target position 252 of the icon 251.

(B) The icon 251 has been moved to the target position 252 of the icon 251.

As described above, in the example shown in FIG. 2D, the user can move the icon 251 through the action of temporarily placing the tablet computer 241-1 on a desk.

Figure 2E:
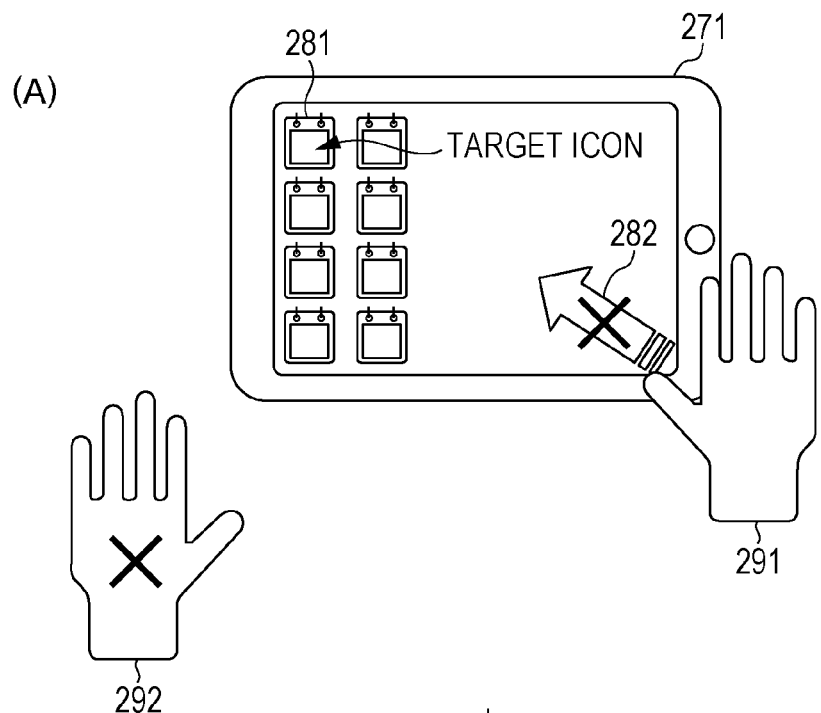
FIG. 2E is a diagram showing a prior art example in which the user holds a tablet computer with one hand and wants to select an icon located at a position on the display of the tablet computer that a finger of the one hand cannot reach by using only the finger of the one hand.
Figure 2E:
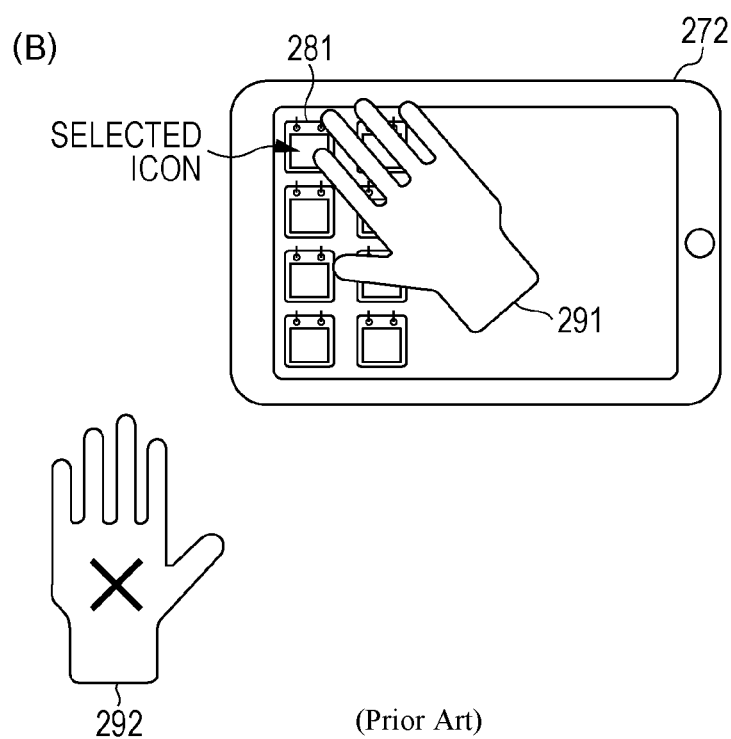

FIG. 2E shows a prior art example in which the user holds a tablet computer with one hand and wants to select an icon located at a position on the display of the tablet computer that a finger of the one hand cannot reach by using only the finger of the one hand.

The user holds a tablet computer 271 with a right hand 291 because the user grasps a strap with a left hand 292. Suppose that the user wants to select an icon 281 at the upper left by using only a finger of the right hand 291.

(A) The forefinger or thumb of the right hand 291 cannot reach the target icon 281 because the user holds the tablet computer 271 with the right hand 291. Accordingly, the user cannot select the icon 281 while holding the tablet computer 271.

Thus, the user temporarily releases the strap grasped by the left hand 292 to hold the tablet computer 271 with the left hand 292 and taps or double-taps the icon 281 with the forefinger or thumb of the right hand 291 without holding the tablet computer 271 with the right hand 291.

(B) The icon 281 has been selected with the forefinger or thumb of the right hand 291.

As described above, in the example shown in FIG. 2E, the user can select the icon 281 through the action of temporarily releasing the strap grasped by the left hand 292.

FIGS. 3A to 3C, FIGS. 3D and 3E, FIGS. 4A and 4B, FIGS. 5A and 5B, FIGS. 6A and 6B, FIG. 6C, FIG. 6D, FIGS. 7A and 7B, and FIGS. 8A and 8B show a method for moving a moving object displayed on a display screen according to an embodiment of the present invention. Note that this embodiment is merely an example and that the present invention is not limited to the method for manipulating the mouse and the method for operating the tablet computer of this embodiment. Those skilled in the art can appropriately change the method for manipulating the mouse and the method for operating the tablet computer in accordance with embodiments of the present invention.

FIGS. 3A and 3B show an example in which the user selects an icon distant from the present position of a mouse cursor (a moving object) on a wide-type liquid crystal display by using a mouse according to an embodiment of the present invention.

Suppose that the user wants to select an icon 312 with a mouse. The present position of a mouse cursor 311 is distant from the target icon 312.

(A) The user presses the left button of the mouse (321). The electronic device 101 receives the detection of press of the mouse.

(B) The user is pressing the left button of the mouse (322). In response to the reception of detection of the press, the electronic device 101 displays a frame 313 on or in the vicinity of the frame of the display screen. The frame 313 corresponds to a reduced or substantially reduced shape of the frame of the display screen, for example, a rectangle. The shape corresponding to a reduced or substantially reduced shape of the frame of the display screen can be a shape corresponding to the outer periphery of the display screen. The frame 313 need not correspond to the shape of the frame of the display screen and may be a frame of any shape, for example, a circular frame (see FIG. 6A), a substantially circular frame, an elliptical frame, or a substantially elliptical frame. In one embodiment of the present invention, the shape of the frame may be of any geometric shape, including, but not limited to, a square, a rectangle, a circle, and an ellipse.

In response to the reception of detection of the press, the electronic device 101 displays a small circle 314 with its origin at the position of the mouse cursor 311 when receiving the detection of the press. The small circle 314 may have such a size that the mouse only needs to be moved a little, for example, a size that the mouse cursor 311 can pass through the circumference of the small circle 314 by one movement on the mouse pad.

After displaying the frame 313 on or in the vicinity of the frame of the display screen, the electronic device 101 automatically moves the frame 313 to the inside of the display screen (313-a, 313-b, 313-c, and 313-d). The electronic device 101 moves the frame 313 so as to converge to the origin at the position of the mouse cursor 311 when receiving the detection of the press. The electronic device 101 can increase the moving speed of the frame 313, for example, with acceleration, as the frame 313 moves inward. Alternatively, the electronic device 101 can increase, decrease, or stop the movement of the frame 313 by, for example, a user's mouse or keyboard operation. As the frame 313 is moved inward, the frame 313 is gradually reduced. Alternatively, the user manually moves the frame 313 displayed on or in the vicinity of the frame of the display screen so as to be superposed on the target icon 312 by sliding the wheel button of the mouse back and forth. For example, the user can move the frame 313 to reduce it by sliding the wheel button backward and can move the frame 313 to enlarge it by sliding the wheel button forward. The electronic device 101 can move the frame 313 while reducing or enlarging it in response to a user's mouse operation.

(C) In response to that the frame 313 is present on the target icon 312 (that is, the frame 313 is superposed on the target icon 312) (313-1), the user releases the left button of the mouse (323). If the frame 313 is reduced past the target icon 312 while the electronic device 101 is automatically moving the frame 313 inward, the user can enlarge the frame 313 to superpose it on the target icon 312 by sliding the wheel button of the mouse forward while pressing the left button of the mouse.

(D) To determine the target position of the mouse cursor 311, the user again presses the left button of the mouse and moves the mouse cursor 311 in the small circle 314 while pressing the left button of the mouse. In response to the left button of the mouse being pressed and the mouse cursor 311 moving in the small circle 314 (324), the electronic device 101 obtains a half-line 315-1 connecting an end point at the origin and the present position of the mouse cursor 311. The electronic device 101 may display the half-line 315-1 on the display. The electronic device 101 further obtains the intersection 316-1 of the half-line 315-1 and the frame 313-1. The electronic device 101 may display a description for identifying the intersection 316-1 on the display. The description may be a sign with which the user can easily perceive the intersection 316-1 as a target position candidate, for example, an icon indicating the intersection. However, if the half-line 315-1 is displayed on the display, the electronic device 101 need not necessarily display the description for identifying the intersection 316-1 on the display. This is because a point at which the half-line 315-1 and the frame 313-1 intersect is the intersection 316-1.

(E) Since the intersection 316-1 is not present on the target icon 312, the user again moves the mouse cursor 311 in the small circle 314 while pressing the left button of the mouse. In response to that the left button of the mouse is being pressed and that the mouse cursor 311 moves in the small circle 314 (325), the electronic device 101 displays a half-line 315-2 connecting the end point at the origin and the present position of the mouse cursor 311. The electronic device 101 further obtains the intersection 316-2 of the half-line 315-2 and the frame 313-1. The electronic device 101 may display a sign with which the user can easily perceive the intersection 316-2 as a candidate target position.

(F) Since the intersection 316-2 is not present on the target icon 312, the user again moves the mouse cursor 311 in the small circle 314 while pressing the left button of the mouse. In response to that the left button of the mouse is being pressed and that the mouse cursor 311 moves in the small circle 314 (326), the electronic device 101 displays a half-line 315-3 connecting the end point at the origin and the present position of the target position of the mouse cursor 311. The electronic device 101 further obtains the intersection 316-3 of the half-line 315-3 and the frame 313-1. The electronic device 101 may display a sign with which the user can easily perceive the intersection 316-3 as a target position candidate.

(G) Since the intersection 316-3 is present on the target icon 312 (that is, the intersection 316-3 is superposed on the icon 312), the user moves the mouse cursor 311 along the half-line 315-3 while pressing the left button of the mouse (327) so as to pass over the frame (that is, the circumference) of the small circle 314. The electronic device 101 detects the passage of the mouse cursor 311 over the circumference as the mouse moves.

In response to the detection of passage of the mouse cursor 311 over the circumference, the electronic device 101 moves the mouse cursor 311 so as to jump to the intersection 316-3 or the intersection of the half-line and the frame 313-1 when the mouse cursor 311 passes over the circumference. Alternatively, in response to the detection of passage of the mouse cursor 311 over the circumference, the electronic device 101 may move the mouse cursor 311 gradually or with acceleration to the intersection 316-3 (for example, while showing the locus of the mouse cursor 311) or moves the mouse cursor 311 gradually or with acceleration to the intersection of the half-line and the frame 313-1 when the mouse cursor 311 passes over the circumference (for example, while showing the locus of the mouse cursor 311).

(H) The electronic device 101 displays the mouse cursor 311 on the icon 312. The electronic device 101 erases the small circle 314, the frame 313-1, and the half-line 315-3 from the display screen.

In response to the mouse cursor 311 moving to the intersection 316-3 or the intersection of the half-line and the frame 313-1 when the mouse cursor 311 passes over the circumference, the user releases the left button of the mouse (328).

As described above, in the embodiment shown in FIGS. 3A and 3B, the user can accurately and efficiently select an icon distant from the present position of the mouse cursor.

Figure 3C:
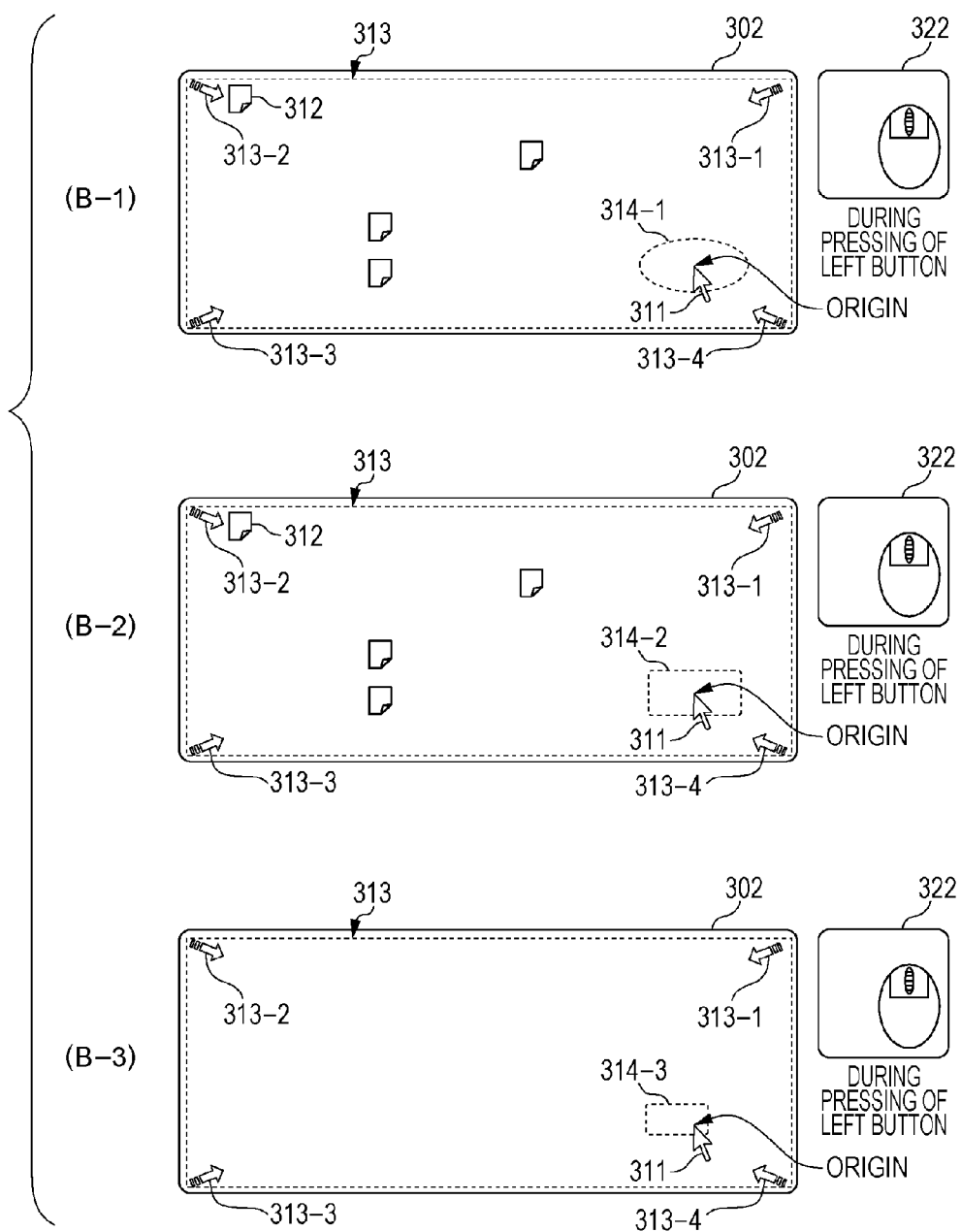
FIG. 3C is a diagram showing different examples of the frame displayed so as to converge to the origin at the position of the present position of the object in the embodiment of the present invention shown in FIGS. 3A and 3B.

FIG. 3C shows an embodiment of the frame 313, which is different from that shown in FIG. 3A.

(B-1) In response to the reception of detection of the press of the left button of the mouse, the electronic device 101 displays an ellipse 314-1 with its origin at the position of the mouse cursor 311 when receiving the detection of the press. The ellipse 314-1 may have such a size that the mouse only needs to be moved a little, for example, a size that the mouse cursor 311 can pass over the circumference of the ellipse 314-1 by one movement on the mouse pad.

(B-2) In response to the reception of detection of the press of the left button of the mouse, the electronic device 101 displays a rectangle 314-2 with its origin at the position of the mouse cursor 311 when receiving the detection of the press. The rectangle 314-2 need not correspond to the rectangular shape of the frame of the display screen. The rectangle 314-2 may have such a size that the mouse only needs to be moved a little, for example, a size that the mouse cursor 311 can pass through the circumference of the rectangle 314-2 by one movement on the mouse pad.

(B-3) In response to the reception of detection of the press of the left button of the mouse, the electronic device 101 displays a rectangle 314-3. The rectangle 314-3 corresponds to the rectangular shape of the frame 313 (that is, a reduced-size display). The present position (the origin) of the mouse cursor 311 in the rectangle 314-3 corresponds to the present position of the mouse cursor 311 in the frame 313. Alternatively, the rectangle 314-3 may correspond to the rectangular shape of the display screen (that is, a reduced-size display), and the present position (the origin) of the mouse cursor 311 in the rectangle 314-3 corresponds to the present position of the mouse cursor 311 in the display screen. The rectangle 314-3 may have such a size that the mouse only needs to be moved a little, for example, a size that the mouse cursor 311 can pass over the circumference of the rectangle 314-3 by one movement on the mouse pad.

FIGS. 3D and 3E show an example in which the user selects an icon distant from the present position of a mouse cursor (a moving object) on a wide-type liquid crystal display by using a mouse according to an embodiment of the present invention.

Suppose that the user wants to select an icon 352 with a mouse. The present position of a mouse cursor 351 is distant from the target icon 352.

(A) The user presses the left button of the mouse (361). The electronic device 101 receives the detection of press of the mouse.

(B) The user is pressing the left button of the mouse (362). In response to the reception of the detection of the press, the electronic device 101 displays a frame 353 on or in the vicinity of the frame of the display screen. The frame 353 corresponds to a reduced or substantially reduced shape of the frame of the display screen, for example, a rectangle. The frame 353 need not correspond to the shape of the frame of the display screen and may be a frame of any shape, for example, a circular frame (see FIG. 6A), a substantially circular frame, an elliptical frame, or a substantially elliptical frame.

After displaying the frame 353 on or in the vicinity of the frame of the display screen, the electronic device 101 automatically moves the frame 353 to the inside of the display screen (353-*a*, 353-*b*, 353-*c*, and 353-*d*). The electronic device 101 moves the frame 353 so as to converge to the origin at the position of the mouse cursor 351 when receiving the detection of the press. The electronic device 101 can increase the moving speed of the frame 353, for example, with acceleration, as the frame 353 moves inward. Alternatively, the electronic device 101 may increase, decrease, or stop the movement of the frame 353 by, for example, a user's mouse or keyboard operation. As the frame 353 is moved inward, the frame 353 is gradually reduced. Alternatively, the user may manually move the frame 353 displayed on or in the vicinity of the frame of the display screen so as to be superposed on the target icon 352 by sliding the wheel button of the mouse back and forth. For example, the user may move the frame 353 while reducing it by sliding the wheel button backward, and may move the frame 353 while enlarging it by sliding the wheel button forward. In this manner, the electronic device 101 may move the frame 353 while reducing or enlarging it in response to a user's mouse operation.

(C) In response to that the frame 353 is present on the target icon 352 (that is, the frame 353 is superposed on the target icon 352) (353-1), the user releases the left button of the mouse (363). If the frame 353 is reduced past the target icon 352 while the electronic device 101 is automatically moving the frame 353 inward, the user can move the frame 353 while enlarging it onto the target icon 352 by sliding the wheel button of the mouse forward while pressing the left button of the mouse.

(D) To determine the target position of the mouse cursor 351, the user again presses the left button of the mouse and moves the mouse cursor 351 in the vicinity of the origin while pressing the left button of the mouse. The vicinity may be a distance in which the mouse only needs to be moved a little, for example, a distance that the mouse cursor 351 can move in the vicinity by one movement on the mouse pad. For example, the vicinity may correspond to the area of the small circle 314 shown in FIG. 3A. In response to that the left button of the mouse is being pressed and that the mouse cursor 351 moves in the vicinity, the electronic device 101 obtains a half-line 355-1 connecting an end point at the origin and the present position of the mouse cursor 351. The electronic device 101 may display the half-line 355-1 on the display. The electronic device 101 further obtains the intersection 356-1 of the half-line 355-1 and the frame 353-1. The electronic device 101 may display a description for identifying the intersection 356-1 on the display. The description may be a sign with which the user can easily perceive the intersection 356-1 as a target position candidate, for example, an icon indicating the intersection. However, if the half-line 355-1 is displayed on the display, the electronic device 101 need not necessarily display the description for identifying the intersection 356-1 on the display. This is because a point at which the half-line 355-1 and the frame 353-1 intersect is the intersection 356-1.

(E) Since the intersection 356-1 is not present on the target icon 352, the user again moves the mouse cursor 351 in the vicinity described above while pressing the left button of the mouse. In response to the left button of the mouse being pressed and the mouse cursor 351 moving in the vicinity (365), the electronic device 101 displays a half-line 355-2 connecting the end point at the origin and the present position of the mouse cursor 351. The electronic device 101 further obtains the intersection 356-2 of the half-line 355-2 and the frame 353-1. The electronic device 101 may display a sign with which the user can easily perceive the intersection 356-2 as a candidate target position.

(F) Since the intersection 356-2 is not present on the target icon 352, the user again moves the mouse cursor 351 in the vicinity while pressing the left button of the mouse. In response to the left button of the mouse being pressed and the mouse cursor 351 moving in the vicinity (366), the electronic device 101 displays a half-line 355-3 connecting the end point at the origin and the present position of the mouse cursor 351. The electronic device 101 further obtains the intersection 356-3 of the half-line 355-3 and the frame 353-1. The electronic device 101 may display a sign with which the user can easily perceive the intersection 356-3 as a target position candidate.

(G) Since the intersection 356-3 is present on the target icon 352 (that is, the intersection 356-3 is superposed on the icon 352), the user moves the mouse cursor 351 along the half-line 355-3 (367) with acceleration. The electronic device 101 can detect that the mouse cursor 351 has moved a fixed distance with acceleration, for example, a distance corresponding to a fixed number of pixels.

In response to the detection of the accelerated movement of the mouse cursor 351 by a fixed distance, the electronic device 101 moves the mouse cursor 351 so as to jump to the intersection 356-3. For example, in response to the detection of the accelerated movement of the mouse cursor 351 by a fixed distance, the electronic device 101 moves the mouse cursor 351 gradually or with acceleration to the intersection 356-3 (for example, while showing the locus of the mouse cursor 351).

Alternatively, the electronic device 101 may determine whether the mouse cursor 351 has moved at a predetermined acceleration or higher.

In response to the detection of movement of the mouse cursor 351 at the predetermined acceleration or higher, the electronic device 101 moves the mouse cursor 351 so as to jump to the intersection 356-3.

Alternatively, since the intersection 356-3 is present on the target icon 352 (that is, the intersection 356-3 is interposed on the target icon 352), the user may perform a specific mouse operation (for example, pressing a specific button) or a specific keyboard operation (for example, pressing a specific function key). The electronic device 101 can detect the user's specific operation.

In response to the detection of the specific operation, the electronic device 101 moves the mouse cursor 351 so as to jump to the intersection 356-3.

In response to the detection of the accelerated movement of the mouse cursor 351 by a fixed distance or in response to the detection of the user's specific operation, the electronic device 101 moves the mouse cursor 351 so as to jump to the intersection 356-3. For example, in response to the detection of the accelerated movement of the mouse cursor 351 by a fixed distance or in response to the detection of the user's specific operation, the electronic device 101 moves the mouse cursor 351 gradually or with acceleration to the intersection 356-3 (for example, while showing the locus of the mouse cursor 351).

(H) The electronic device 101 displays the mouse cursor 351 on the icon 352. The electronic device 101 erases the frame 353-1 and the half-line 355-3 from the display screen.

In response to that the mouse cursor 351 has moved to the intersection 356-3, the user releases the left button of the mouse (368).

As described above, in the embodiment shown in FIGS. 3D and 3E, the user can accurately and efficiently select an icon distant from the present position of the mouse cursor.

Figure 4A:
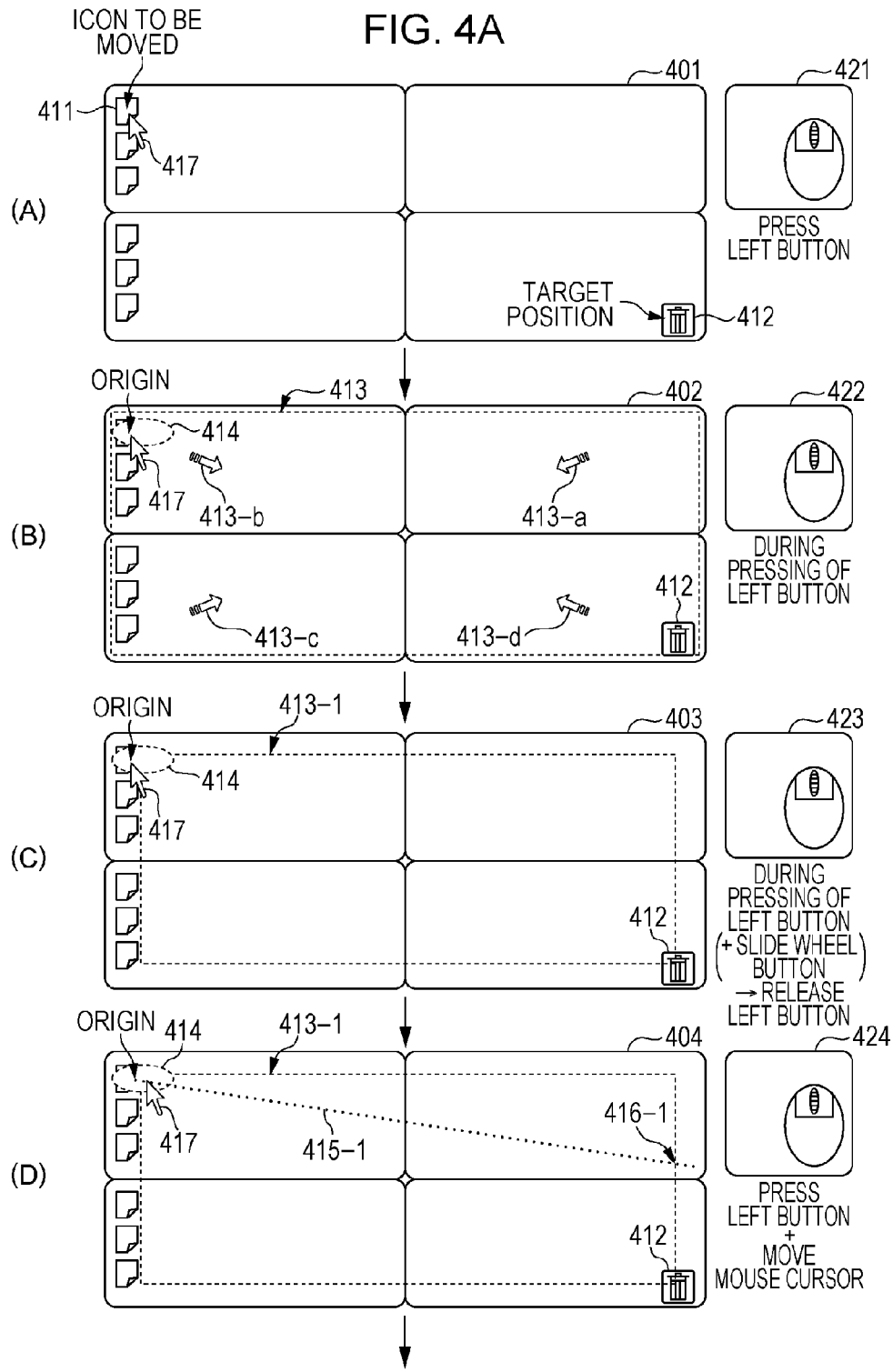
FIG. 4A is a diagram showing an example in which the user moves an icon (a moving object) under a mouse cursor to a trash bin distant from the mouse cursor on a multi-display composed of four liquid crystal displays with a mouse according to an embodiment of the present invention.

FIGS. 4A and 4B show an example in which the user moves an icon (a moving object) under a mouse cursor to a trash bin distant from the mouse cursor on a multi-display composed of four liquid crystal displays with a mouse according to an embodiment of the present invention.

Suppose that the user wants to move a file icon 411 to a trash-bin icon 412 on the multi-display. The present position of the file icon 411 is distant from the trash-bin icon 412.

(A) The user presses the left button of the mouse (421). The electronic device 101 receives the detection of press of the mouse.

(B) The user is pressing the left button of the mouse (422). In response to the reception of detection of the press, the electronic device 101 displays a frame 413 on or in the vicinity of the frame of the display screen. The frame 413 corresponds to a reduced or substantially reduced shape of the frame of the display screen, for example, a rectangle. The frame 413 need not correspond to the shape of the frame of the display screen and may be a frame of any shape, for example, a circular frame (see FIG. 6A), a substantially circular frame, an elliptical frame, or a substantially elliptical frame.

In response to the reception of detection of the press, the electronic device 101 displays an ellipse 414 (a horizontally long ellipse) with its origin at the position of a mouse cursor 417 when receiving the detection of the press. The ellipse 414 may have such a size that the mouse only needs to be moved a little, for example, a size that the mouse cursor 417 can pass over the circumference of the ellipse 414 by one movement on the mouse pad.

After displaying the frame 413 on or in the vicinity of the frame of the display screen, the electronic device 101 automatically moves the frame 413 to the inside of the display screen (413-a, 413-b, 413-c, and 413-d). The electronic device 101 moves the frame 413 so as to converge to the origin at the position of the mouse cursor 417 when receiving the detection of the press. The electronic device 101 can increase the moving speed of the frame 413, for example, with acceleration, as the frame 413 moves inward. Alternatively, the electronic device 101 may increase, decrease, or stop the movement of the frame 413 by, for example, a user's mouse or keyboard operation. As the frame 413 is moved inward, the frame 413 is gradually reduced. Alternatively, the user may manually move the frame 413 displayed on or in the vicinity of the frame of the display screen so as to be superposed on the trash-bin icon 412, which is the target position of the file icon 411, by sliding the wheel button of the mouse back and forth. The user can move the frame 413 while reducing it by, for example, sliding the wheel button backward and can move the frame 413 while enlarging it by sliding the wheel button forward. In this manner, the electronic device 101 can move the frame 413 while reducing or enlarging it in response to a user's mouse operation.

(C) In response to the frame 413 being superposed on the trash-bin icon 412, which is the target position of the file icon 411 (413-1), the user releases the left button of the mouse (423). If the frame 413 is reduced past the trash-bin icon 412, which is the target position of the file icon 411, while the electronic device 101 is automatically moving the frame 413 inward, the user can move the frame 413 while enlarging it onto the trash-bin icon 412, which is the target position of the file icon 411, by sliding the wheel button of the mouse forward while pressing the left button of the mouse.

(D) To determine the target position of the file icon 411, the user again presses the left button of the mouse and moves the mouse cursor 417 in the ellipse 414 while pressing the left button of the mouse. In response to the left button of the mouse being pressed and the mouse cursor 411 moving in the ellipse 414 (424), the electronic device 101 obtains a half-line 415-1 connecting an end point at the origin and the present position of the mouse cursor 417. The electronic device 101 may display the half-line 415-1 on the display. The electronic device 101 further obtains the intersection 416-1 of the half-line 415-1 and the frame 413-1. The electronic device 101 may display a description for identifying the intersection 416-1 on the display. The description may be a sign with which the user can easily perceive the intersection 416-1 as a target position candidate, for example, an icon indicating the intersection. However, if the half-line 415-1 is displayed on the display, the electronic device 101 need not necessarily display the description for identifying the intersection 416-1 on the display. This is because a point at which the half-line 415-1 and the frame 413-1 intersect is the intersection 416-1.

(E) Since the intersection 416-1 is not present on the trash-bin icon 412, which is the target position of the file icon 411, the user again moves the mouse cursor 417 in the ellipse 414 while pressing the left button of the mouse. In response to the left button of the mouse being pressed and the mouse cursor 417 moving in the ellipse 414 (425), the electronic device 101 displays a half-line 415-2 connecting the end point at the origin and the present position of the mouse cursor 417. The electronic device 101 further obtains the intersection 416-2 of the half-line 415-2 and the frame 413-1. The electronic device 101 may display a sign with which the user can easily perceive the intersection 416-2 as a candidate target position.

(F) Since the intersection 416-2 is not present on the trash-bin icon 412, which is the target position of the file icon 411, the user again moves the mouse cursor 417 in the ellipse 414 while pressing the left button of the mouse. In response to the left button of the mouse being pressed and the mouse cursor 417 moving in the ellipse 414 (426), the electronic device 101 displays a half-line 415-3 connecting the end point at the origin and the present position of the mouse cursor 417. The electronic device 101 further obtains the intersection 416-3 of the half-line 415-3 and the frame 413-1. The electronic device 101 may display a sign with which the user can easily perceive the intersection 416-3 as a target position candidate.

(G) Since the intersection 416-3 is present on the trash-bin icon 412, which is the target position of the file icon 411, (that is, the intersection 416-3 is superposed on the trash-bin icon 412, which is the target position of the file icon 411), the user moves the mouse cursor 417 along the half-line 415-3 so as to pass over the frame of the ellipse 414 (that is, the circumference of the ellipse 414) while pressing the left button of the mouse (427). The electronic device 101 detects the passage of the mouse cursor 417 over the circumference of the ellipse 414 as the mouse moves.

In response to the detection of passage of the mouse cursor 417 over the circumference of the ellipse 414, the electronic device 101 moves the mouse cursor 417 so as to jump to the intersection 316-3 or the intersection of a half-line and the frame 413-1. Alternatively, in response to the detection of passage of the mouse cursor 417 over the circumference of the ellipse 414, the electronic device 101 may move the mouse cursor 417 gradually or with acceleration to the intersection 416-3 (for example, while showing the locus of the mouse cursor 417) or to the intersection of a half-line and the frame 413-1 when the mouse cursor 417 passes over the circumference of the ellipse 414 (for example, while showing the locus of the mouse cursor 417).

(H) The electronic device 101 puts the file icon 411 into the trash-bin icon 412 (the file icon 411 is not actually viewed on the display screen). Since the mouse cursor 417 is superposed on the file icon 411, the electronic device 101 moves the mouse cursor 417 onto the trash-bin icon 412. The electronic device 101 erases the ellipse 414, the frame 413-1, and the half-line 415-3 from the display screen.

In response to the file icon being moved into the trash-bin icon, that is, in response to that the file icon has moved to the intersection or the intersection of a half-line and the frame when the file icon has passed over the circumference, the electronic device releases the left button of the mouse (428).

As described above, in the embodiment shown in FIGS. 4A and 4B, the user can accurately and efficiently move a file icon to a trash-bin icon distant from the present position of the file icon.

Figure 5B:
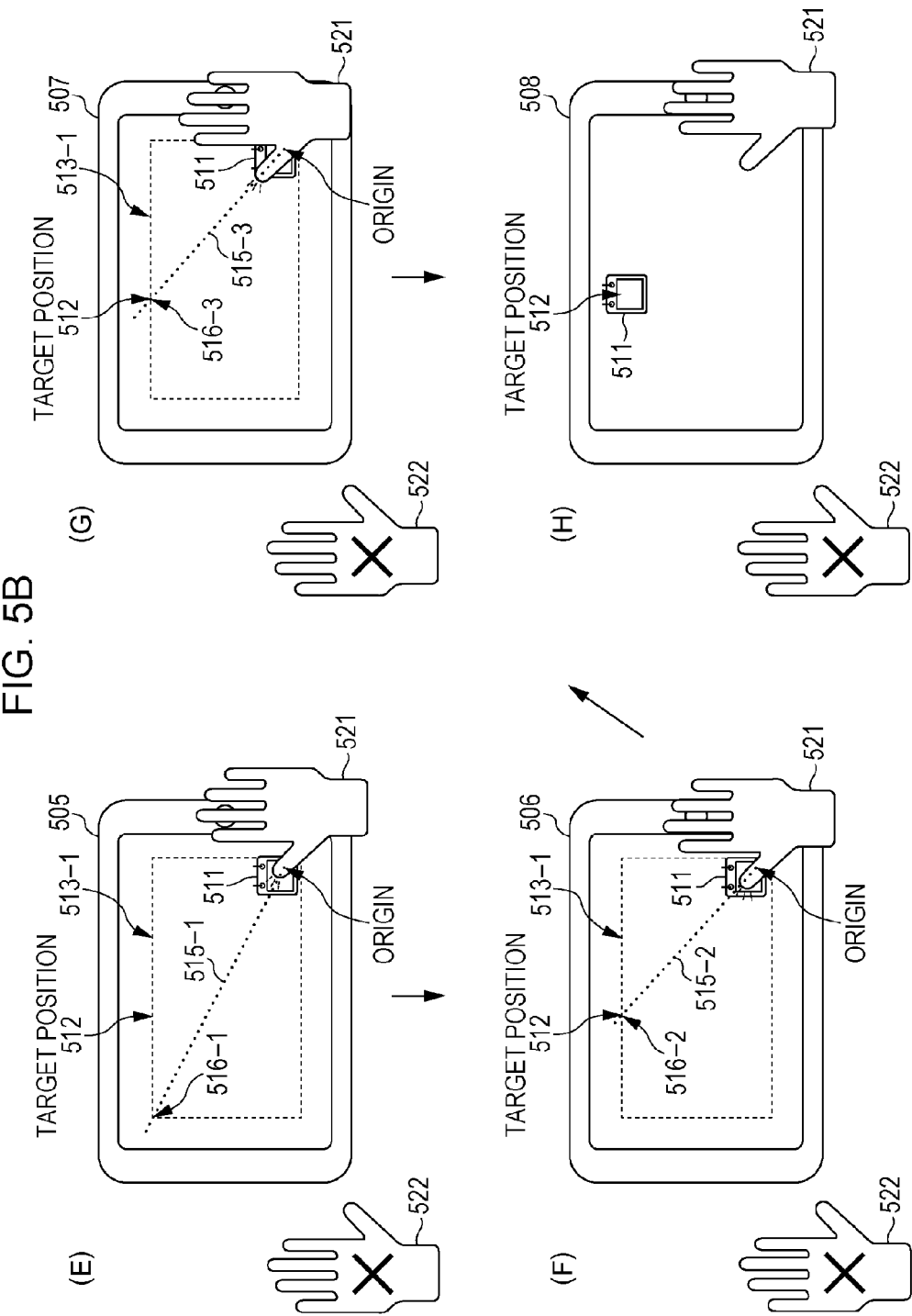
FIG. 5B is a diagram showing an example in which the user holds a tablet computer with one hand and moves an icon (a moving object) on the display of the tablet computer to a position that a finger of the one hand cannot reach by using only the finger of the one hand according to an embodiment of the present invention.

FIGS. 5A and 5B show an example in which the user holds a tablet computer (corresponding to an electronic device 121, thus, hereinafter also referred to as an electronic device 121) with one hand and moves an icon (a moving object) on the display of the tablet computer to a position that a finger of the one hand cannot reach by using only the finger of the one hand according to an embodiment of the present invention.

The user holds a tablet computer 501 with a right hand 521 because a left hand 522 is injured. Suppose that the user wants to move an icon 511 to an upper central portion 512 of the display screen.

(A) To move the icon 511 to the target position 512, the user taps or double-taps the icon 511 with the forefinger or thumb of the right hand 521.

(B) The user further holds (presses and holds) the icon 511. The electronic device 121 receives the detection of the hold.

(C) In response to the reception of detection of the hold, the electronic device 121 displays a frame 513 on or in the vicinity of the frame of the display screen. The frame 513 corresponds to a reduced or substantially reduced shape of the frame of the display screen, for example, a rectangle. The frame 513 need not correspond to the shape of the frame of the display screen and may be a frame of any shape, for example, a circular frame (see FIG. 6A), a substantially circular frame, an elliptical frame, or a substantially elliptical frame.

After displaying the frame 513 on or in the vicinity of the frame of the display screen, the electronic device 121 automatically moves the frame 513 to the inside of the display screen (513-*a*, 513-*b*, 513-*c*, and 513-*d*). The electronic device 121 moves the frame 513 so as to converge to the origin at the position of the forefinger or thumb when receiving the detection of the hold. The electronic device 121 can increase the moving speed of the frame 513, for example, with acceleration, as the frame 513 moves inward. Alternatively, the electronic device 121 may increase, decrease, or stop the movement of the frame 513 by, for example, a user's mouse or keyboard operation. As the frame 513 is moved inward, the frame 513 is gradually reduced. Alternatively, the user may manually move the frame 513 displayed on or in the vicinity of the frame of the display screen so as to be superposed on the target icon 512 by changing the strength of the hold (that is, the strength of pressure of the forefinger or thumb on the display screen). For example, the user can move the frame 513 while reducing it by increasing the strength of the hold and can move the frame 513 while enlarging it by decreasing the strength of the hold. In this manner, the electronic device 121 can move the frame 513 while reducing or enlarging it depending on the strength of the hold.

(D) In response to that the frame 513 is displayed on the target position 512 of the icon 511 (513-1), the user releases the forefinger or thumb from the display screen. If the frame 513 is reduced past the target position 512 of the icon 511 while the electronic device 121 is automatically moving the frame 513 inward, the user can move the frame 513 while enlarging it onto the target position 512 of the icon 511 by decreasing the strength of the hold.

(E) In response to the detection of the release, the electronic device 121 obtains a half-line 515-1 connecting an end point at the origin and a point on the frame 513-1, for example, farthest from the end point. The electronic device 121 may display the half-line 515-1 on the display. The electronic device 121 further obtains the intersection 516-1 of the half-line 515-1 and the frame 513-1. The electronic device 121 may display a description for identifying the intersection 516-1 on the display. The description may be a sign with which the user can easily perceive the intersection 516-1 as a target position candidate, for example, an icon indicating the intersection. However, if the half-line 515-1 is displayed on the display, the electronic device 121 need not necessarily display the description for identifying the intersection 516-1 on the display. This is because a point at which the half-line 515-1 and the frame 513-1 intersect is the intersection 516-1.

(F) Since the intersection 516-1 is not present on the target position 512 of the icon 511, the user again taps or double-taps the icon 511 and moves the icon 511 while holding it with the forefinger or thumb. In response to that the icon 511 is being held and moved (506), the electronic device 121 displays a half-line 515-2 connecting the end point at the origin and the present position of the forefinger or thumb. The electronic device 121 further obtains the intersection 516-2 of the half-line 515-2 and the frame 513-1. The electronic device 121 may display a sign with which the user can easily perceive the intersection 516-2 as a candidate target position.

(G) Since the intersection 516-2 is present on the target position 512 of the icon 511, the user releases the forefinger or thumb from the icon 511. Alternatively, since the intersection 516-2 is present on the target position 512 of the icon 511, the user moves the forefinger or thumb to the outside of the icon 511 while holding it.

In response to the detection of the release, the electronic device 121 moves the icon 511 so as to jump to the intersection 516-3. Alternatively, in response to the detection of the release, the electronic device 121 moves the icon 511 from the present position to the intersection 516-3 while displaying it.

(H) The electronic device 121 displays the icon 511 on the intersection 516-3. The electronic device 121 erases the frame 513-1 and the half-line 515-3 from the display screen.

As described above, in the embodiment shown in FIGS. 5A and 5B, the user can accurately and efficiently move an icon to a position that the forefinger or thumb cannot reach.

Figure 6A:
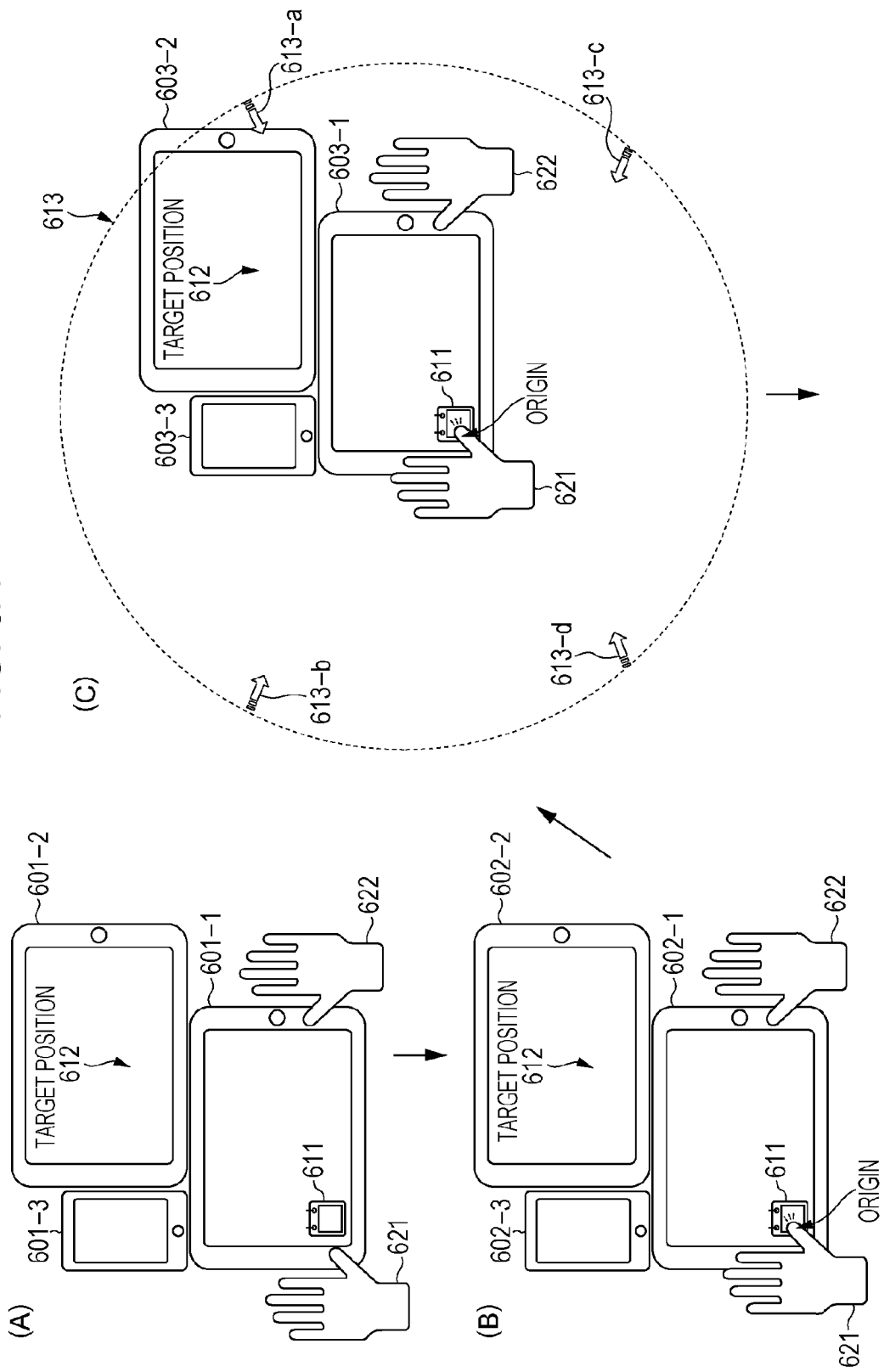
FIG. 6A is a diagram showing an example in which the user holds one of three tablet computers, which constitute a single display screen (a multi-display), with both hands and moves an icon on the table computer to another tablet computer only with a finger of one hand according to an embodiment of the present invention.

FIGS. 6A and 6B show an example in which the user holds one of three tablet computers (corresponding to the electronic device 121, thus, hereinafter also referred to as an electronic device 121), which constitute a single display screen (a multi-display), with both hands and moves an icon on the table computer to another tablet computer only with a finger of one hand according to an embodiment of the present invention.

The user uses the display screens of a first tablet computer 601-1, a second tablet computer 601-2, and a smartphone 601-3 as a multi-display. A technique for using the display screens of a plurality of devices as a multi-display is known to those skilled in the art, and thus, a description thereof will be omitted in this specification. The user needs to operate the first tablet computer 601-1 while holding it with both hands because of its heavy weight.

Suppose that the user wants to move an icon 611 displayed at the lower left of the first tablet computer 601-1 to the upper right (a target position) 612 of the second tablet computer 601-2. However, a left hand 621 holds the tablet computer 601-1 together with a right hand 622, so that the forefinger or thumb of the left hand 621 cannot reach the target position 612 of the icon 611.

(A) To move the icon 611 to the target position 612, the user taps or double-taps the icon 611 with the forefinger or thumb of the left hand 621.

(B) The user further holds (presses and holds) the icon 611. The electronic device 121 receives the detection of the hold.

(C) In response to the reception of detection of the hold, the electronic device 121 displays a circle (a frame) 613 with the position of the forefinger or thumb when receiving the detection of the hold as the origin so that the circumference is placed at a position farthest from the origin among the display screens of the first tablet computer 601-1, the second tablet computer 601-2, and the smartphone 601-3 (that is, so that at least one of the vertices of the display screens of the first tablet computer 601-1, the second tablet computer 601-2, and the smartphone 601-3 is included). The frame need not be circular but may be substantially circular, elliptical, or substantially elliptical. The frame may be a frame in which the frames of the display screens of the first tablet computer 601-1, the second tablet computer 601-2, and the smartphone 601-3 are connected into one outer periphery (see FIG. 6D).

After displaying the frame 613, the electronic device 121 automatically moves the frame 613 to the inside of the display screen (613-*a*, 613-*b*, 613-*c*, and 613-*d*). The electronic device 121 moves the frame 613 so as to converge to the origin at the position of the forefinger of thumb when receiving the detection of the hold. The electronic device 121 may increase the moving speed of the frame 613, for example, with acceleration, as the frame 613 moves inward. Alternatively, the electronic device 121 may increase, decrease, or stop the movement of the frame 613 by, for example, a user's mouse or keyboard operation. As the frame 613 is moved inward, the frame 613 is gradually reduced. Alternatively, the user may manually move the frame 613 so as to be displayed on the target position 612 of the icon 611 by changing the strength of the hold (that is, the strength of pressure of the forefinger or thumb on the display screen). For example, the user may move the frame 613 while reducing it by increasing the strength of the hold and may move the frame 613 while enlarging it by decreasing the strength of the hold. In this manner, the electronic device 121 can move the frame 613 while reducing or enlarging it depending on the strength of the hold.

(D) In response to that the frame 613 is displayed on the target position 612 of the icon 611 (613-1), the user releases the forefinger or thumb from the display screen. If the frame 613 is reduced past the target position 612 of the icon 611 while the electronic device 121 is automatically moving the frame 613 inward, the user may move the frame 613 while enlarging it onto the target position 612 of the icon 611 by decreasing the strength of the hold.

(E) In response to the detection of the release, the electronic device 121 obtains a half-line 615-1 connecting an end point at the origin and a point on the frame 613-1. The electronic device 121 may display the half-line 615-1 on the display. The electronic device 121 further obtains the intersection 616-1 of the half-line 615-1 and the frame 613-1. The electronic device 121 may display a description for identifying the intersection 616-1 on the display. The description may be a sign with which the user can easily perceive the intersection 616-1 as a target position candidate, for example, an icon indicating the intersection. However, if the half-line 615-1 is displayed on the display, the electronic device 121 need not necessarily display the description for identifying the intersection 616-1 on the display. This is because a point at which the half-line 615-1 and the frame 613-1 intersect is the intersection 616-1.

(F) Since the intersection 616-1 is not present on the target position 612 of the icon 611, the user again taps or double-taps the icon 611 and moves the icon 611 while holding it with the forefinger or thumb. In response to that the icon 611 is being held and moved (606-1), the electronic device 121 displays a half-line 615-2 connecting the end point at the origin and the present position of the forefinger or thumb. The electronic device 121 further obtains the intersection 616-2 of the half-line 615-2 and the frame 613-1. The electronic device 121 may display a sign with which the user can easily perceive the intersection 616-2 as a candidate target position.

Since the intersection 616-2 is present on the target position 612 of the icon 611, the user releases the forefinger or thumb from the icon 611.

In response to the detection of the release, the electronic device 121 moves the icon 611 so as to jump to the intersection 616-3. Alternatively, in response to the detection of the release, the electronic device 121 may move the icon 611 from the present position to the intersection 616-3 while displaying it. Alternatively, since the intersection 616-2 is present on the target position 612 of the icon 611, the user may move the forefinger or thumb to the outside of the icon 611 while holding it.

(G) In response to the detection of the release or movement of the forefinger or thumb to the outside of the icon 611, the electronic device 121 displays the icon 611 on the intersection 616-3. The electronic device 121 erases the frame 613-1 and the half-line 615-2 from the display screen.

As described above, in the embodiment shown in FIGS. 6A and 6B, the user can accurately and efficiently move an icon to a position that the forefinger or thumb cannot reach in a multi-display environment.

Figure 6C:
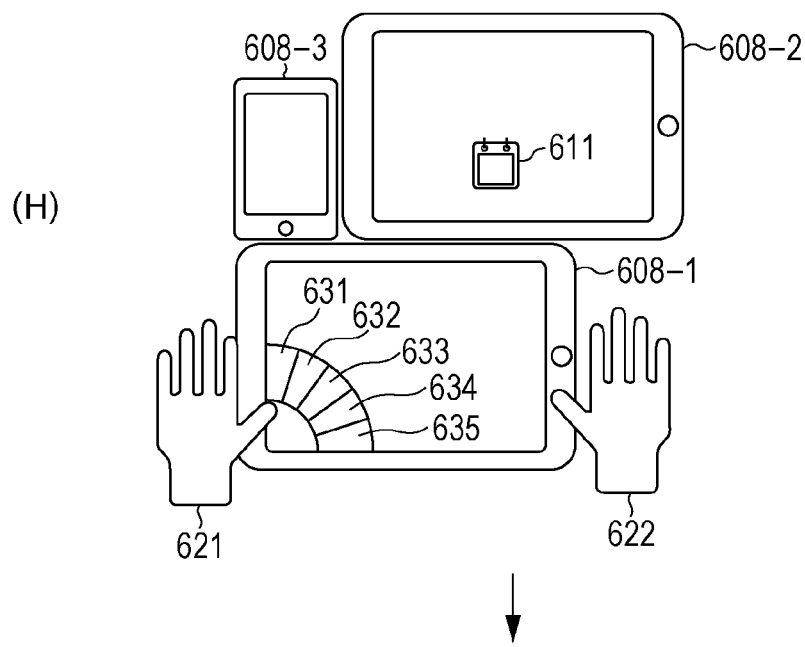
FIG. 6C is a diagram showing an example in which the user operates a moving object icon with a finger of one hand in the embodiment shown in FIGS. 6A and 6B.
Figure 6C:
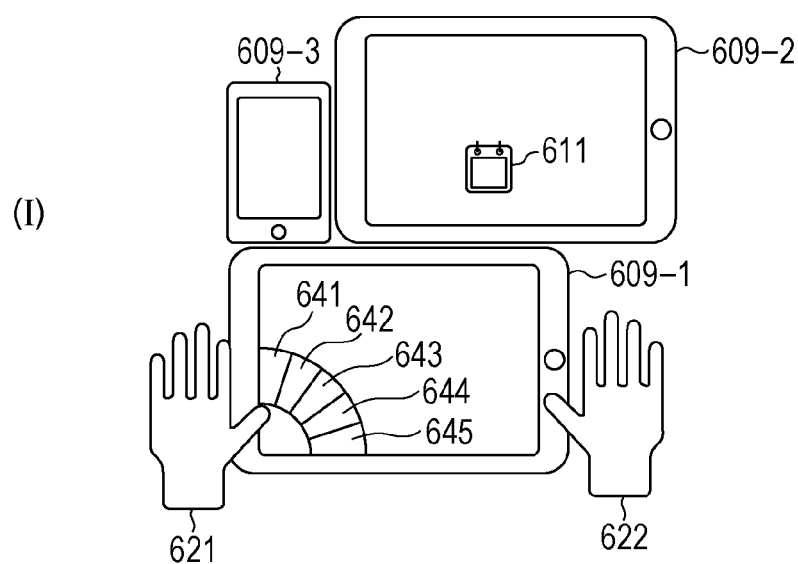

FIG. 6C shows an example in which the user operates a moving object icon with a finger of one hand in the embodiment shown in FIGS. 6A and 6B.

(H) The user taps or double-taps the display screen to call menus 631 to 635. In response to the tap or double-tap, the electronic device 121 displays the menus 631 to 635 on the display screen (608-1). The individual menus 631 to 635 correspond to icons to be operated. Suppose that the menu 632 is for operating an icon 611.

(I) The user taps or double-taps the menu 632. In response to the tap or double-tap on the menu 632, the electronic device 121 displays operation menus 641 to 645 for the icon 611 on the display screen (609-1). The individual operation menus 641 to 645 correspond to menus for operating the icon 611. Examples of the operation menus 641 to 645 include starting, updating, and deleting an application associated with the icon 611.

FIG. 6D shows another embodiment of the frame 613 shown in FIG. 6A.

Since the embodiment of FIG. 6D performs the same processes as in (A) and (B) of FIG. 6A and (G) of FIG. 6B, descriptions thereof will be omitted here. The processes in (C-1), (D-1), (E-1), and (F-1) of FIG. 6D correspond to the processes in (C) of FIG. 6A and (D), (E), and (F) of FIG. 6B, respectively.

(C-1) In response to the reception of detection of the hold, the electronic device 121 displays frames 623-1, 623-2, and 623-3, which are the frames of the display screens of the first tablet computer 603-1*a*, the second tablet computer 603-2*a*, and the smartphone 603-3*a* and are connected into one outer periphery, with the origin at the position of the forefinger or thumb when receiving the detection of the hold. In other words, the first tablet computer 603-1*a* displays part 623-1 of the frame, the second tablet computer 603-2*a* displays part 623-2 of the frame, and the smartphone 603-3*a* displays part 623-3 of the frame.

After displaying the frames 623-1, 623-2, and 623-3, the electronic device 121 automatically moves the frames 623-1, 623-2, and 623-3 to the inside of the display screen. The electronic device 121 moves the frames 623-1, 623-2, and 623-3 so as to converge to the origin at the position of the forefinger or thumb when receiving the detection of the hold. The electronic device 121 can determine how to converge the individual frames 623-1, 623-2, and 623-3. The electronic device 121 can increase the moving speeds of the frames 623-1, 623-2, and 623-3, for example, with acceleration, as the frames 623-1, 623-2, and 623-3 moves inward. Alternatively, the electronic device 121 may increase, decrease, or stop the movement of the frames 623-1, 623-2, and 623-3 by, for example, a user's mouse or keyboard operation. As the frames 623-1, 623-2, and 623-3 are moved inward, the frames 623-1, 623-2, and 623-3 are gradually reduced. Alternatively, the user may manually move the frames 623-1, 623-2, and 623-3 so as to be displayed on the target position 612 of the icon 611 by changing the strength of the hold (that is, the strength of pressure of the forefinger or thumb on the display screen). For example, the user may move the frames 623-1, 623-2, and 623-3 while reducing them by increasing the strength of the hold and may move the frames 623-1, 623-2, and 623-3 while enlarging them by decreasing the strength of the hold. In this manner, the electronic device 121 can move the frames 623-1, 623-2, and 623-3 while reducing or enlarging them depending on the strength of the hold.

(D-1) In response to that the frames 623-1, 623-2, and 623-3 are displayed on the target position 612 of the icon 611 (624-1, 624-2, and 624-3), the user releases the forefinger or thumb from the display screen. If the frames 623-1, 623-2, and 623-3 are reduced past the target position 612 of the icon 611 while the electronic device 121 is automatically moving the frames 623-1, 623-2, and 623-3 inward, the user can move the frames 623-1, 623-2, and 623-3 while enlarging them onto the target position 612 of the icon 611 by decreasing the strength of the hold.

(E-1) In response to the detection of the release, the electronic device 121 obtains a half-line 625-1 connecting an end point at the origin and a point on the frames 623-1, 623-2, and 623-3 farthest from the origin. The electronic device 121 may display the half-line 625-1 on the display. The electronic device 121 further obtains the intersection 626-1 of the half-line 625-1 and the frame 624-2. The electronic device 121 may display a description for identifying the intersection 626-1 on the display. The description may be a sign with which the user can easily perceive the intersection 626-1 as a target position candidate, for example, an icon indicating the intersection. However, if the half-line 625-1 is displayed on the display, the electronic device 121 need not necessarily display the description for identifying the intersection 626-1 on the display. This is because a point at which the half-line 625-1 and the frame 624-2 intersect is the intersection 626-1.

(F-1) Since the intersection 626-1 is not present on the target position 612 of the icon 611, the user, for example, again taps or double-taps the icon 611 and moves the icon 611 while holding it with the forefinger or thumb. In response to that the icon 611 is being held and moved (606-1a), the electronic device 121 displays a half-line 625-2 connecting the end point at the origin and the present position of the forefinger or thumb. The electronic device 121 further obtains the intersection 626-2 of the half-line 625-2 and the frame 624-2. The electronic device 121 may display a sign with which the user can easily perceive the intersection 626-2 as a candidate target position.

Since the intersection 626-2 is present on the target position 612 of the icon 611, the user releases the forefinger or thumb from the icon 611.

In response to the detection of the release, the electronic device 121 moves the icon 611 so as to jump to the intersection 626-2. Alternatively, in response to the detection of the release, the electronic device 121 may move the icon 611 from the present position to the intersection 626-2 while displaying it. Alternatively, since the intersection 626-2 is present on the target position 612 of the icon 611, the user may move the forefinger or thumb to the outside of the icon 611 while holding it.

As described above, in the embodiment shown in FIG. 6D, the user can accurately and efficiently move an icon to a position that the forefinger or thumb cannot reach in a multi-display environment, as in the embodiment shown in FIGS. 6A and 6B.

Figure 7A:
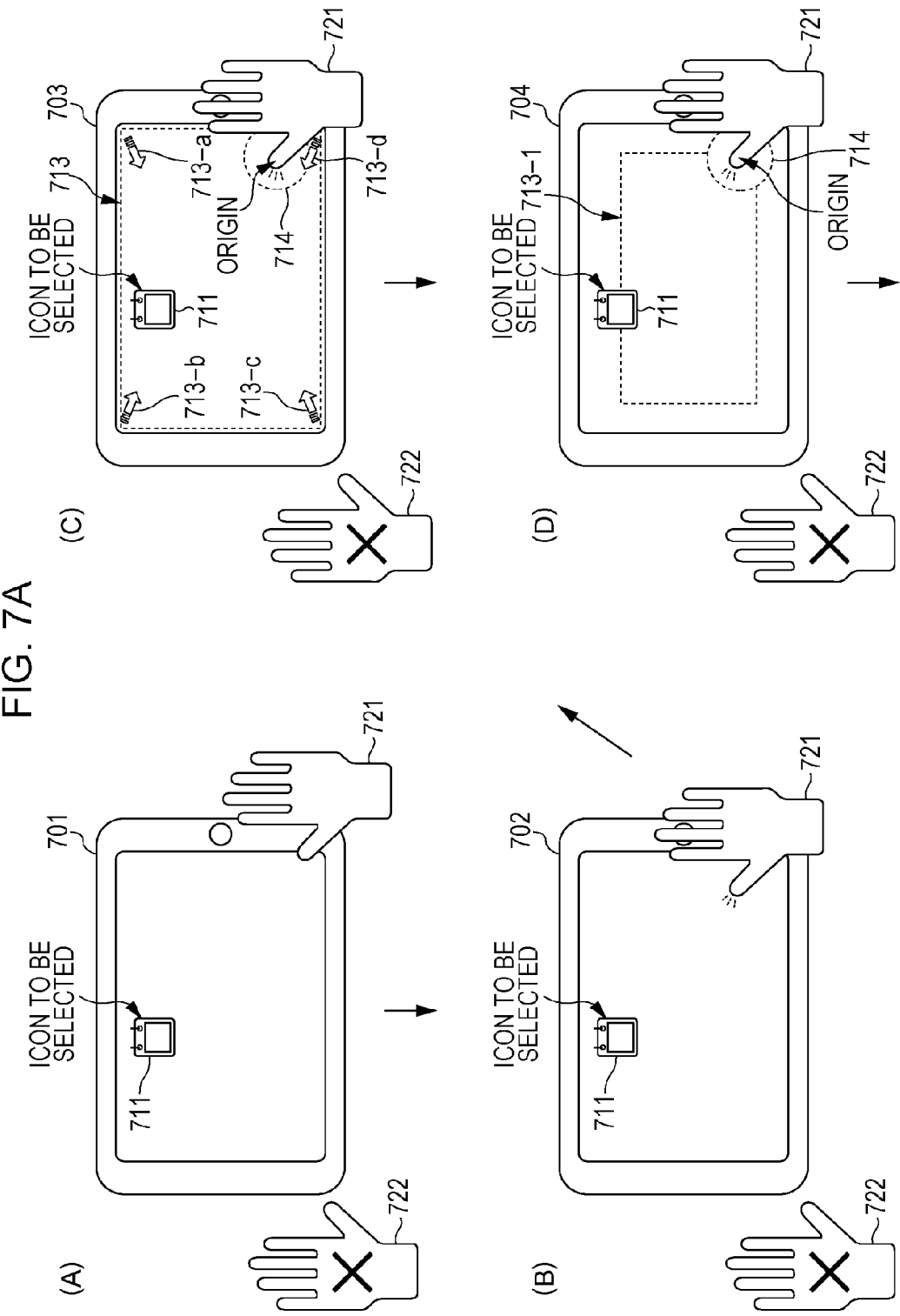
FIG. 7A is a diagram showing an example in which the user holds a tablet computer with one hand and selects an icon located at a position on the tablet computer that a finger of the one hand cannot reach by using only the finger of the one hand according to an embodiment of the present invention.
Figure 7B:
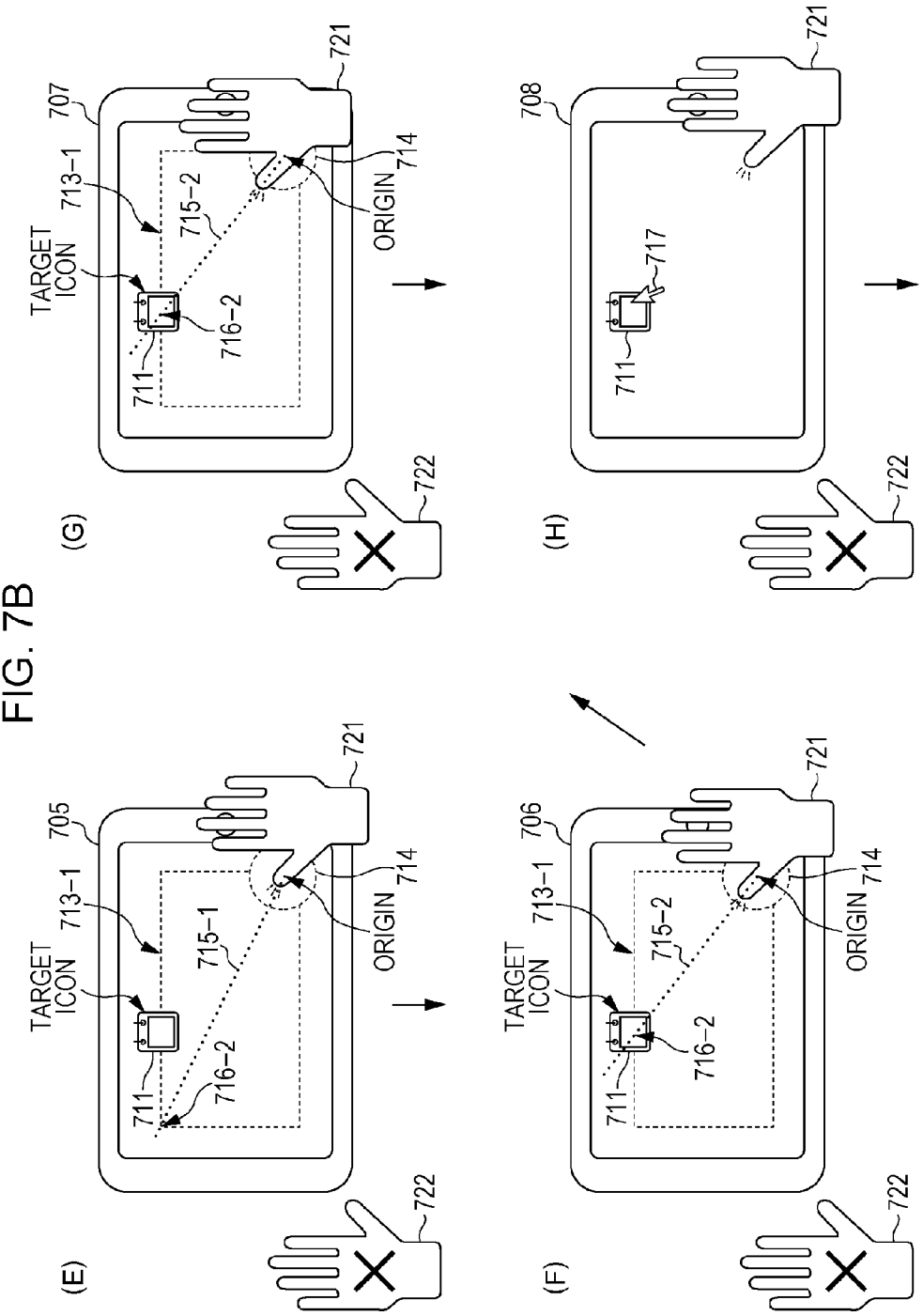
FIG. 7B is a diagram showing an example in which the user holds a tablet computer with one hand and selects an icon located at a position on the tablet computer that a finger of the one hand cannot reach by using only the finger of the one hand according to an embodiment of the present invention.

FIGS. 7A and 7B show an example in which the user holds a tablet computer (corresponding to the electronic device 121, thus, hereinafter also referred to as an electronic device 121) with one hand and selects an icon located at a position on the tablet computer that a finger of the one hand cannot reach by using only the finger of the one hand according to an embodiment of the present invention.

The user holds a tablet computer 701 with a right hand 721 because grasping a strap with a left hand 722. Suppose that the user wants to select an icon 711 at the upper left by using only a finger of the right hand 721. The forefinger or thumb of the right hand 721 cannot reach the target icon 711 because the user holds the tablet computer 701 with the right hand 721.

(A) To select the icon 711, the user taps or double-taps an area on the display screen that the forefinger or thumb of the right hand 521 can reach with the forefinger or thumb. In response to the tap or double-tap, the electronic device 121 displays a cursor (a moving object) (not shown) indicating that the forefinger or thumb is in contact with the display screen directly under or in the vicinity of the forefinger or thumb.

(B) The user further holds the tapped or double-tapped area. The electronic device 121 receives the detection of the hold.

(C) In response to the reception of detection of the hold, the electronic device 121 displays a frame 713 on or in the vicinity of the frame of the display screen. The frame 713 corresponds to a reduced or substantially reduced shape of the frame of the display screen, for example, a rectangle. The frame 713 need not correspond to the shape of the frame of the display screen and may be a frame of any shape, for example, a circular frame (see FIG. 6A), a substantially circular frame, an elliptical frame, or a substantially elliptical frame.

In response to the reception of detection of the hold, the electronic device 121 displays a small circle 714 with its origin at the position of the forefinger or thumb when receiving the detection of the hold. The small circle 714 may have a size that the forefinger or thumb only needs to be moved a little.

After displaying the frame 713 on or in the vicinity of the frame of the display screen, the electronic device 121 automatically moves the frame 713 to the inside of the display screen (713-a, 713-b, 713-c, and 713-d). The electronic device 121 moves the frame 713 so as to converge to the origin at the position of the forefinger or thumb when receiving the detection of the hold. The electronic device 121 may increase the moving speed of the frame 713, for example, with acceleration, as the frame 713 moves inward.

Alternatively, the electronic device 121 may increase, decrease, or stop the movement of the frame 713 by, for example, a user's mouse or keyboard operation. As the frame 713 moves inward, the frame 713 is gradually reduced. Alternatively, the user may manually move the frame 713 displayed on or in the vicinity of the frame of the display screen so as to be superposed on the target icon 711 by changing the strength of the hold (that is, the strength of pressure of the forefinger or thumb on the display screen). For example, the user may move the frame 713 while reducing it by increasing the strength of the hold and may move the frame 713 while enlarging it by decreasing the strength of the hold. In this manner, the electronic device 121 can move the frame 713 while reducing or enlarging it depending on the strength of the hold.

(D) In response to that the frame 713 is superposed on the target icon 711 (713-1), the user releases the forefinger or thumb from the display screen. If the frame 713 is reduced past the target icon 711 while the electronic device 121 is automatically moving the frame 713 inward, the user can move the frame 713 while enlarging it onto the target icon 711 by decreasing the strength of the hold.

(E) In response to the detection of the release, the electronic device 121 obtains a half-line 715-1 connecting an end point at the origin and a point on the frame 713-1, for example, farthest from the end point. The electronic device 121 may display the half-line 715-1 on the display. The electronic device 121 further obtains the intersection 716-1 of the half-line 715-1 and the frame 713-1. The electronic device 121 may display a description for identifying the intersection 716-1 on the display. The description may be a sign with which the user can easily perceive the intersection 716-1 as a target position candidate, for example, an icon indicating the intersection. However, if the half-line 715-1 is displayed on the display, the electronic device 121 need not necessarily display the description for identifying the intersection 716-1 on the display. This is because a point at which the half-line 715-1 and the frame 713-1 intersect is the intersection 716-1.

(F) Since the intersection 716-1 is not present on the target icon 711, the user, for example, again taps or double-taps the small circle 714 and moves therein while holding it with the forefinger or thumb. In response to that the forefinger or thumb holds the interior of the small circle 714 and moves therein (706), the electronic device 121 displays a half-line 715-2 connecting the end point at the origin and the present position of the forefinger or thumb. The electronic device 121 further obtains the intersection 716-2 of the half-line 715-2 and the frame 713-1. The electronic device 121 may display a sign with which the user can easily perceive the intersection 716-2 as a candidate target position.

(G) Since the intersection 716-2 is present on the target icon 711 (that is, the intersection 716-2 is superposed on the target icon 711), the user moves the forefinger or thumb along the half-line 715-2 so as to pass over the frame (that is, the circumference) of the small circle 714 while pressing it with the forefinger or thumb (707). As the forefinger or thumb moves, the electronic device 121 detects that the forefinger or thumb has moved over the circumference.

In response to the detection of passage of the forefinger or thumb over the circumference, the electronic device 121 moves the cursor under the forefinger or thumb so as to jump to the intersection 716-2 or the intersection of a half-line and the frame 713-1 when the forefinger or thumb has passed over the circumference. Alternatively, in response to the detection of passage of a mouse cursor over the circumference, the electronic device 121 may move the mouse cursor so as to move (for example, so as to jump) to the intersection 716-2 gradually or with acceleration or to move the mouse cursor to the intersection of a half-line and the frame 716-2 gradually or with acceleration (for example, while showing its locus).

(H) The electronic device 121 displays an icon 717 on the intersection 716-2, that is, on the icon 711. The electronic device 121 erases the frame 713-1 and the half-line 715-2 from the display screen.

As described above, in the embodiment shown in FIGS. 7A and 7B, the user can accurately and efficiently select an icon located at a position that the forefinger or thumb cannot reach.

Figure 7C:
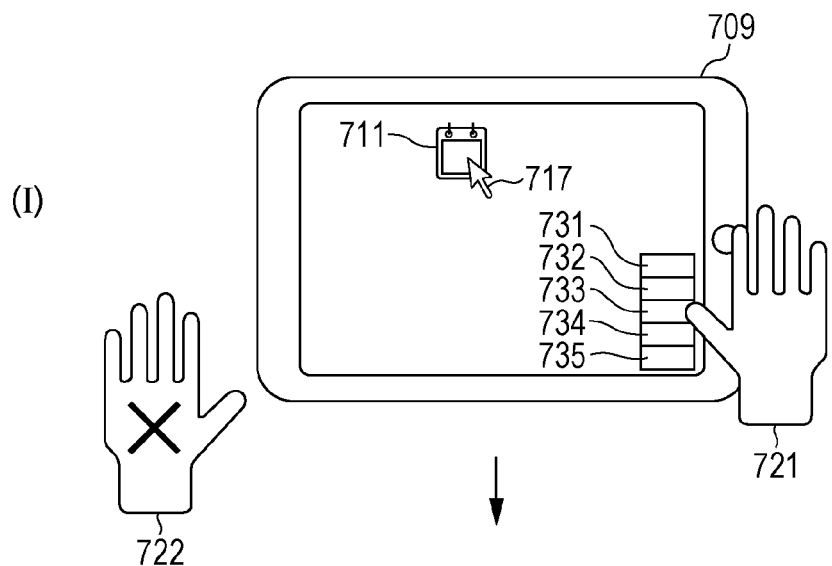
FIG. 7C is a diagram showing an example in which the user holds a tablet computer with one hand, selects an icon located at a position on the tablet computer that a finger of the one hand cannot reach by using only the finger of the one hand, and operates the selected icon with the finger of the one hand according to an embodiment of the present invention.
Figure 7C:
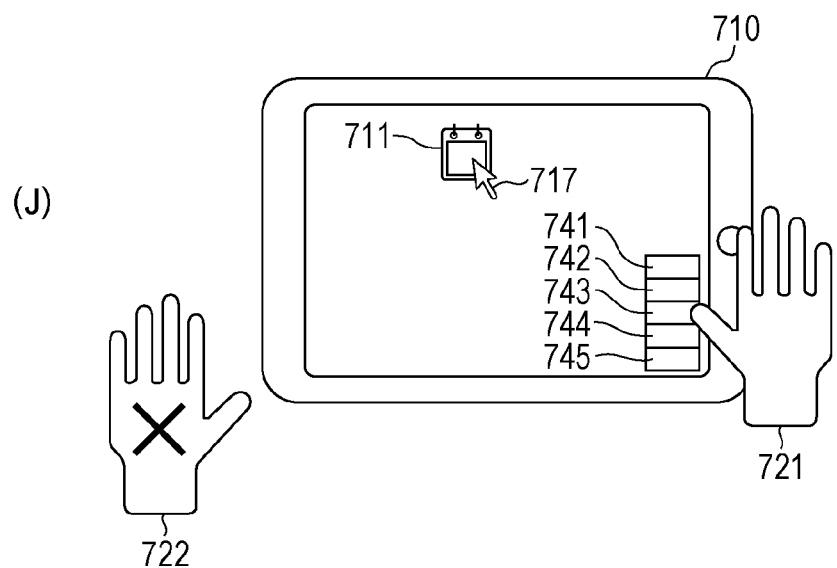

FIG. 7C shows an example in which the user operates a selected icon with a finger of one hand according to the embodiment shown in FIGS. 7A and 7B.

(I) The user taps or double-taps the display screen to call menus 731 to 735. In response to the tap or double-tap, the electronic device 121 displays the menus 731 to 735 on the display screen (709). The individual menus 731 to 735 correspond to icons to be operated. Suppose that the menu 734 is for operating an icon 711.

(J) The user taps or double-taps the menu 734. In response to the tap or double-tap on the menu 734, the electronic device 121 displays operation menus 741 to 745 for the icon 611 on the display screen (710). The individual operation menus 741 to 745 correspond to menus for operating the icon 711. Examples of the operation menus 741 to 745 include starting, updating, and deleting an application associated with the icon 711.

Figure 8B:
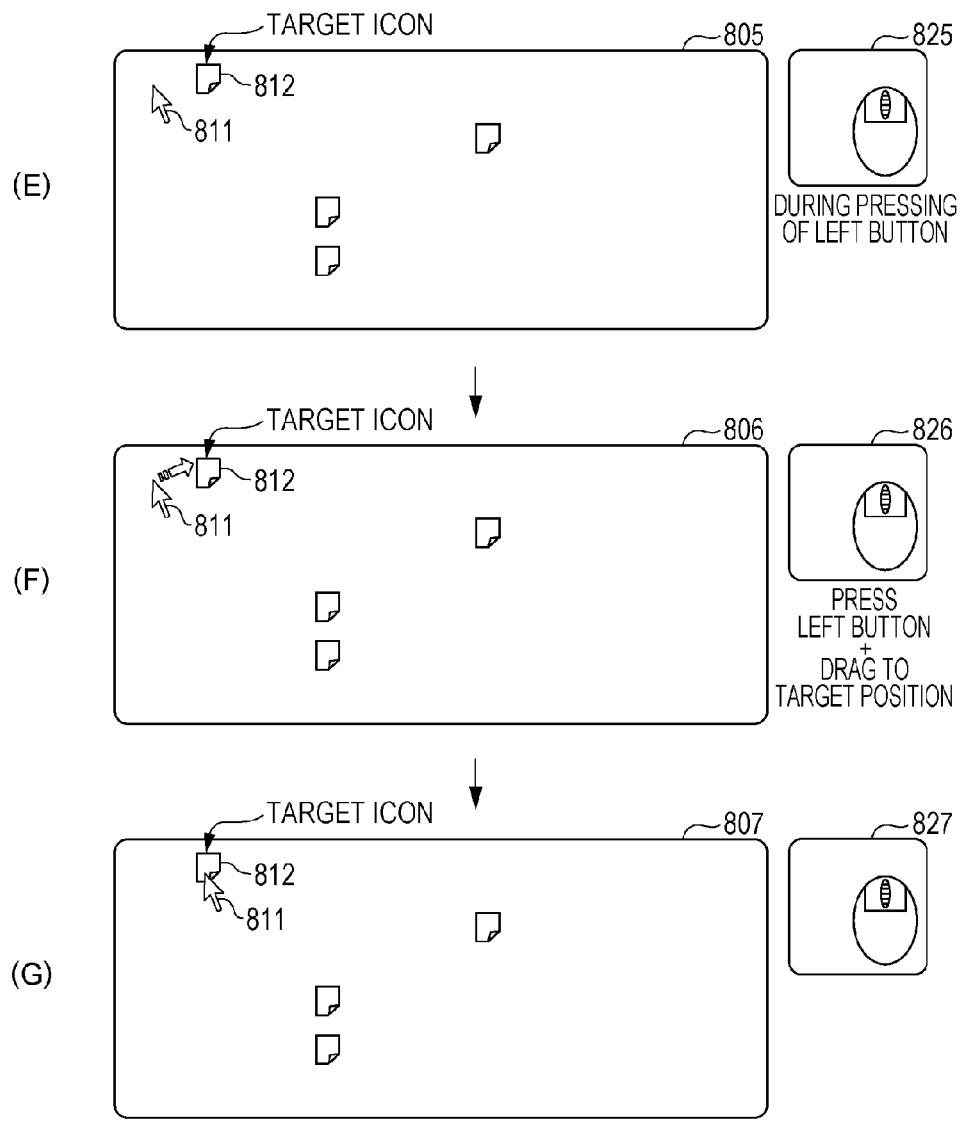
FIG. 8B is a diagram showing an example in which the user selects an icon distant from the present position of a mouse cursor (a movable object) on a wide-type liquid crystal display using a mouse and displays a plurality of frames according to an embodiment of the present invention.

FIGS. 8A and 8B show an example in which the user selects an icon distant from the present position of a mouse cursor (a moving object) on a wide-type liquid crystal display using a mouse and displays a plurality of frames according to an embodiment of the present invention.

Suppose that the user wants to select an icon 812 with a mouse. The present position of a mouse cursor 811 is distant from the target icon 812.

(A) The user presses the left button of the mouse (821). The electronic device 101 receives the detection of press of the mouse.

(B) The user is pressing the left button of the mouse (822). In response to the reception of detection of the press, the electronic device 101 displays a plurality of frames 813-a, 813-b, and 813-c indicating the target positions of the mouse cursor 811 on or in the vicinity of the corners (vertices) of the frame of the display screen. The electronic device 101 displays no frame at a corner (vertex) of the frame of the display screen close to the mouse cursor 811. This is because moving the mouse cursor 811 to the corner (vertex) of the frame of the display screen close to the mouse cursor 811 by using a conventional method is sometimes easier than a method according to the embodiment of the present invention.

The frames 813-a, 813-b, and 813-c may be circular, substantially circular, elliptical, substantially elliptical, or of another shape. The sizes of the frames 813-a, 813-b, and 813-c need only be large enough to display the mouse cursor 811 on the frames 813-a, 813-b, and 813-c and can be set as appropriate by those skilled in the art.

The target positions of the mouse cursor 811 are limited to the plurality of frames 813-a, 813-b, and 813-c. This is because the limitation or restriction on the target positions can omit a user's excessive operation for determining the target positions of the mouse cursor 811, thus offering higher usability.

(C) The electronic device 101 obtains a half-line 815-1 connecting an end point at the origin at the position of the mouse cursor 811 when receiving the detection of the press and, for example, the center of the frame 813-b closest to the target position of the mouse cursor 811 among the frames 813-a, 813-b, and 813-c. Alternatively, the electronic device 101 may obtain a half-line 815-1 connecting the end point at the origin at the position of the mouse cursor 811 when receiving the detection of the press and, for example, the center of the frame 813-b farthest from the end point among the frames 813-a, 813-b, and 813-c. The electronic device 101 may further obtain the intersection 816-1 of the half-line 815-1 and the frame 813-b. However, if the coordinates of the intersection 816-1 are stored, there is no need to obtain the intersection 816-1 because it is the center of the frame 813-b. The electronic device 101 may display a description for identifying the intersection 816-1 on the display. The description may be a sign with which the user can easily perceive the intersection 816-1 as a target position candidate, for example, an icon indicating the intersection. However, if the half-line 815-1 is displayed on the display, the electronic device 101 need not necessarily display the description for identifying the intersection 816-1 on the display. This is because a point at which the half-line 815-1 and the frame 813-b intersect is the intersection 816-1.

(D) Since the intersection 816-1 is close to the target icon 812, the user moves the mouse cursor 811 along the half-line 815-1 while pressing the left button of the mouse so as to pass over the frame (that is, the circumference) of the small circle 814 (824). The electronic device 101 detects the passage of the mouse cursor 811 over the circumference as the mouse moves.

In response to the detection of passage of the mouse cursor 811 over the circumference, the electronic device 101 moves the mouse cursor 811 so as to jump to the intersection 816-1. Alternatively, in response to the detection of passage of the mouse cursor 811 over the circumference, the electronic device 101 may move the mouse cursor 811 gradually or with acceleration to the intersection 816-1 (for example, while showing the locus of the mouse cursor 811).

(E) The electronic device 101 displays the mouse cursor 811 on the intersection 816-1. The electronic device 101 erases the small circles 814, the frames 813-a, 813-b, and 813-c, and the half-line 815-1 from the display screen.

(F) The target icon 812 is presently close to the mouse cursor 811. Thus, the user moves the mouse cursor 811 onto the target icon 812 while dragging the mouse. In response to the detection of the movement, the electronic device 101 moves the mouse cursor 811 onto the target icon 812 according to a conventional method.

(G) The electronic device 121 displays the mouse cursor 811 on the target icon 812.

As described above, in the embodiment shown in FIGS. 8A and 8B, to move a mouse cursor to an icon distant from the present position of the mouse cursor, the user temporarily moves the mouse cursor to a position close to the icon and then moves the mouse cursor to the icon, thereby efficiently selecting the target icon.

FIGS. 9A to 9D show a flowchart for moving a movable object displayed on a display screen according to an embodiment of the present invention. In the description of the steps of FIGS. 9A to 9D, the electronic device is an electronic device according to the present application and includes the electronic device 101 shown in FIG. 1A and the electronic device 121 shown in FIG. 1B.

Figure 9A:
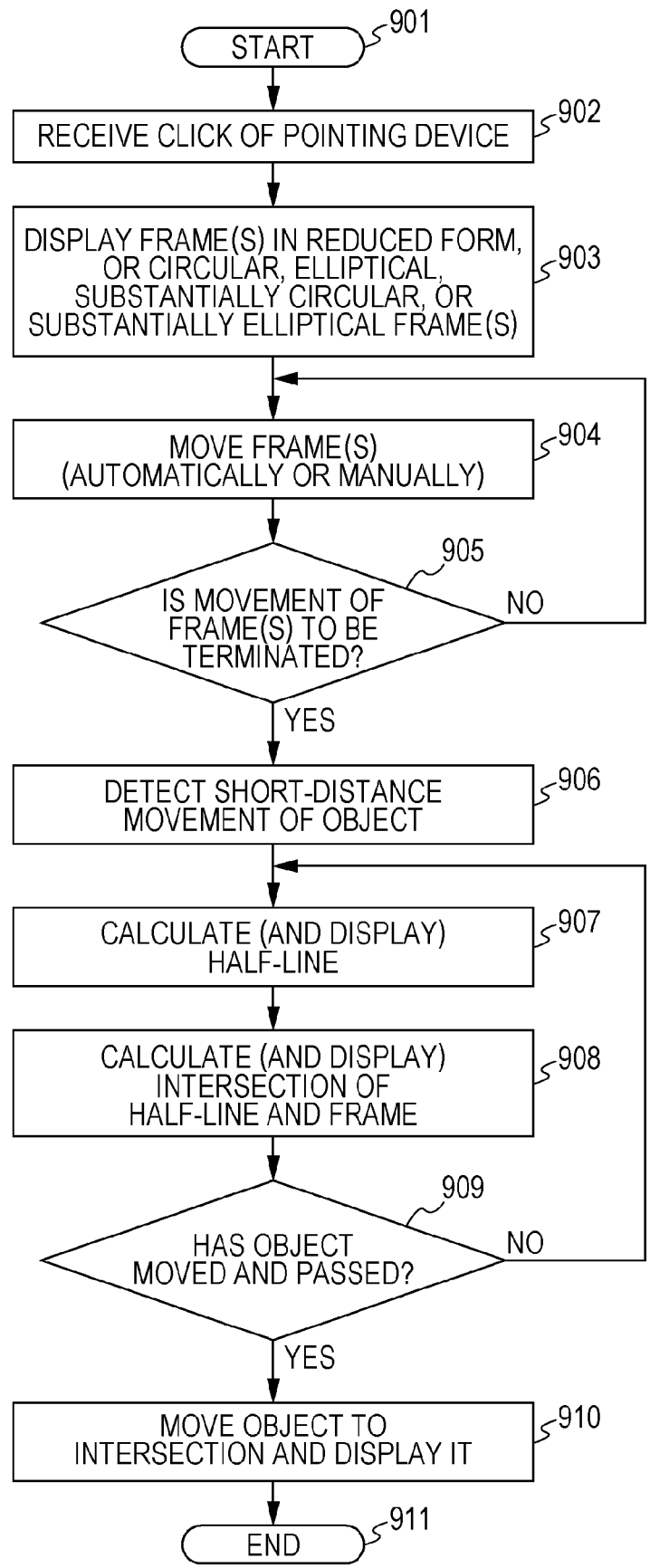
FIG. 9A is a flowchart for moving a movable object displayed on a display screen according to an embodiment of the present invention, which includes a process of frame display means for displaying a frame(s) and a process of reduced-size display means for displaying a reduced-size display associated with the frame(s), a circle, an ellipse, a substantial circle, or a substantial ellipse.

FIG. 9A is a flowchart for executing a process for moving a movable object displayed on a display screen according to an embodiment of the present invention, which includes a process of frame display means for displaying a frame(s) and a process of reduced-size display means for displaying a reduced-size display associated with the frame(s), a circle, an ellipse, a substantial circle, or a substantial ellipse.

In step 901, the electronic device starts a program for executing the above processes.

In step 902, the electronic device receives the detection of a specific user operation of a pointing device (for example, for a mouse, a left click) or a specific user operation of an operating finger (for example, for a tablet computer, a tap or double-tap). Alternatively, the electronic device may detect a specific user operation of a keyboard (for example, a press of a particular key).

In step 903, in response to the reception of detection of the specific operation in step 902, the electronic device displays one or a plurality of frames on or in the vicinity of the frame of a display screen. The frame(s) may be of a shape corresponding to the outer periphery of the display screen of a single display, a shape corresponding to the outer periphery of a combination of display screens of a plurality of displays, or at least one circle, ellipse, substantial circle, or substantial ellipse. The frame(s) may include at least one of vertices of one or a plurality of display screens. The vertices of the display screens are the corners thereof.

In response to the reception of detection of the specific operation in step 902, the electronic device displays a reduced-size display associated with the frame of the display screen, a circle, an ellipse, a substantial circle, or a substantial ellipse (hereinafter also referred to as a reduced-size display or the like) including the origin at the position of the cursor of the pointing device or a cursor displayed under the operating finger on the display when receiving the detection of the specific operation (hereinafter, the cursor indicates the above two cursors). The cursor is a moving object displayed on the display screen. Alternatively, in response to the reception of detection of the specific operation in step 902, the electronic device may display a reduced-size display associated with the frame, a circle, an ellipse, a substantial circle, or a substantial ellipse with its center at the origin at the position of the cursor of the pointing device or a cursor displayed under the operating finger when receiving the detection of the specific operation.

The electronic device may display the frame(s) and the reduced-size display or the like on the display screen at the same time, or alternatively, may first display the frame(s) and next the reduced-size display or the like, or may first display the reduced-size display or the like and then the frame(s).

In step 904, the electronic device can automatically move the frame(s) displayed in step 903 to the inside of the display screen. The electronic device moves the frame(s) so as to converge to the origin at the position of the cursor when receiving the detection of the specific operation. The electronic device can increase the moving speed of the frame(s), for example, with acceleration, as the frame(s) move(s) inward. The electronic device can increase, decrease, or stop the movement of the frame(s) displayed in step 903 by, for example, a user operation of the pointing device or keyboard. Alternatively, the user may manually move the frame(s) so as to be displayed at the target position of the object by operating a specific button of the pointing device (for example, by sliding the wheel button of the mouse back and forth).

In step 905, the electronic device detects a specific user operation of the pointing device or a specific user operation with an operating finger and determines whether to terminate the movement of the frame(s). If the specific operation indicates termination of the movement of the frame(s), the electronic device advances the process to step 906. If the specific operation does not indicate termination of the movement of the frame(s), the electronic device returns the process to step 904 and continues the movement of the frame(s).

In step 906, the electronic device detects that the cursor is moving in the reduced-size display or the like.

In step 907, the electronic device obtains a half-line connecting an end point at the origin and the present position of the cursor whose movement is detected in step 906. The electronic device can display the obtained half-line on the display.

In step 908, the electronic device obtains the intersection of the half-line obtained in step 907 and a frame at the position determined in step 905. The electronic device can display a description for identifying the obtained intersection on the display.

In step 909, the electronic device determines whether the cursor is moving and has passed over the frame of the reduced-size display or the like. If the cursor has passed over the frame of the reduced-size display or the like, the electronic device advances the process to step 910. If the cursor has not passed over the frame, the electronic device returns the process to step 907 and repeats steps 907 to 909.

In step 910, the electronic device moves the cursor to the intersection calculated in step 908 or to the intersection of a half-line when the cursor passed over the frame of the reduced-size display or the like in step 909 and the frame at the position determined in step 905 and displays the cursor on the display.

In step 911, the electronic device can enter a standby mode for the next process or terminate the program for executing the process.

Figure 9B:
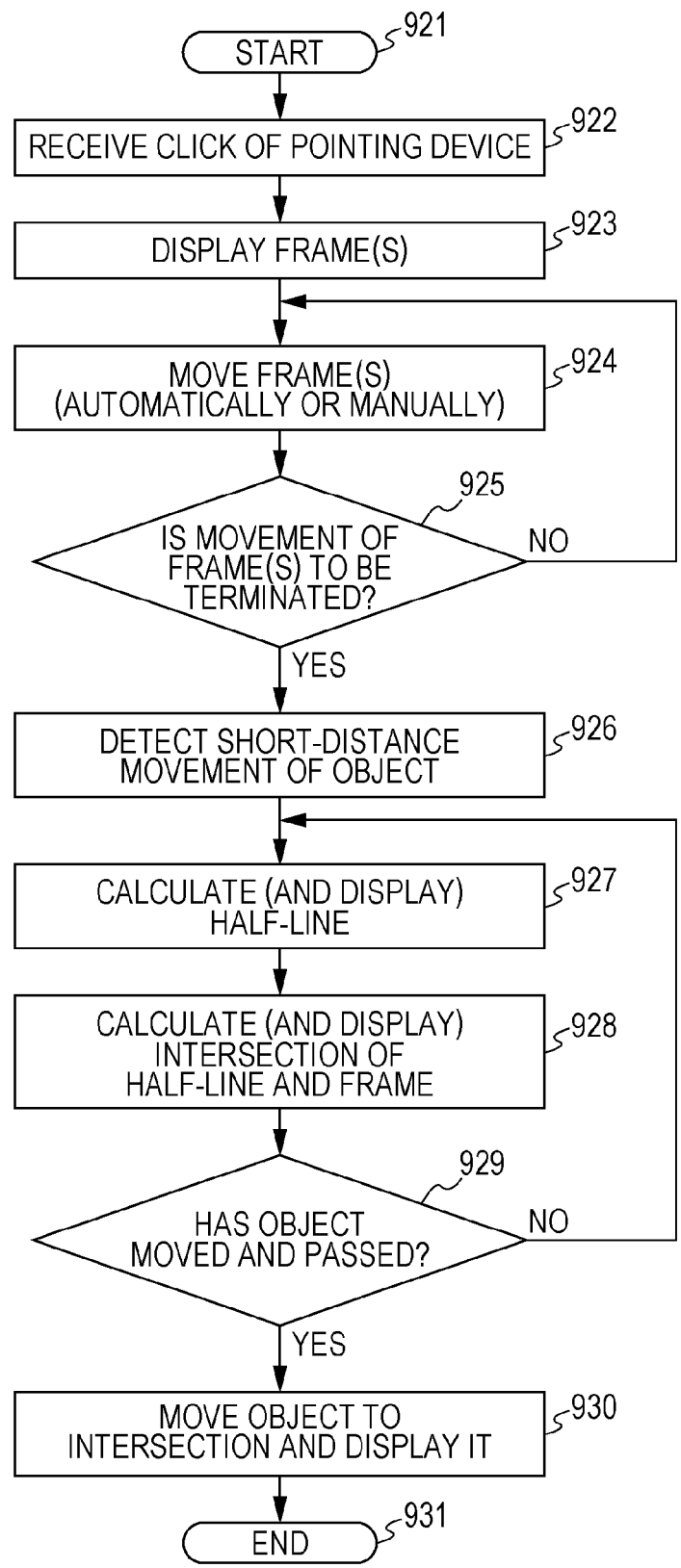
FIG. 9B is a flowchart for moving a movable object displayed on a display screen according to an embodiment of the present invention, which includes a process of the frame display means for displaying a frame(s).

FIG. 9B is a flowchart for moving a movable object displayed on a display screen according to an embodiment of the present invention, which includes a process of the frame display means for displaying a frame.

Steps 921 and 922 correspond to steps 901 and 902 shown in FIG. 9A, respectively. Accordingly, descriptions of steps 921 and 922 will be omitted in the description of the steps in FIG. 9B.

In step 923, in response to the reception of detection of a specific user operation of the pointing device in step 922 (for example, for a mouse, a left click) or a specific user operation of an operating finger (for example, for a tablet computer, a tap or double-tap), the electronic device displays one or a plurality of frames on or in the vicinity of the frame of the display screen. The frame(s) may be of a shape corresponding to the outer periphery of the display screen of a single display, a shape corresponding to the outer periphery of a combination of display screens of a plurality of displays, or at least one circle, ellipse, substantial circle, or substantial ellipse. The frame(s) may include at least one of vertices of one or a plurality of display screens. The vertices of the display screens are the corners thereof.

In the process shown in FIG. 9B, the display of the reduced-size display or the like in step 903 of FIG. 9A is not performed.

Steps 924 and 925 correspond to steps 904 and 905 shown in FIG. 9A, respectively. Accordingly, descriptions of steps 924 to 925 will be omitted in the description of the steps in FIG. 9B.

In step 926, the electronic device determines whether the cursor has moved a short distance in the vicinity of the origin at the position of the pointing device or the operating finger when the specific operation is detected in step 922. The vicinity may be a distance in which the pointing device or the operating finger only needs to be moved a little. The short-distance movement includes a movement in the area of a reduced-size display associated with the frame, a circle, an ellipse, a substantial circle, or a substantial ellipse calculated (a reduced-size display or the like) including the origin (a virtual reduced-size display or the like that is not displayed on the display screen), a movement corresponding to a fixed number of pixels in the vicinity of the origin or in the virtual reduced-size display or the like, and a movement of the target icon in the icon display area. An example of the movement corresponding to a fixed number of pixels in the vicinity of the origin is, if the electronic device is a tablet computer, a movement over a distance corresponding to the number of pixels in which the forefinger or thumb of a hand that holds the tablet computer can move on the display screen.

Steps 927 and 928 correspond to steps 907 and 908 shown in FIG. 9A, respectively. Accordingly, descriptions of steps 927 and 928 will be omitted in the description of the steps in FIG. 9B.

In step 929, the electronic device determines whether the cursor is moving and has moved a fixed distance with acceleration, for example, a distance corresponding to a fixed number of pixels, in the vicinity of the origin. If the cursor has moved the fixed distance with acceleration, the electronic device advances the process to step 930. In contrast, if the cursor has not moved the fixed distance with acceleration, the electronic device returns the process to step 927 and repeats steps 927 to 929.

Alternatively, the electronic device may determine whether the cursor has moved at a predetermined acceleration or higher. If the cursor has moved at a predetermined acceleration or higher, the electronic device advances the process to step 930. If the cursor has not moved at a predetermined acceleration or higher, the electronic device returns the process to step 927 and repeats steps 927 to 929.

Alternatively, the electronic device may detect a user's specific operation of the mouse (for example, a press of a specific button) or a user's specific operation of the keyboard (for example, a press of a specific function key). If detecting the specific operation, the electronic device advances the process to step 930. If not detecting the specific operation, the electronic device returns the process to step 927 and repeats steps 927 to 929.

Steps 930 and 931 correspond to steps 910 and 911 shown in FIG. 9A, respectively. Accordingly, descriptions of steps 930 and 931 will be omitted in the description of the steps in FIG. 9B.

Figure 9C:
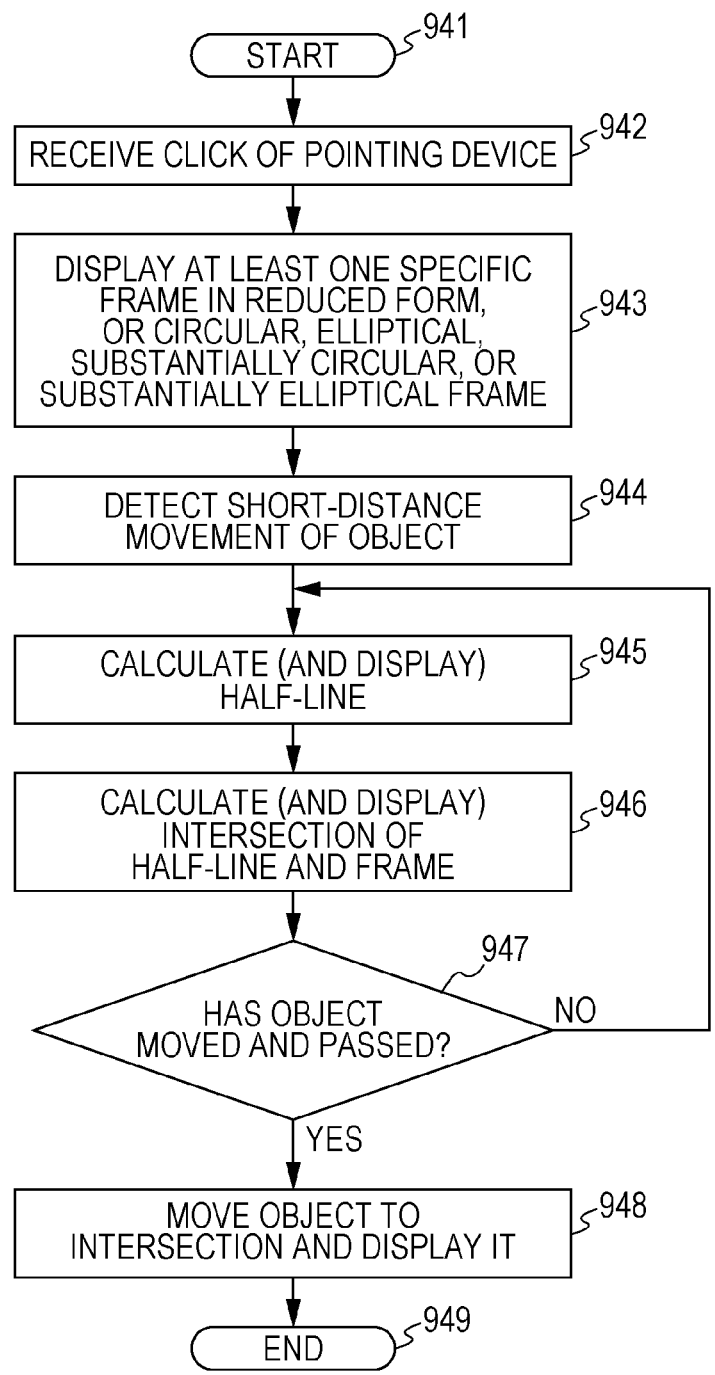
FIG. 9C is a flowchart for moving a movable object displayed on a display screen according to an embodiment of the present invention, which includes a process of the frame display means for displaying at least one specific frame and a process of the reduced-size display means for displaying a reduced-size display associated with the frame, a circle, an ellipse, a substantial circle, or a substantial ellipse.

FIG. 9C is a flowchart for moving a movable object displayed on a display screen according to an embodiment of the present invention, which includes a process of the frame display means for displaying at least one specific frame and a process of the reduced-size display means for displaying a reduced-size display associated with the frame, a circle, an ellipse, a substantial circle, or a substantial ellipse.

Steps 941 to 942 correspond to steps 901 and 902 shown in FIG. 9A, respectively. Accordingly, descriptions of steps 941 and 942 will be omitted in the description of the steps in FIG. 9C.

In step 943, in response to the reception of detection of a specific user operation of the pointing device in step 942 (for example, for a mouse, a left click) or a specific user operation of an operating finger (for example, for a tablet computer, a tap or double-tap), the electronic device displays one or a plurality of frames on or in the vicinity of the frame of the display screen. The display position(s) of the frame(s) on the display screen is (are) specified or designated in advance. The frame(s) is (are) displayed on at least one of the corners of the frame of the display screen. The vertices of the display screen indicate the corners. The electronic device need not display the frame(s) at a corner (vertex) of the frame of the display screen close to the cursor of the pointing device or a cursor displayed under the operating finger on the display (hereinafter, the cursor indicates the above two cursors). This is because moving the cursor to the corner (vertex) of the frame of the display screen close to the cursor by using a conventional method is sometimes easier than a method according to an embodiment of the present invention.

In response to the reception of detection of the specific operation in step 942, the electronic device displays a reduced-size display associated with the frame of the display screen, a circle, an ellipse, a substantial circle, or a substantial ellipse (hereinafter also referred to as a reduced-size display or the like) including the origin at the position of the cursor of the pointing device or a cursor displayed under the operating finger on the display when receiving the detection of the specific operation (hereinafter, the cursor indicates the above two cursors). The cursor is a movable object displayed on the display screen. Alternatively, in response to the reception of detection of the specific operation in step 942, the electronic device may display a reduced-size display associated with the frame, a circle, an ellipse, a substantial circle, or a substantial ellipse with its center at the origin at the position of the cursor of the pointing device or a cursor displayed under the operating finger when receiving the detection of the specific operation.

The electronic device may display the frame(s) and the reduced-size display or the like on the display screen at the same time, or alternatively, may first display the frame(s) and next the reduced-size display or the like, or may first display the reduced-size display or the like and then the frame(s).

In step 944, the electronic device detects that the cursor has moved in the reduced-size display or the like.

In step 945, the electronic device obtains a half-line connecting an end point at the origin of the cursor, whose movement is detected in step 944, and the present position of the target position of the cursor. Alternatively, the electronic device may correct the half-line so as to be interposed on a frame closest to the target position of the at least one frame displayed in step 943. Alternatively, the electronic device may correct the half-line so as to be interposed on a frame farthest from the end point of the at least one frame displayed in step 943 (for example, so as to be interposed on the center point of the farthest frame).

The electronic device can display the obtained half-line on the display.

In step 946, the electronic device obtains the intersection of the half-line obtained in step 945 and the frame at the position specified in step 945. The electronic device can display a description for identifying the obtained intersection on the display.

In step 947, the electronic device determines whether the cursor is moving and has passed over the frame of the reduced-size display or the like. If the cursor has passed over the frame of the reduced-size display or the like, the electronic device advances the process to step 948. If the cursor has not passed over the frame, the electronic device returns the process to step 945 and repeats steps 945 to 947.

In step 948, the electronic device moves the cursor to the intersection calculated in step 946 and displays the cursor on the display.

In step 949, the electronic device can enter a standby mode for the next process or terminate the program for executing the process.

FIG. 9D is a flowchart for moving a moving object displayed on a display screen according to an embodiment of the present invention, which includes a process of the frame display means for displaying at least one specific frame.

Steps 951 and 952 correspond to steps 901 and 902 shown in FIG. 9A, respectively. Accordingly, descriptions of steps 951 and 952 will be omitted in the description of the steps in FIG. 9D.

In step 953, in response to the reception of detection of a specific user operation of the pointing device in step 952 (for example, for a mouse, a left click) or a specific user operation of an operating finger (for example, for a tablet computer, a tap or double-tap), the electronic device displays one or a plurality of frames on or in the vicinity of the frame of the display screen. The display position(s) of the frame(s) on the display screen can be specified or designated in advance. The frame(s) is (are) displayed on at least one of the corners of the frame of the display screen. The vertices of the display screen indicate the corners. The electronic device need not display the frame(s) at a corner (vertex) of the frame of the display screen close to the cursor of the pointing device or a cursor displayed under the operating finger on the display (hereinafter, the cursor indicates the above two cursors). This is because moving the cursor to the corner (vertex) of the frame of the display screen close to the cursor by using a conventional method is sometimes easier than a method according to an embodiment of the present invention.

Alternatively, in response to the reception of detection of a specific user operation of the pointing device in step 952 (for example, for a mouse, a left click) or a specific user operation with an operating finger (for example, for a tablet computer, a tap or double-tap), the electronic device may display a frame including an object (for example, an icon) farthest from an origin at the position of the cursor of the pointing device or a cursor displayed under the operating finger on the display when receiving the detection of the specific operation (hereinafter, the cursor indicates the above two cursors) or frame(s) each including an object at a decreasing distance from the object farthest from the origin.

In step 954, the electronic device determines whether the cursor has moved in the vicinity of the origin at the position of the pointing device or the operating finger when detecting the specific operation in step 952. The vicinity may be a distance in which the pointing device or the operating finger only needs to be moved a little.

In step 955, the electronic device obtains a half-line connecting an end point at the origin of the cursor, whose movement is detected in step 954, and the present position of the cursor. Alternatively, the electronic device may correct the half-line so as t be interposed on a frame closest to the target position of the at least one frame displayed in step 953. Alternatively, the electronic device may correct the half-line so as to be interposed on a frame farthest from the end point of the at least one frame displayed in step 953 (for example, so as to be interposed on the center point of the farthest frame).

The electronic device can display the obtained half-line on the display.

In step 956, the electronic device obtains the intersection of the half-line obtained in step 955 and the frame at the position specified in step 955. Alternatively, if the center of a frame at which the half-line obtained in step 955 is located at the position specified in step 955 (for example, the center of a frame circular in shape) has already been obtained, the electronic device may read the obtained center as the intersection.

The electronic device can display a description for identifying the obtained intersection on the display.

In step 957, the electronic device determines whether the cursor is moving and has moved a fixed distance with acceleration, for example, a distance corresponding to a fixed number of pixels, in the vicinity of the origin. If the cursor has moved the fixed distance with acceleration, the electronic device advances the process to step 958. If the cursor has not moved the fixed distance with acceleration, the electronic device returns the process to step 955 and repeats steps 955 to 957.

Steps 958 and 959 correspond to steps 948 and 949 shown in FIG. 9C, respectively. Accordingly, descriptions of steps 958 and 959 will be omitted in the description of the steps in FIG. 9D.

Figure 10:
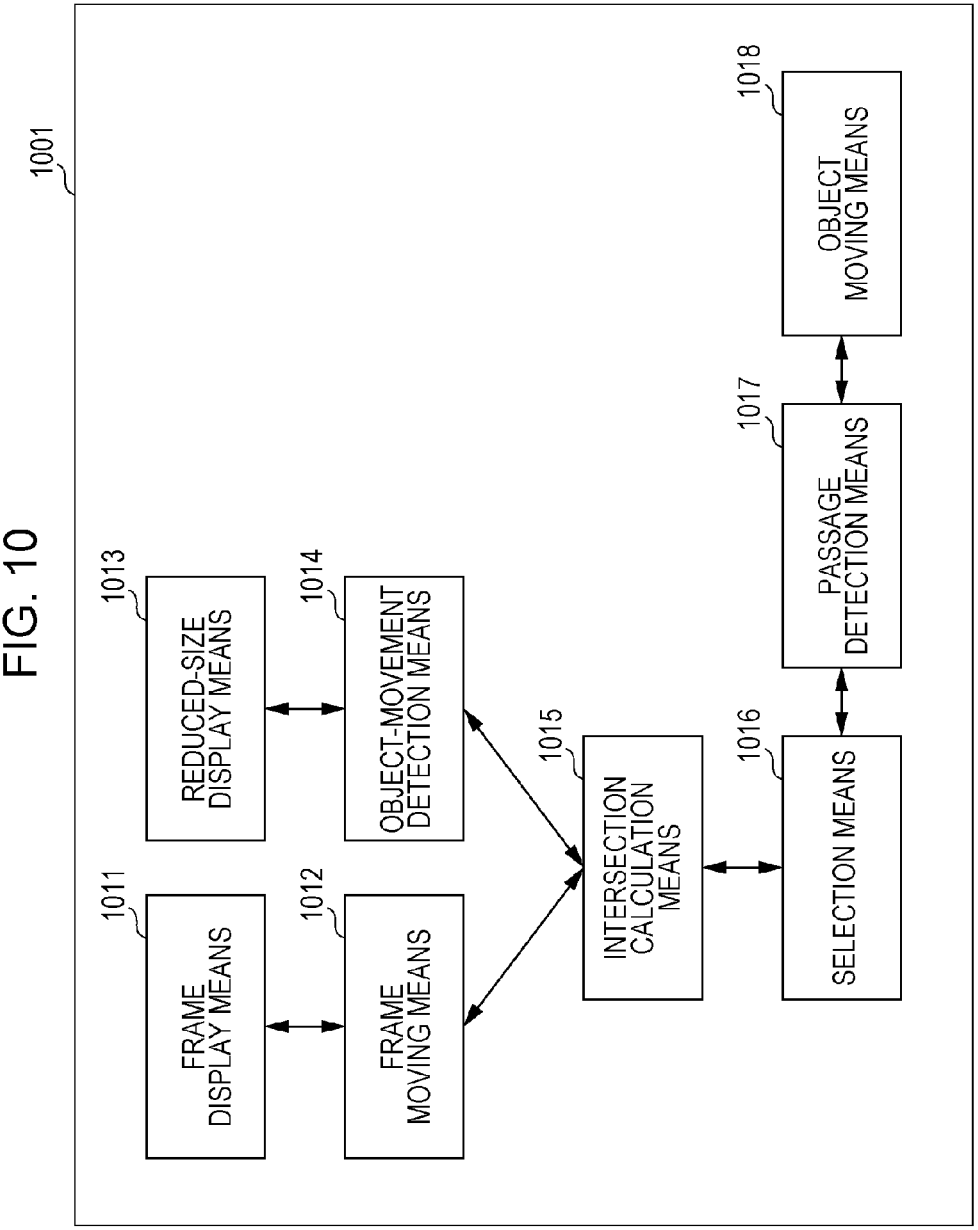
FIG. 10 is a functional block diagram of an electronic device according to an embodiment of the present invention, preferably having the hardware configuration shown in FIG. 1A or 1B.

FIG. 10 is a functional block diagram of an electronic device according to an embodiment of the present invention, preferably having the hardware configuration shown in FIG. 1A or 1B.

An electronic device 1001 is an electronic device according to an embodiment of the present application, which includes the electronic device 101 shown in FIG. 1A and the electronic device 121 shown in FIG. 1B.

The electronic device 1001 includes frame display means 1011, frame moving means 1012, reduced-size display means 1013, object-movement detection means 1014, intersection calculation means 1015, selection means 1016, passage detection means 1017, and object moving means 1018.

The frame display means 1011 displays at least one frame on or in the vicinity of the frame of a display screen in response to an instruction from the user. Alternatively, the frame display means 1011 may display at least one frame on a target position candidate of a moving object displayed on the display screen in response to an instruction from the user. Alternatively, the frame display means 1011 may display at least one frame on the target position candidate of the object in response to an instruction from the user. Examples of the instruction from the user include specific user operations for issuing an instruction to start a process for moving the object, such as a specific operation of a pointing device (for example, a press of a specific button), a specific user operation of an operating finger (for example, for a tablet computer, a tap or double-tap), and a specific keyboard operation (for example, a press of a specific function key).

The frame moving means 1012 moves the frame(s) so as to converge to the origin at the position of a moving object displayed on the display screen when receiving the detection of a specific user operation of the pointing device shown in step 902 of FIG. 9A (for a mouse, a left click), the detection of a specific user operation of an operating finger (for example, for a tablet computer, a tap or double-tap), or the detection of a specific user operation of a keyboard (for example, a press of a specific key). Alternatively, the frame moving means 1012 may move the frame(s) by reducing or enlarging the frame(s). The frame moving means 1012 may move the frame(s) by automatically reducing the frame(s). Alternatively, the frame moving means 1012 may move the frame(s) by reducing or enlarging the frame(s) in accordance with a user operation. Alternatively, the frame moving means 1012 may move the frame(s) with acceleration. The frame moving means 1012 may move the frame(s) by decreasing or increasing the speed in accordance with a user operation.

The reduced-size display means 1013 displays a reduced-size display associated with the frame, a circle, an ellipse, a substantial circle, or a substantial ellipse (hereinafter also referred to as a reduced-size display or the like) including the origin. Alternatively, the reduced-size display means 1013 may display a reduced-size display associated with the frame, a circle, an ellipse, a substantial circle, or a substantial ellipse with its center at the origin.

The reduced-size display means 1013 calculates a reduced-size display associated with the frame, or a circle, an ellipse, a substantial circle, or a substantial ellipse about the origin and displays a virtual reduced-size display or the like in which the calculated reduced-size display or the like is not displayed on the display screen.

The object-movement detection means 1014 detects a short-distance movement of a movable object displayed on a display screen. Examples of the short-distance movement include a movement in the area of a reduced-size display or the like displayed by the reduced-size display means 1013, a movement in the area of a virtual reduced-size display or the like that is calculated by the reduced-size display means 1013 and is not displayed on the display screen, a movement corresponding to a fixed number of pixels in the vicinity of the origin or within the virtual reduced-size display or the like, and a movement in the area of a moving object icon. An example of the movement corresponding to the fixed number of pixels in the vicinity of the origin is, if the electronic device is a tablet computer, a movement corresponding to the number of pixels in which the forefinger or thumb of a hand that holds the table computer can move on the display screen.

The intersection calculation means 1015 obtains the intersection of the frame(s) and a half-line connecting an end point at the origin located at the position of a movable object displayed on the display screen when receiving the detection of a specific user operation of the pointing device shown in step 902 of FIG. 9A (for a mouse, a left click), the detection of a specific user operation of an operating finger (for a tablet computer, a tap or double-tap), or the detection of a specific user operation of a keyboard (for example, a press of a specific key).

The selection means 1016 detects that the intersection obtained by the intersection calculation means 1015 has been selected as the target position of the moving object displayed on the display screen. The selection means 1016 can change the intersection depending on the movement of the object in the reduced-size display, the circle, the ellipse, the substantial circle, or the substantial ellipse.

The passage detection means 1017 detects that the moving object displayed on the display screen has passed over the frame of the reduced-size display, of the circumference of the circle, the ellipse, the substantial circle, or the substantial ellipse.

The object moving means 1018 moves the object to the intersection obtained by the intersection calculation means 1015. The object moving means 1018 can move the object as the object passes over the frame of the reduced-size display, of the circumference of the circle, the ellipse, the substantial circle, or the substantial ellipse.

An object of the present invention is to provide a technique for moving a movable object to a target position (for example, a position distant from the present position of a pointing device) with high accuracy and high efficiency or for selecting an object (for example, an icon) distant from the present position of the pointing device without excessively leaving the present position of the pointing device.

Another object of the present invention is to provide a technique for moving a moving object (for example, a cursor under an operating finger) to a target position with high accuracy and high efficiency while holding a tablet computer or a smartphone with one hand when an operation with the one hand is needed or for operating an object (for example, an icon) located at a position that a finger of the one hand cannot reach.

The present invention provides a technique for moving a moving object displayed on a display screen. The technique may include a method, an electronic device, an electronic device program, and an electronic device program product for moving a moving object displayed on a display screen.

A method according to a first embodiment of the present invention includes the steps of displaying at least one frame on or in the vicinity of a display screen frame, in response to an instruction from a user, with its origin at the present position of the object when receiving the instruction from the user; moving the frame so as to converge to the origin; selecting an intersection of the frame and a half-line as a target position of the object in response to a short-distance movement of the object, the half-line connecting an end point at the origin and a position to which the object moves by the short-distance movement; and moving the object to the intersection and displaying the object.

A method according to a second embodiment of the present invention is a method for moving a moving object displayed on a display screen. The method includes the steps of displaying at least one frame on a target position candidate of the object, in response to an instruction from the user, with its origin at the present position of the object when receiving the instruction from the user; selecting an intersection of the frame and a half-line as a target position of the object in response to a short-distance movement of the object, the half-line connecting an end point at the origin and a position to which the object moves by the short-distance movement; and moving the object to the intersection and displaying the object.

A method according to a third embodiment of the present invention includes the steps of displaying at least one frame on or in the vicinity of a display screen frame in response to an instruction from a user, with its origin at the present position of the object when receiving the instruction from the user; displaying a reduced-size display including the origin and associated with the frame, or a circle, an ellipse, a substantial circle, or a substantial ellipse, each including the origin, or displaying a reduced-size display associated with the frame, a circle, an ellipse, a substantial circle, or a substantial ellipse with its center at the origin; moving the frame so as to converge to the origin; selecting an intersection of the frame and a half-line as a target position of the object in response to the movement of the object in the reduced-size display, the circle, the ellipse, the substantial circle, or the substantial ellipse, the half-line connecting an end point at the origin and the target position of the object in the reduced-size display, the circle, the ellipse, the substantial circle, or the substantial ellipse; and moving the object to the intersection in response to that the object passes over the frame of the reduced-size display or the circumference of the circle, the ellipse, the substantial circle, or the substantial ellipse, and displaying the object.

An electronic device program according to the present invention causes an electronic device to execute the steps according to one of the methods according to the first to third aspects.

An electronic device according to a fourth embodiment of the present invention includes frame display means that displays at least one frame on or in the vicinity of a display screen frame in response to an instruction from a user, with its origin at the present position of the object when receiving the instruction from the user; frame moving means that moves the frame so as to converge to the origin; selection means that selects an intersection of the frame and a half-line as a target position of the object in response to a short-distance movement of the object, the half-line connecting an end point at the origin and a position to which the object moves by the short-distance movement; and object moving means that moves the object to the intersection.

An electronic device according to a fifth embodiment of the present invention includes frame display means that displays at least one frame on a target position candidate of the object in response to an instruction from the user, with its origin at the present position of the object when receiving the instruction from the user; selection means that selects an intersection of the frame and a half-line as a target position of the object in response to a short-distance movement of the object, the half-line connecting an end point at the origin and a position to which the object moves by the short-distance movement; and object moving means that moves the object to the intersection.

An electronic device according to a sixth embodiment of the present invention includes frame display means that displays at least one frame on or in the vicinity of a display screen frame in response to an instruction from a user, with its origin at the present position of the object when receiving the instruction from the user; reduced-size display means that displays a reduced-size display including the origin and associated with the frame, or a circle, an ellipse, a substantial circle, or a substantial ellipse, each including the origin, or displaying a reduced-size display associated with the frame, a circle, an ellipse, a substantial circle, or a substantial ellipse with its center at the origin; frame moving means that moves the frame so as to converge to the origin; selection means that selects an intersection of the frame and a half-line as a target position of the object in response to the movement of the object in the reduced-size display, the circle, the ellipse, the substantial circle, or the substantial ellipse, the half-line connecting an end point at the origin and the target position of the object in the reduced-size display, the circle, the ellipse, the substantial circle, or the substantial ellipse; and object moving means that moves the object to the intersection in response to that the object passing over the frame of the reduced-size display or the circumference of the circle, the ellipse, the substantial circle, or the substantial ellipse.

In an embodiment of the present invention, the electronic device may further include reduced-size display means that displays a reduced-size display including the origin and associated with the frame, or a circle, an ellipse, a substantial circle, or a substantial ellipse, each including the origin.

In an embodiment of the present invention, the electronic device may further include reduced-size display means that displays a reduced-size display associated with the frame, a circle, an ellipse, a substantial circle, or a substantial ellipse with its center at the origin.

In an embodiment of the present invention, the selection means may change the intersection as the object moves in the reduced-size display, the circle, the ellipse, the substantial circle, or the substantial ellipse.

In an embodiment of the present invention, the object moving means may move the object in response to that the object passes over the frame of the reduced-size display or the circumference of the circle, the ellipse, the substantial circle, or the substantial ellipse.

In an embodiment of the present invention, the frame moving means may move the frame by reducing or enlarging the frame.

In an embodiment of the present invention, the frame moving means may move the frame by automatically reducing the frame. In an embodiment of the present invention, the frame moving means may move the frame by reducing or enlarging the frame according to an operation of the user.

In an embodiment of the present invention, the frame moving means may move the frame with acceleration. In an embodiment of the present invention, the frame moving means may move the frame by decreasing or increasing the speed according to an operation of the user.

In an embodiment of the present invention, in the case where the frame is displayed on a first display screen of a first electronic device and a second display screen of a second electronic device, the first electronic device may display part of the frame on the first display screen, and the second electronic device may display the rest of the frame on the second display screen.

In an embodiment of the present invention, the first electronic device may display the origin and the reduced-size display, the circle, the ellipse, the substantial circle, or the substantial ellipse on the first display screen, and the second electronic device may display the intersection on the second display screen.

In an embodiment of the present invention, the second electronic device may move the object to the intersection and display the object.

In an embodiment of the present invention, the frame display means may display the frame in response to a specific user operation indicating start of the process of moving the object.

In an embodiment of the present invention, the frame may have a shape corresponding to the outer periphery of the display screen of a single display, a shape corresponding to a combination of the outer peripheries of the display screens of a plurality of displays, or at least one circle, ellipse, substantial circle, or substantial ellipse.

In an embodiment of the present invention, the frame may include at least one vertex of the display screen.

In an embodiment of the present invention, the moving object may be a cursor or a user-selectable moving object.

An electronic device program according to an embodiment of the present invention may be stored in one or a plurality of flexible disks, MOs, CD-ROMs, DVDs, BDs, hard disk drives, memory media connectable to a USB, and any electronic-device-readable recording medium, such as a ROM, an MRAM, or a RAM. The electronic device program may be loaded into a recording medium from another data processing system, such as a server computer, connected via a communication line, or may be copied from another recording medium. The electronic device program according to an embodiment of the present invention may be compressed or divided into a plurality of pieces and stored in one or a plurality of recording media. Note that it is of course possible to provide electronic device program products according to an embodiment of the present invention in various forms. Examples of the electronic device program products according to the embodiment of the present invention may include a storage medium in which the electronic device program is recorded and a transmission medium that transmits the electronic device program.

Note that the outline of the present invention described above does not include all necessary features of the present invention and a combination or sub-combination of these components may also be the present invention.

It will also be obvious to those skilled in the art that various changes may be made in the hardware components of the electronic device used in an embodiment of the present invention, such as combining them with a plurality of machines and distributing the functions thereto. These changes are of course included in the spirit of the present invention. These components are merely examples, and all the components are not absolutely necessary for the present invention.

The present invention may be achieved as hardware, software, or a combination of hardware and software. A typical example of implementation using a combination of hardware and software is implementation in an electronic device in which the electronic device program is installed. In such a case, by loading the electronic device program into the memory of the electronic device and executing it, the electronic device program controls the electronic device and causes the electronic device to implement processes according to the present invention. The electronic device program may include sets of instructions expressed by any language, code, or notation. Such instructions allow the electronic device to implement a specific function directly or after one or both of (1) converting it to another language, code, or notation and (2) copying it to another medium.

According to an embodiment of the present invention, a moving object can be moved to a target position with high accuracy and high efficiency, or a moving object distant from the present position of the pointing device can be selected without excessively leaving the present position of the pointing device.

According to an embodiment of the present invention, in the case where a user holds a tablet computer or a smartphone with one hand and needs to operate it with the one hand, the user can move a moving object to a target position with high accuracy and high efficiency, or can operate a moving object located at a position that a finger of the one hand cannot reach.

As described above, the present invention can provide a highly usable technique for moving a moving object.

An object of the present invention is to provide a technique for moving a moving object to a target position with high accuracy and high efficiency or for selecting an object distant from the present position of the pointing device without excessively leaving the present position of the pointing device.

In one or more embodiments, the present invention includes the steps of displaying at least one frame on or in the vicinity of a display screen frame in response to an instruction from a user; moving the frame so as to converge to the origin which is the present position of the object when receiving the instruction from the user; selecting an intersection of the frame and a half-line as a target position of the object in response to a short-distance movement of the object, the half-line connecting an end point at the origin and a position to which the object moves by the short-distance movement; and moving the object to the intersection and displaying the object.

What is claimed is:

1. An electronic device that moves a movable object displayed on a display screen, wherein the electronic device is configured to:
receive a detection of a specific user operation;
in response to receiving the detection of the specific user operation, display a plurality of frames on a display screen;
display a half-line connecting an origin of the movable object and a frame (selected frame) selected from the plurality of frames;
display a circle on the display screen, wherein the origin of the movable object is at an origin of the circle;
select an intersection of the selected frame and the half-line as a target position of the movable object, wherein when selecting the intersection of the selected frame, the electronic device is further configured to:
change the intersection as the movable object moves in the circle;
wherein the plurality of frames indicate target positions of a movable object;
move the movable object to the target position in response to the movable object passing over the circumference of the circle; and
erase the circle, the plurality of frames, and the half-line from the display screen in response to moving the movable object to the target position.

2. The electronic device of claim 1, wherein the electronic device is configured to move the movable object so as to jump to the target position.

3. The electronic device of claim 1, wherein the electronic device is configured to move the movable object gradually to the target position.

4. The electronic device of claim 1, wherein the half-line connects the origin of the movable object to a center of the frame.

5. The electronic device of claim 1, wherein the plurality of frames are displayed on or in the vicinity of the corners of the display screen.

6. The electronic device of claim 1, wherein the movable object is a cursor or an icon.

* * * * *